(12) United States Patent  
Prevost

(10) Patent No.: US 11,906,001 B2
(45) Date of Patent: *Feb. 20, 2024

(54) JOINTS WITH DIAMOND BEARING SURFACES

(71) Applicant: Pi Tech Innovations LLC, Houston, TX (US)

(72) Inventor: Gregory Prevost, Spring, TX (US)

(73) Assignee: Pi Tech Innovations LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,529

(22) Filed: Mar. 2, 2023

(65) Prior Publication Data

US 2023/0287940 A1    Sep. 14, 2023

Related U.S. Application Data

(63) Continuation of application No. 17/574,099, filed on Jan. 12, 2022, now Pat. No. 11,614,126, which is a
(Continued)

(51) Int. Cl.
*F16D 3/16*    (2006.01)
*F16H 1/12*    (2006.01)
(Continued)

(52) U.S. Cl.
CPC ............... *F16D 3/16* (2013.01); *F16H 1/16* (2013.01); *F16H 1/20* (2013.01); *F16H 1/14* (2013.01)

(58) Field of Classification Search
CPC ..... F16H 1/04; F16H 1/14; F16H 1/16; F16H 1/20; F16H 1/203; F16H 1/206; F16H 1/24; F16D 3/16; F16D 3/26; F16D 3/28
See application file for complete search history.

(56) References Cited

U.S. PATENT DOCUMENTS 2,693,396 A    11/1954    Gondek
2,947,609 A    8/1960    Strong
(Continued)

FOREIGN PATENT DOCUMENTS

DE    4226986 A1    2/1994
DE    29705983 U1    6/1997
(Continued)

OTHER PUBLICATIONS

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.
(Continued)

*Primary Examiner* — Adam D Rogers
(74) *Attorney, Agent, or Firm* — Michael S. McCoy; Amatong McCoy LLC

(57) ABSTRACT

Articulable joints having diamond bearing surfaces engaged with metal bearing surfaces are provided herein. The articulable joints provide multiple degrees of freedom to components, such as drivelines, and bear loads in multiple directions. The articulable joints include diamond bearing surfaces slidingly engaged with opposing metal bearing surfaces that include more than trace amounts of diamond solvent-catalyst.

30 Claims, 26 Drawing Sheets

Related U.S. Application Data continuation-in-part of application No. 17/399,640, filed on Aug. 11, 2021, and a continuation-in-part of application No. 17/331,399, filed on May 26, 2021, now Pat. No. 11,274,731, said application No. 17/331,399 is a continuation of application No. 16/888,079, filed on May 29, 2020, now Pat. No. 11,054,000.

(60) Provisional application No. 63/137,037, filed on Jan. 13, 2021, provisional application No. 63/064,272, filed on Aug. 11, 2020.

(51) Int. Cl.
  *F16H 1/20* (2006.01)
  *F16H 1/16* (2006.01)
  *F16H 1/14* (2006.01)

(56) References Cited

U.S. PATENT DOCUMENTS

| | | |
|---|---|---|
| 2,947,610 A | 8/1960 | Hall et al. |
| 3,132,904 A | 5/1964 | Kohei et al. |
| 3,582,161 A | 6/1971 | Hudson |
| 3,603,652 A | 9/1971 | Youden |
| 3,650,714 A | 3/1972 | Farkas |
| 3,745,623 A | 7/1973 | Wentorf et al. |
| 3,752,541 A | 8/1973 | Mcvey |
| 3,866,987 A | 2/1975 | Garner |
| 3,920,290 A | 11/1975 | Evarts |
| 4,085,634 A | 4/1978 | Sattler |
| 4,225,322 A | 9/1980 | Knemeyer |
| 4,275,935 A | 6/1981 | Thompson et al. |
| 4,285,550 A | 8/1981 | Blackburn et al. |
| 4,382,637 A | 5/1983 | Blackburn et al. |
| 4,410,054 A | 10/1983 | Nagel et al. |
| 4,410,284 A | 10/1983 | Herrick |
| 4,468,138 A | 8/1984 | Nagel |
| 4,525,178 A | 6/1985 | Hall |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,720,199 A | 1/1988 | Geczy et al. |
| 4,729,440 A | 3/1988 | Hall |
| 4,738,322 A | 4/1988 | Hall et al. |
| 4,764,036 A | 8/1988 | McPherson |
| 4,797,011 A | 1/1989 | Saeki et al. |
| 4,906,528 A | 3/1990 | Cerceau et al. |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,151,107 A | 9/1992 | Cho et al. |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,385,715 A | 1/1995 | Fish |
| 5,447,208 A | 9/1995 | Lund et al. |
| 5,462,362 A | 10/1995 | Yuhta et al. |
| 5,514,183 A | 5/1996 | Epstein et al. |
| 5,560,716 A | 10/1996 | Tank et al. |
| 5,645,617 A | 7/1997 | Frushour |
| 5,653,300 A | 8/1997 | Lund et al. |
| 5,855,996 A | 1/1999 | Corrigan et al. |
| 5,948,541 A | 9/1999 | Inspektor |
| 6,045,029 A | 4/2000 | Scott |
| 6,164,109 A | 12/2000 | Bartosch |
| 6,190,050 B1 | 2/2001 | Campbell |
| 6,209,185 B1 | 4/2001 | Scott |
| 6,488,103 B1 | 12/2002 | Dennis et al. |
| 6,488,715 B1 | 12/2002 | Pope et al. |
| 6,517,583 B1 | 2/2003 | Pope et al. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,764,219 B2 | 7/2004 | Doll et al. |
| 6,814,775 B2 | 11/2004 | Scurlock et al. |
| 6,951,578 B1 | 10/2005 | Belnap et al. |
| 7,128,173 B2 | 10/2006 | Lin |
| 7,198,043 B1 | 4/2007 | Zhang |
| 7,234,541 B2 | 6/2007 | Scott et al. |
| 7,311,159 B2 | 12/2007 | Lin et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B2 | 6/2010 | Dodal et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 8,069,933 B2 | 12/2011 | Sexton et al. |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,480,304 B1 | 7/2013 | Cooley et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,702,824 B1 | 4/2014 | Sani et al. |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,789,281 B1 | 7/2014 | Sexton et al. |
| 8,881,849 B2 | 11/2014 | Shen et al. |
| 8,939,652 B2 | 1/2015 | Peterson et al. |
| 8,974,559 B2 | 3/2015 | Frushour |
| 9,004,198 B2 | 4/2015 | Kulkarni |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,273,381 B2 | 3/2016 | Qian et al. |
| 9,284,980 B1 | 3/2016 | Miess |
| 9,309,923 B1 | 4/2016 | Lingwall et al. |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,643,293 B1 | 5/2017 | Miess et al. |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |
| 9,822,523 B1 | 11/2017 | Miess |
| 10,060,192 B1 | 8/2018 | Miess et al. |
| 10,113,362 B2 | 10/2018 | Ritchie et al. |
| 10,279,454 B2 | 5/2019 | DiGiovanni et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1 | 11/2019 | Miess et al. |
| 10,683,895 B2 | 6/2020 | Hall et al. |
| 10,711,792 B2 | 7/2020 | Vidalenc et al. |
| 10,711,833 B2 | 7/2020 | Manwill et al. |
| 10,738,821 B2 | 8/2020 | Miess et al. |
| 10,807,913 B1 | 10/2020 | Hawks et al. |

(56) References Cited

U.S. PATENT DOCUMENTS

| | | | |
|---|---|---|---|
| 10,968,700 | B1 | 4/2021 | Raymond |
| 10,968,703 | B2 | 4/2021 | Haugvaldstad et al. |
| 11,054,000 | B2 | 7/2021 | Prevost et al. |
| 11,085,488 | B2 | 8/2021 | Gonzalez |
| 11,118,408 | B2 | 9/2021 | Marshall et al. |
| 11,614,126 | B2 * | 3/2023 | Prevost .................. F16D 3/38 74/461 |
| 11,802,443 | B2 | 10/2023 | Peters |
| 2003/0019106 | A1 | 1/2003 | Pope et al. |
| 2003/0075363 | A1 | 4/2003 | Lin et al. |
| 2003/0220691 | A1 | 11/2003 | Songer et al. |
| 2004/0031625 | A1 | 2/2004 | Lin et al. |
| 2004/0134687 | A1 | 7/2004 | Radford et al. |
| 2004/0219362 | A1 | 11/2004 | Wort et al. |
| 2004/0223676 | A1 | 11/2004 | Pope et al. |
| 2006/0060392 | A1 | 3/2006 | Eyre |
| 2006/0165973 | A1 | 7/2006 | Dumm et al. |
| 2007/0046119 | A1 | 3/2007 | Cooley |
| 2008/0253706 | A1 | 10/2008 | Bischof et al. |
| 2009/0060408 | A1 | 3/2009 | Nagasaka et al. |
| 2009/0087563 | A1 | 4/2009 | Voegele et al. |
| 2009/0268995 | A1 | 10/2009 | Ide et al. |
| 2010/0061676 | A1 | 3/2010 | Sugiyama et al. |
| 2010/0276200 | A1 | 11/2010 | Schwefe et al. |
| 2010/0307069 | A1 | 12/2010 | Bertagnolli et al. |
| 2011/0174547 | A1 | 7/2011 | Sexton et al. |
| 2011/0203791 | A1 | 8/2011 | Jin et al. |
| 2011/0220415 | A1 | 9/2011 | Jin et al. |
| 2011/0297454 | A1 | 12/2011 | Shen et al. |
| 2012/0037425 | A1 | 2/2012 | Sexton et al. |
| 2012/0057814 | A1 | 3/2012 | Dadson et al. |
| 2012/0225253 | A1 | 9/2012 | DiGiovanni et al. |
| 2012/0281938 | A1 | 11/2012 | Peterson et al. |
| 2013/0004106 | A1 | 1/2013 | Wenzel |
| 2013/0092454 | A1 | 4/2013 | Scott et al. |
| 2013/0146367 | A1 | 6/2013 | Zhang et al. |
| 2013/0170778 | A1 | 7/2013 | Higginbotham et al. |
| 2014/0037232 | A1 | 2/2014 | Marchand et al. |
| 2014/0254967 | A1 | 9/2014 | Gonzalez |
| 2014/0341487 | A1 | 11/2014 | Cooley et al. |
| 2014/0355914 | A1 | 12/2014 | Cooley et al. |
| 2015/0027713 | A1 | 1/2015 | Penisson |
| 2015/0132539 | A1 | 5/2015 | Bailey et al. |
| 2015/0337949 | A1 | 11/2015 | Ziegler et al. |
| 2016/0153243 | A1 | 6/2016 | Hinz et al. |
| 2016/0312535 | A1 | 10/2016 | Ritchie et al. |
| 2017/0138224 | A1 | 5/2017 | Henry et al. |
| 2017/0234071 | A1 | 8/2017 | Spatz et al. |
| 2017/0261031 | A1 | 9/2017 | Gonzalez et al. |
| 2018/0087134 | A1 | 3/2018 | Chang et al. |
| 2018/0209476 | A1 | 7/2018 | Gonzalez |
| 2018/0216661 | A1 | 8/2018 | Gonzalez |
| 2018/0264614 | A1 | 9/2018 | Winkelmann et al. |
| 2018/0320740 | A1 | 11/2018 | Hall et al. |
| 2019/0063495 | A1 | 2/2019 | Peterson et al. |
| 2019/0136628 | A1 | 5/2019 | Savage et al. |
| 2019/0170186 | A1 | 6/2019 | Gonzalez et al. |
| 2020/0031586 | A1 | 1/2020 | Miess et al. |
| 2020/0032846 | A1 | 1/2020 | Miess et al. |
| 2020/0056659 | A1 | 2/2020 | Prevost et al. |
| 2020/0063498 | A1 | 2/2020 | Prevost et al. |
| 2020/0063503 | A1 | 2/2020 | Reese et al. |
| 2020/0182290 | A1 | 6/2020 | Doehring et al. |
| 2020/0325933 | A1 | 10/2020 | Prevost et al. |
| 2020/0362956 | A1 | 11/2020 | Prevost et al. |
| 2020/0378440 | A1 | 12/2020 | Prevost et al. |
| 2021/0140277 | A1 | 5/2021 | Hall et al. |
| 2021/0148406 | A1 | 5/2021 | Hoyle et al. |
| 2021/0198949 | A1 | 7/2021 | Haugvaldstad et al. |
| 2021/0207437 | A1 | 7/2021 | Raymond |
| 2021/0222734 | A1 | 7/2021 | Gonzalez et al. |

FOREIGN PATENT DOCUMENTS

| | | |
|---|---|---|
| DE | 102010052804 A1 | 5/2012 |
| EP | 1931852 B1 | 1/2018 |
| JP | S401624 U | 1/1965 |
| JP | S6061404 A | 4/1985 |
| JP | 2000002315 A | 1/2000 |
| JP | 2000211717 A | 8/2000 |
| JP | 2004002912 A | 1/2004 |
| JP | 2006275286 A | 10/2006 |
| JP | 2007153141 A | 6/2007 |
| JP | 2008056735 A | 3/2008 |
| WO | 8700080 A1 | 1/1987 |
| WO | 2004001238 A2 | 12/2003 |
| WO | 2006011028 A1 | 2/2006 |
| WO | 2008133197 A1 | 11/2008 |
| WO | 2011052231 A1 | 5/2011 |
| WO | 2013043917 A1 | 3/2013 |
| WO | 2014014673 A1 | 1/2014 |
| WO | 2014189763 A1 | 11/2014 |
| WO | 2016089680 A1 | 6/2016 |
| WO | 2017105883 A1 | 6/2017 |
| WO | 2018041578 A1 | 3/2018 |
| WO | 2018226380 A1 | 12/2018 |
| WO | 2019096851 A1 | 5/2019 |
| WO | WO-2022155204 A1 * | 7/2022 |

OTHER PUBLICATIONS

Chen, Y.; Nguyen, T; Zhang, L.C.; Polishing of polycrystalline diamond by the technique of dynamic friction-Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.

element six, The Element Six CVD Diamond Handbook, Accessed on Nov. 1, 2019, 28 pages.

Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.

Liao, Y.; Marks, L.; In situ single asperity wear at the nanometre scale, International Materials Reviews, 2016, pp. 1-17, Taylor & Francis.

Linear Rolling Bearings ME EN 7960—Precision Machine Design Topic 8, Presentation, Accessed on Jan. 26, 2020, 23 Pages, University of Utah.

Machinery's Handbook 30th Edition, Copyright Page and Coefficients of Friction Page, 2016, p. 158 (2 Pages total), Industrial Press, Inc., South Norwalk, U.S.A.

Machinery's Handbook, 2016, Industrial Press, Inc., 30th edition, pp. 843 and 1055 (6 pages total).

(56) References Cited

OTHER PUBLICATIONS

McCarthy, J. Michael; Cam and Follower Systems, PowerPoint Presentation, Jul. 25, 2009, pp. 1-14, UCIrvine The Henry Samueli School of Engineering.
McGill Cam Follower Bearings brochure, 2005, p. 1-19, Back Page Brochure MCCF-05, Form #8991 (20 pages total).
Motion & Control NSK Cam Followers (Stud Type Track Rollers) Roller Followers (Yoke Type Track Rollers) catalog, 1991, Cover Page, pp. 1-18, Back Page, CAT. No.E1421 2004 C-11, Japan.
Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).
RBC Aerospace Bearings Rolling Element Bearings catalog, 2008, Cover Page, First Page, pp. 1-149, Back Page (152 Pages total).
RGPBalls Ball Transfer Units catalog, accessed on Jun. 23, 2018, pp. 1-26, 2 Back Pages (28 Pages total).
Sandvik Coromant Hard part turning with CBN catalog, 2012, pp. 1-42, 2 Back Pages (44 Pages total).
Sexton, Timothy N.; Cooley, Craig H.; Diamond Bearing Technology for Deep and Geothermal Drilling, PowerPoint Presentation, 2010, 16 Pages.
SKF Ball transfer units catalog, Dec. 2006, Cover Page, Table of Contents, pp. 1-36, 2 Back Pages (40 Pages total), Publication 940-711.
Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).
Sun, Liling; WU, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.
Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.
Surface Finish, Wikipedia, https://en.wikipedia.org/wiki/Surface_finish,Retrieved from https://en.wikipedia.org/w/index.php?title=Surface_finish&oldid=919232937, Oct. 2, 2019, 3 pages.
United States Defensive Publication No. T102,901, published Apr. 5, 1983, in U.S. Appl. No. 298,271 [2 Pages].
USSynthetic Bearings and Waukesha Bearings brochure for Diamond Tilting Pad Thrust Bearings, 2015, 2 Pages.
USSynthetic Bearings brochure, accessed on Jun. 23, 2018, 12 Pages, Orem, Utah.
Zeidan, Fouad Y.; Paquette, Donald J., Application of High Speed and High Performance Fluid Film Bearings in Rotating Machinery, 1994, pp. 209-234.
Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.
Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.

\* cited by examiner

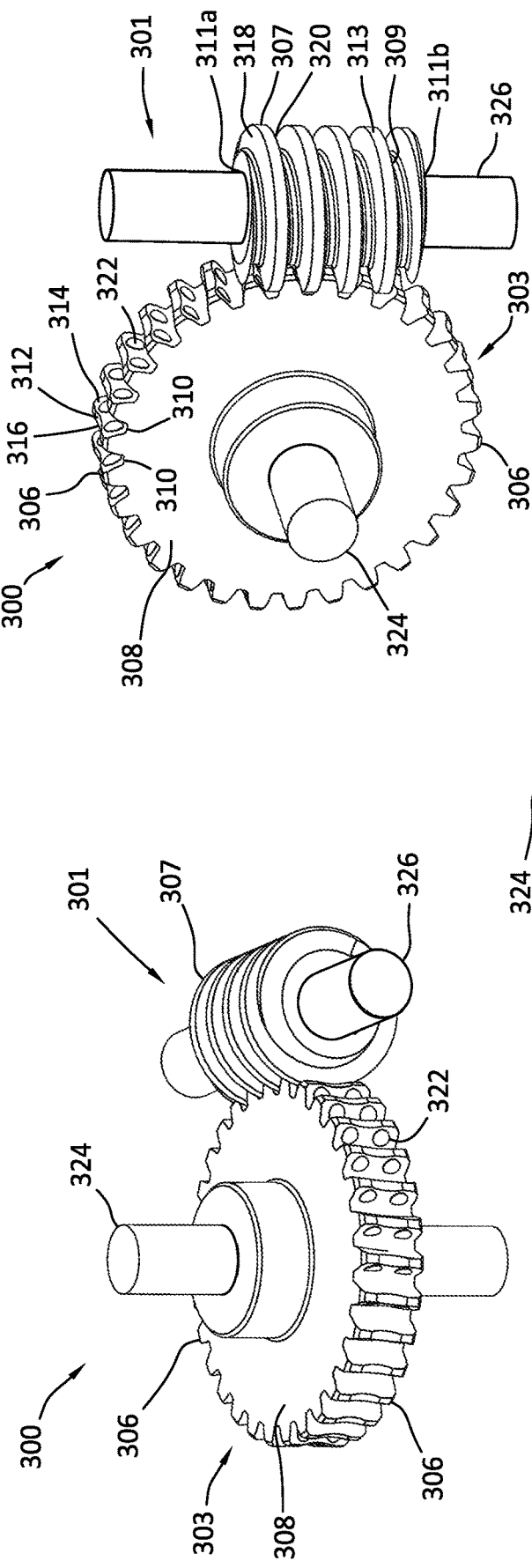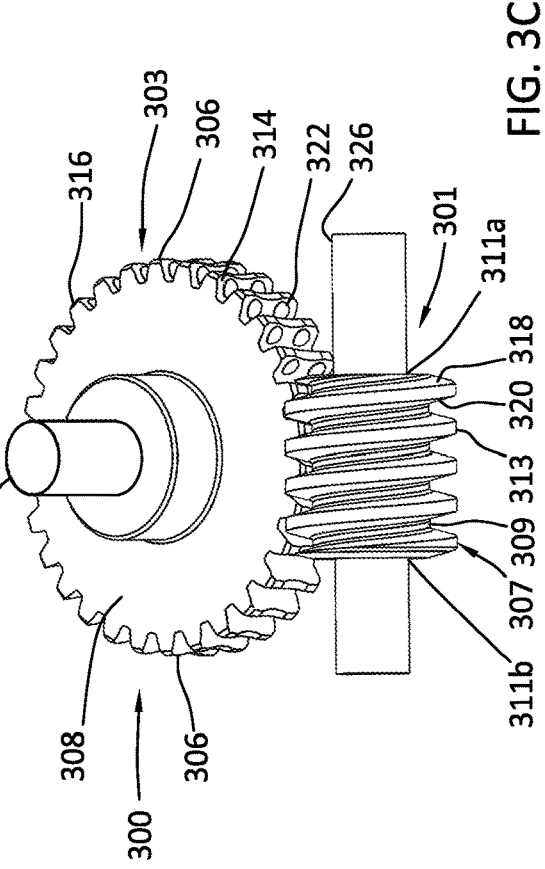
FIG. 3A
FIG. 3B
FIG. 3C

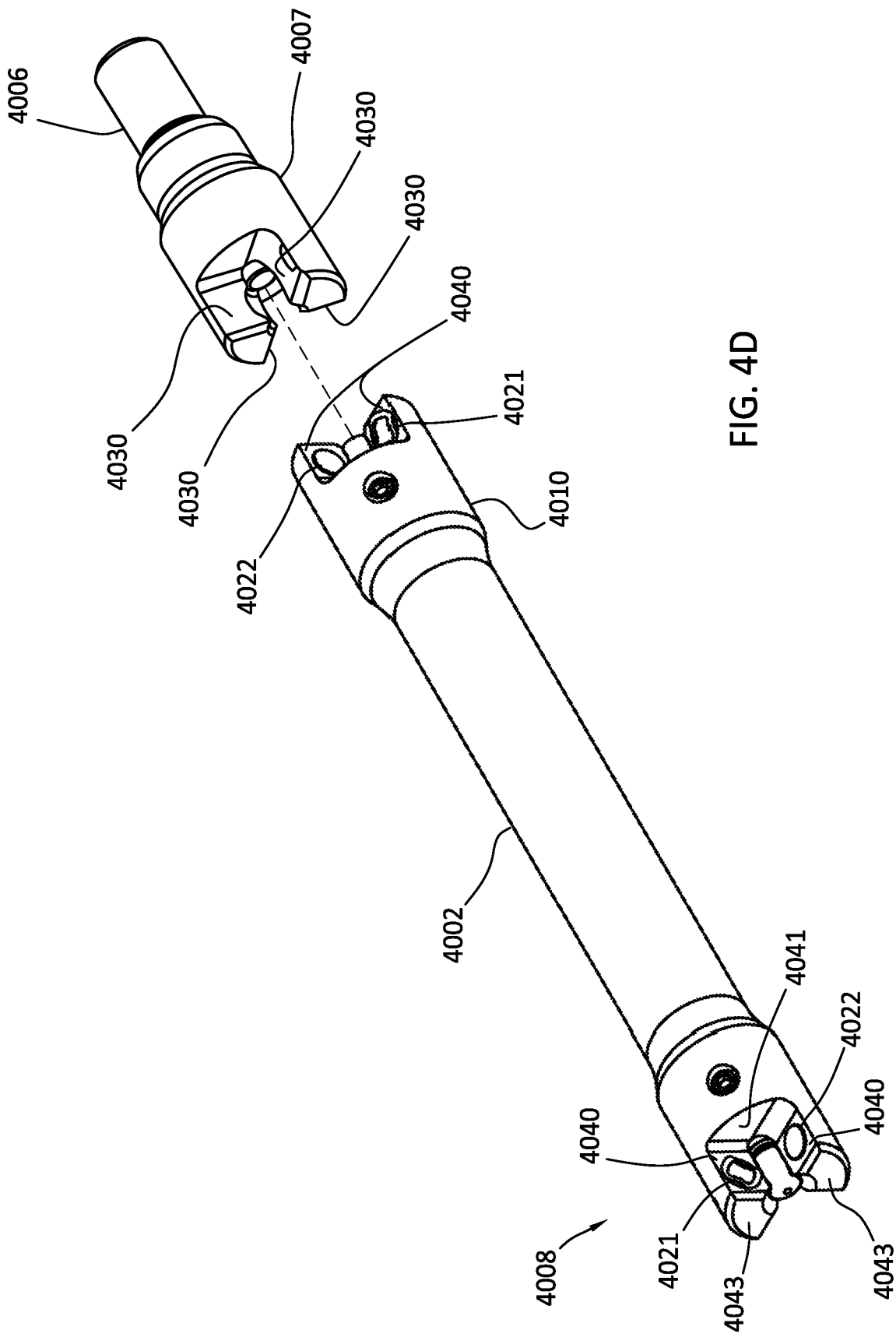

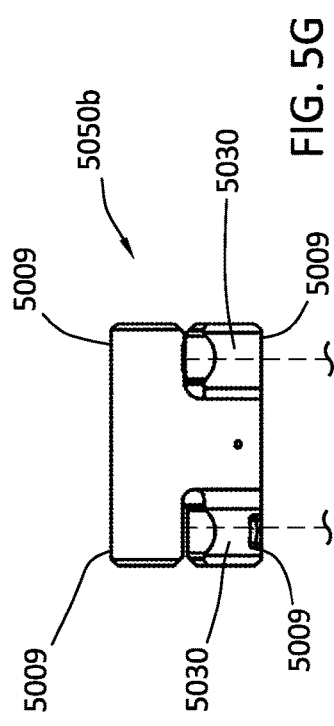
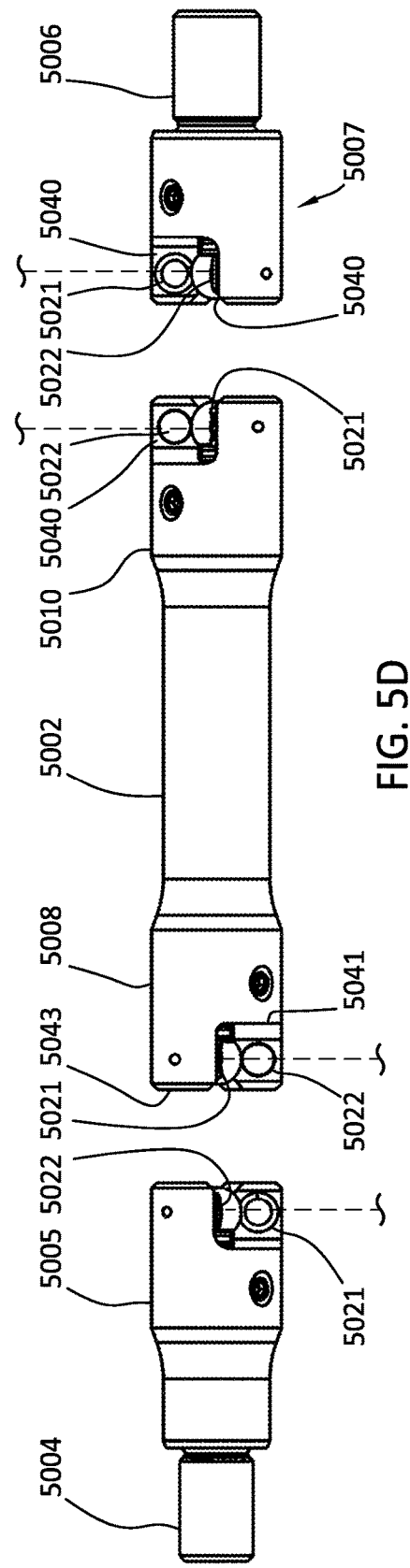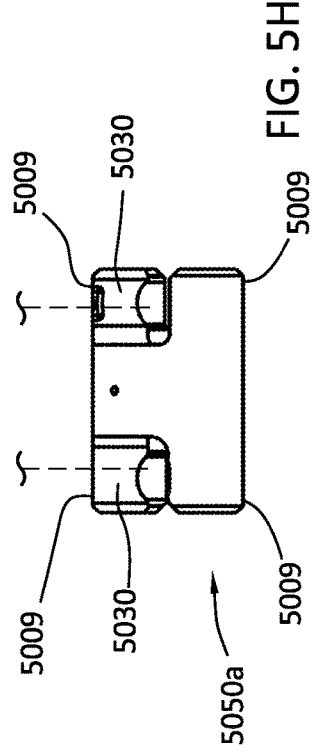

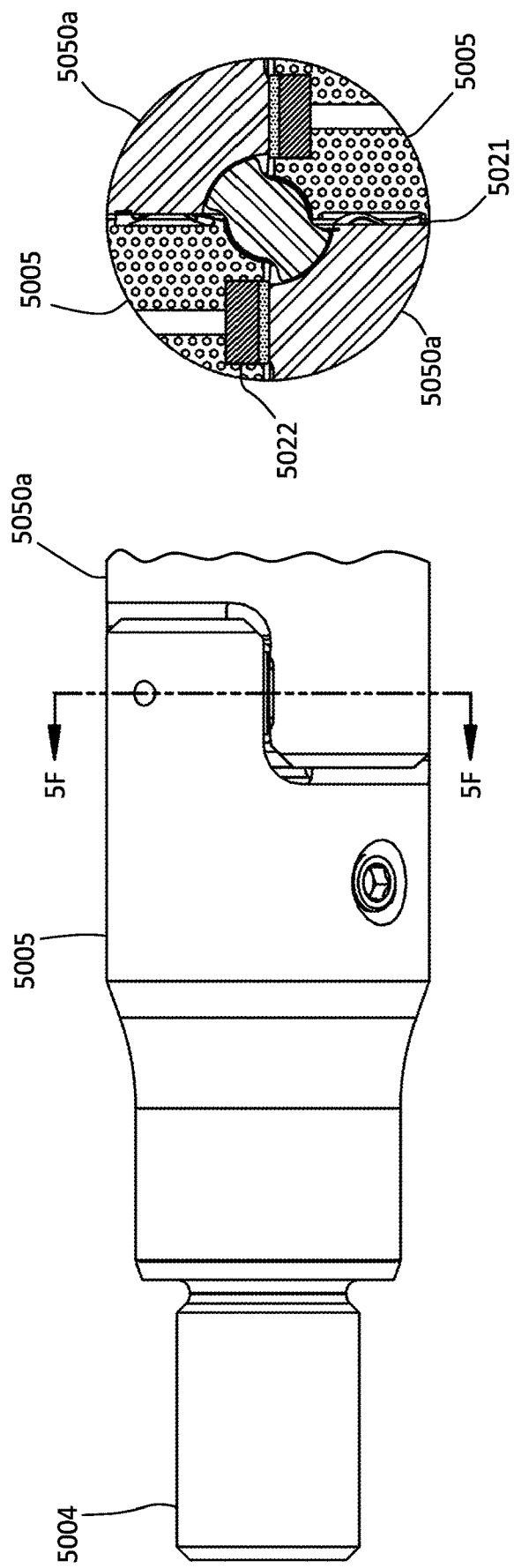

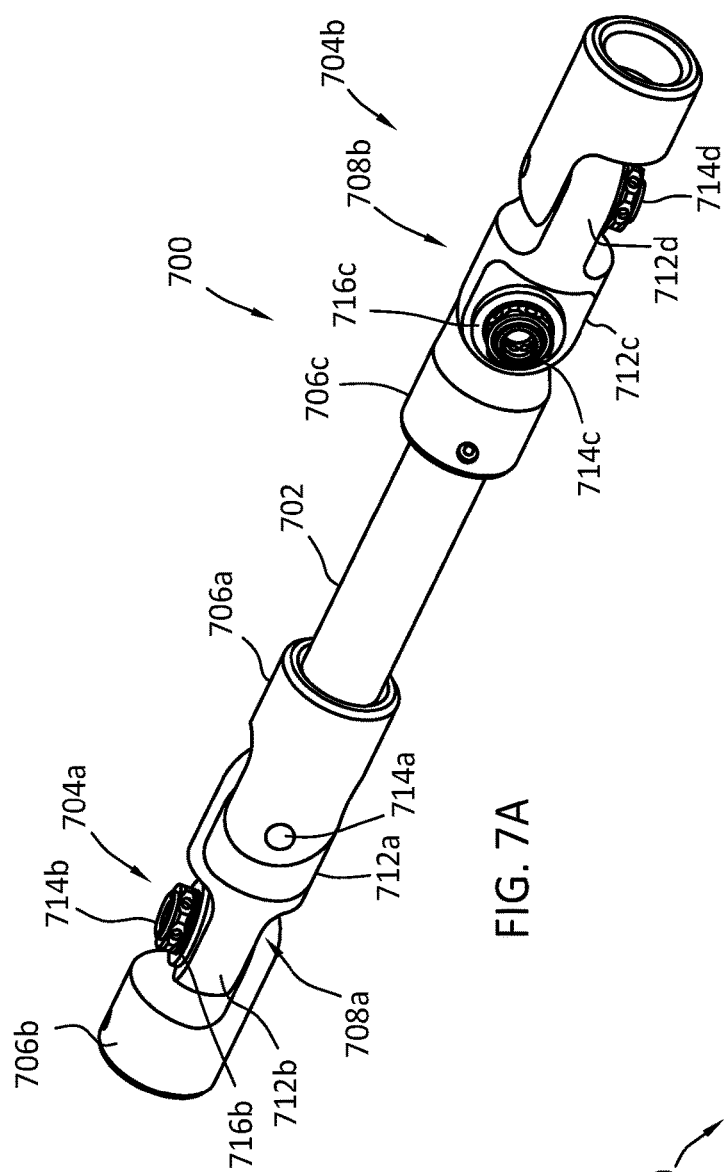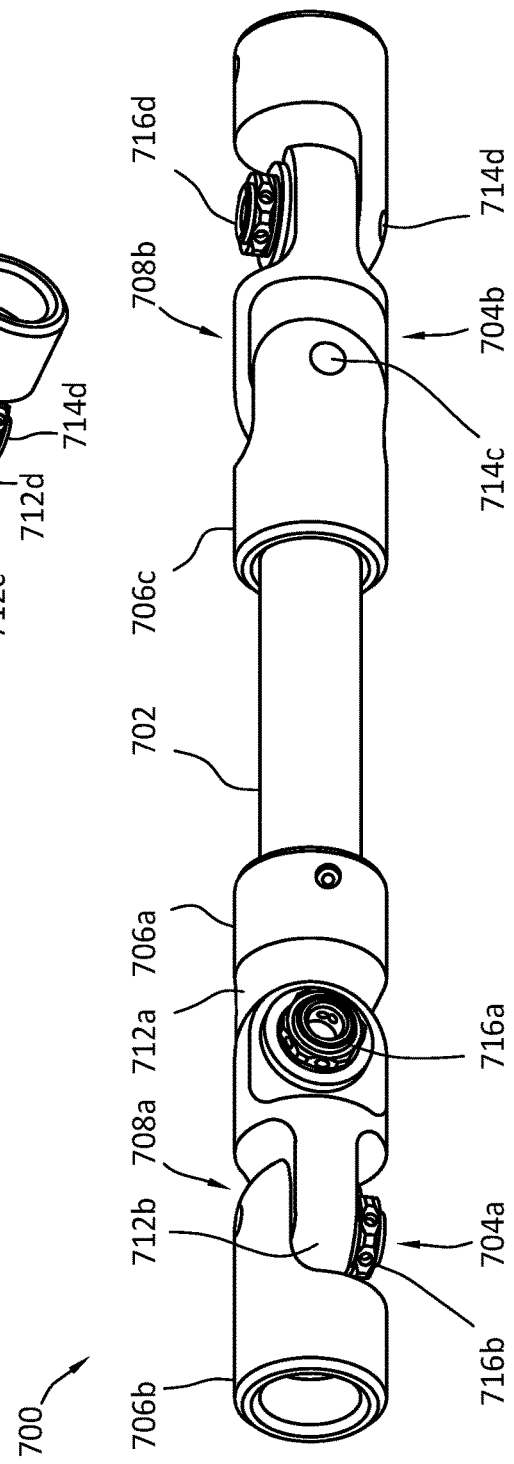

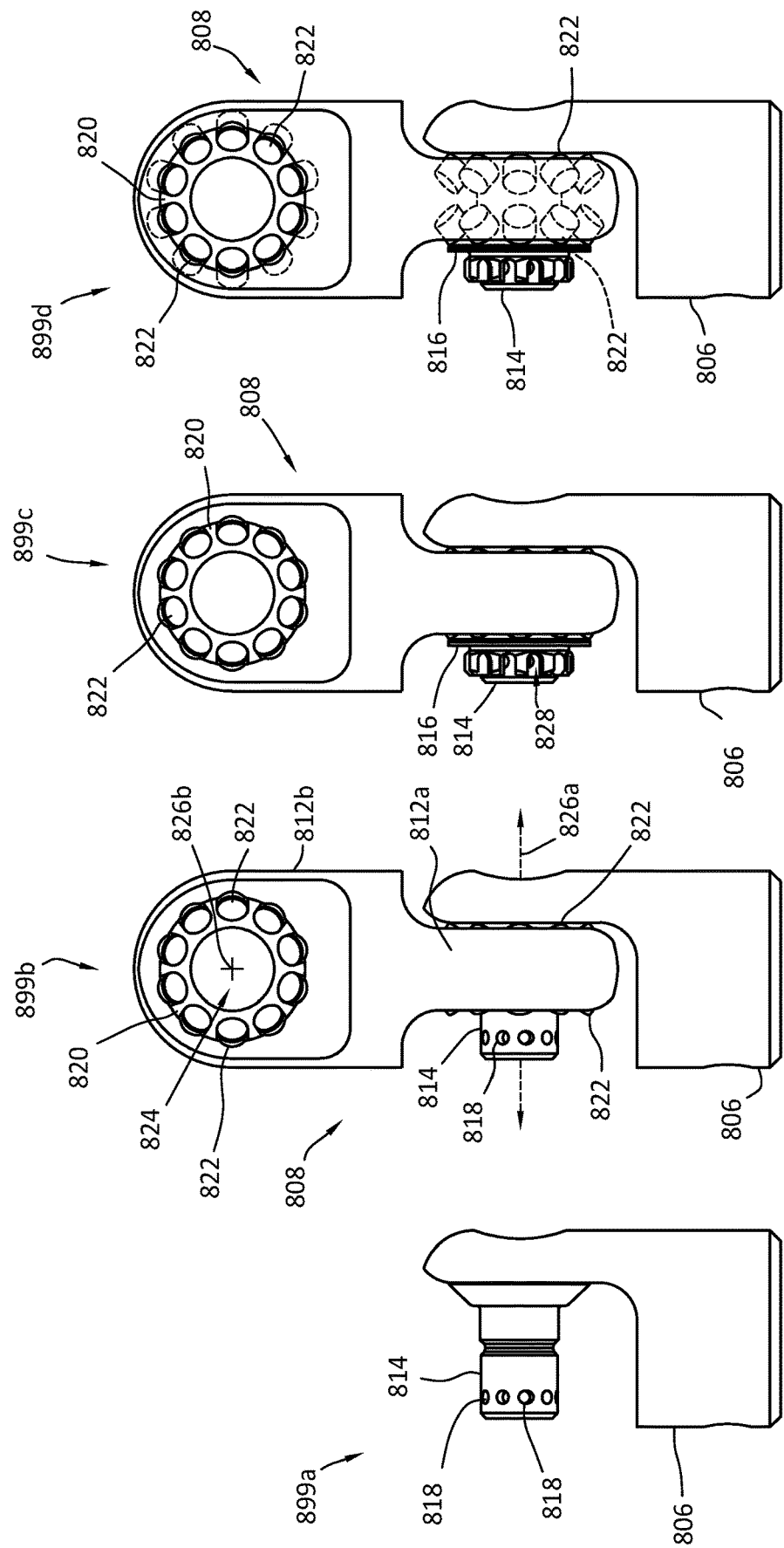

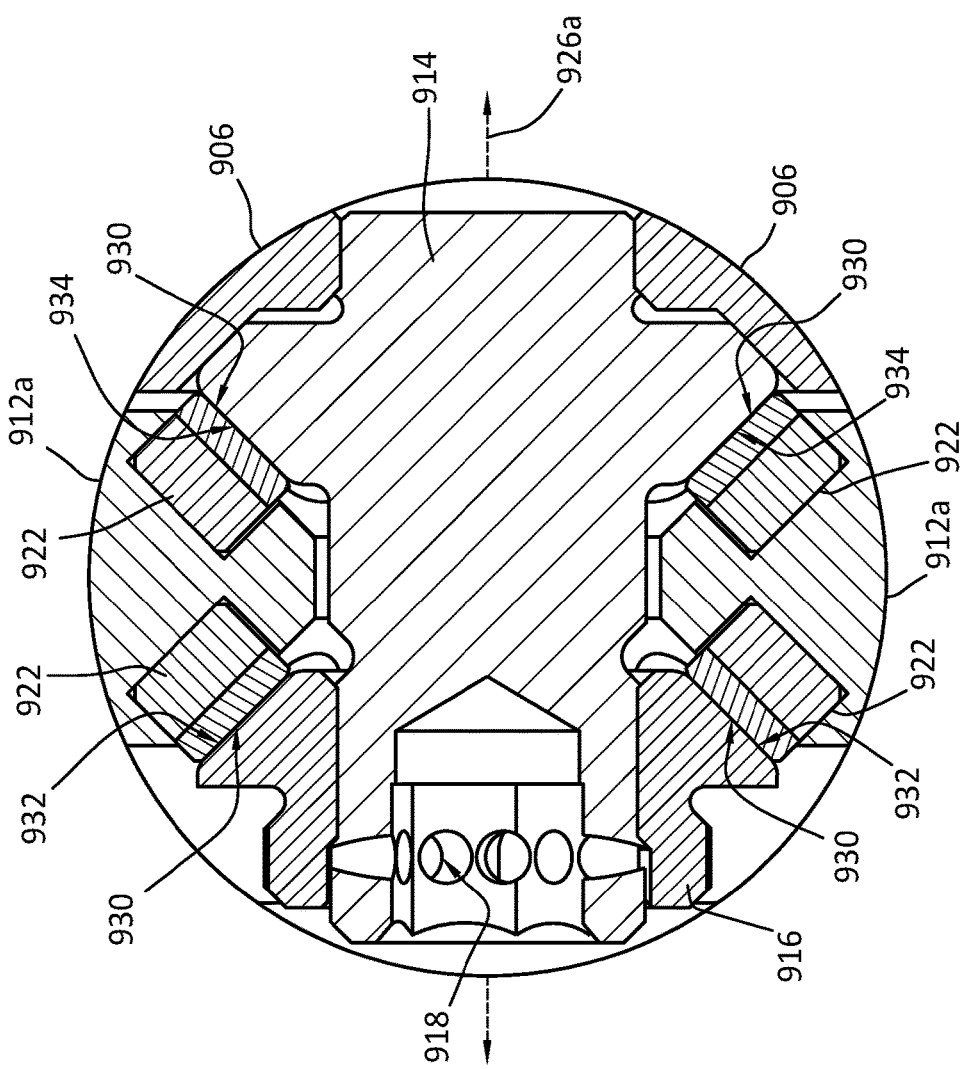
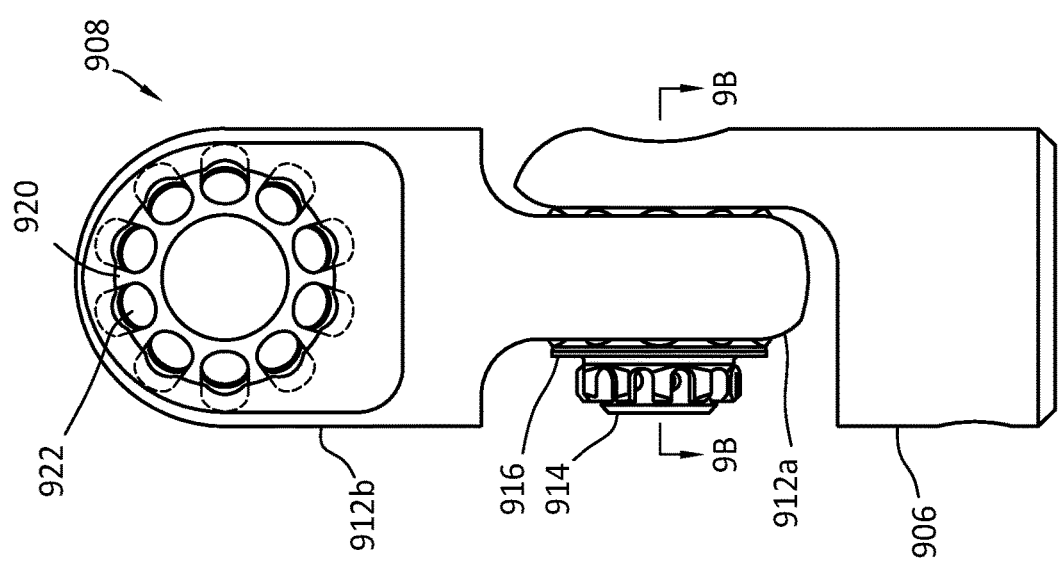
FIG. 9B
FIG. 9A

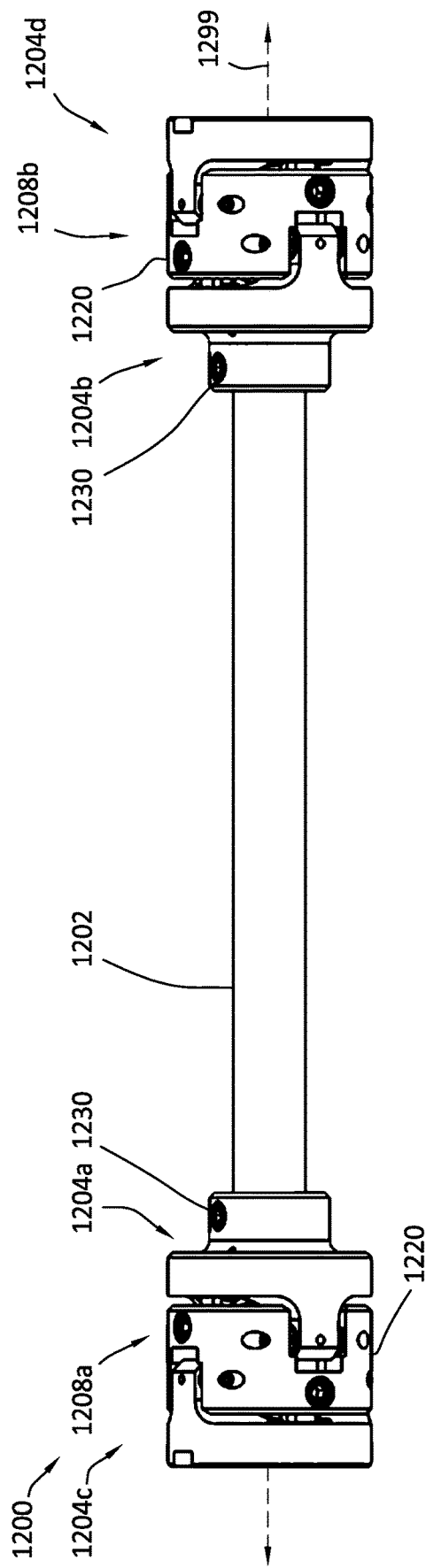
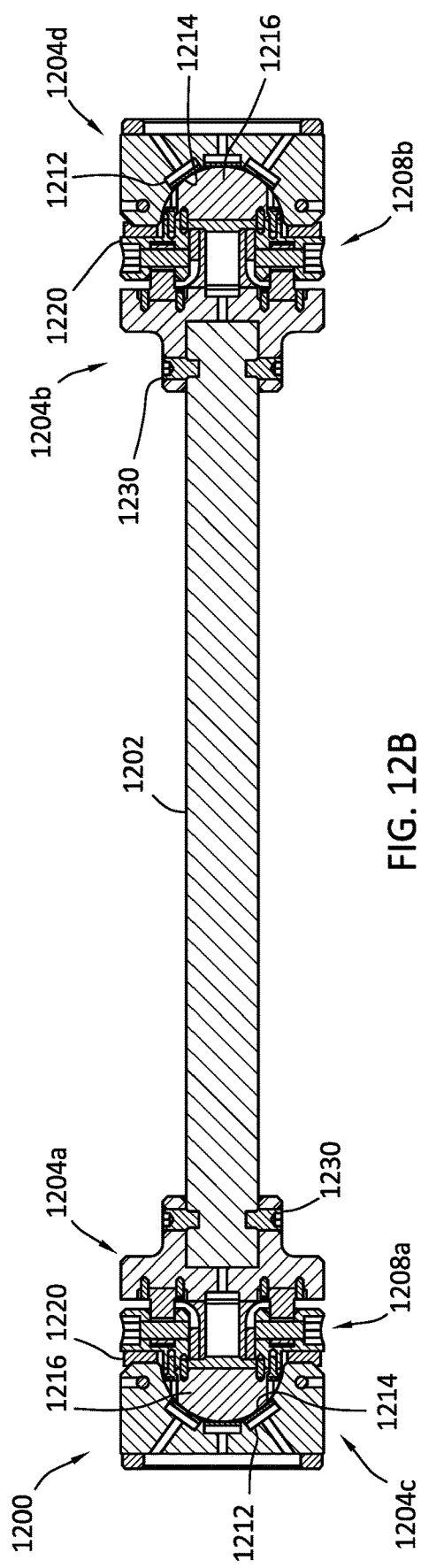
FIG. 12A
FIG. 12B

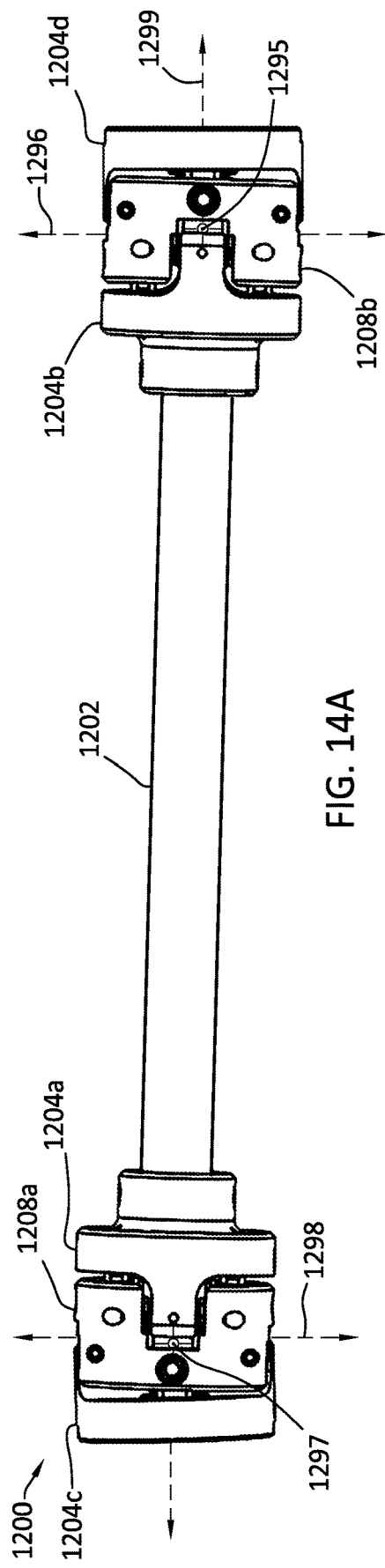
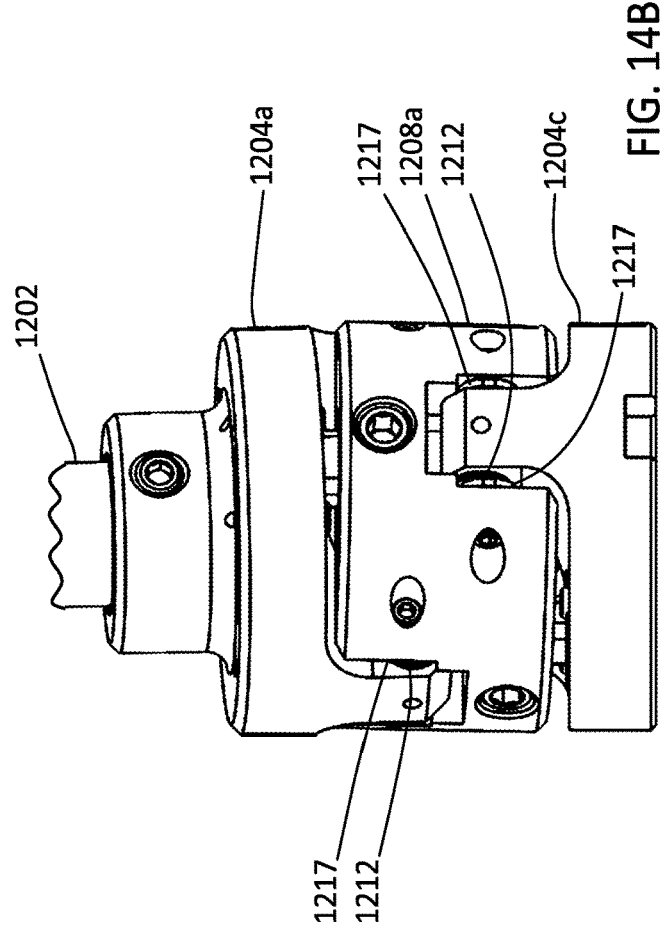
FIG. 14A
FIG. 14B

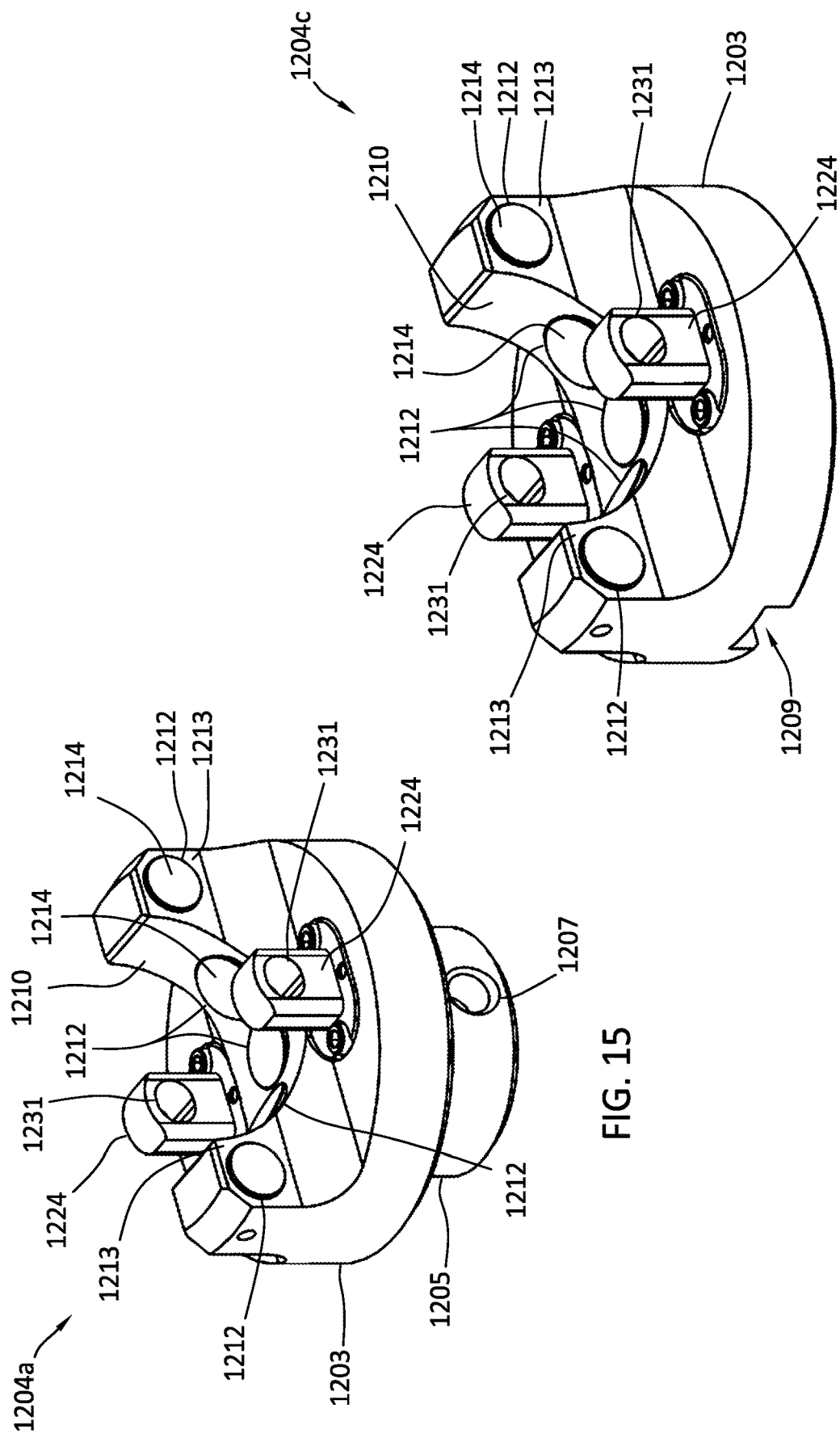

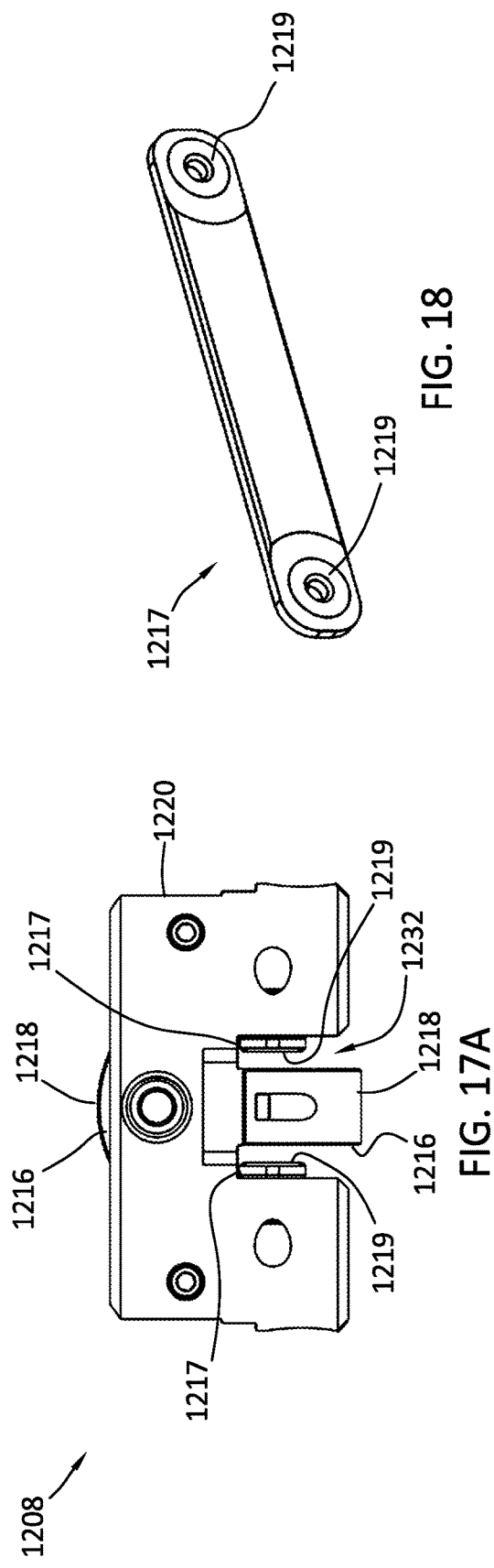
FIG. 17A
FIG. 17B
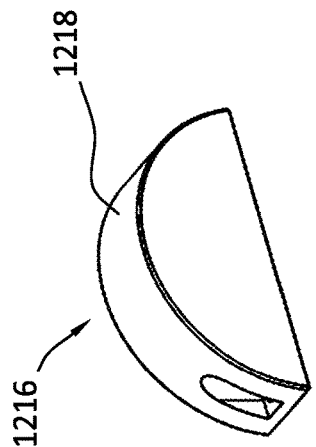
FIG. 18
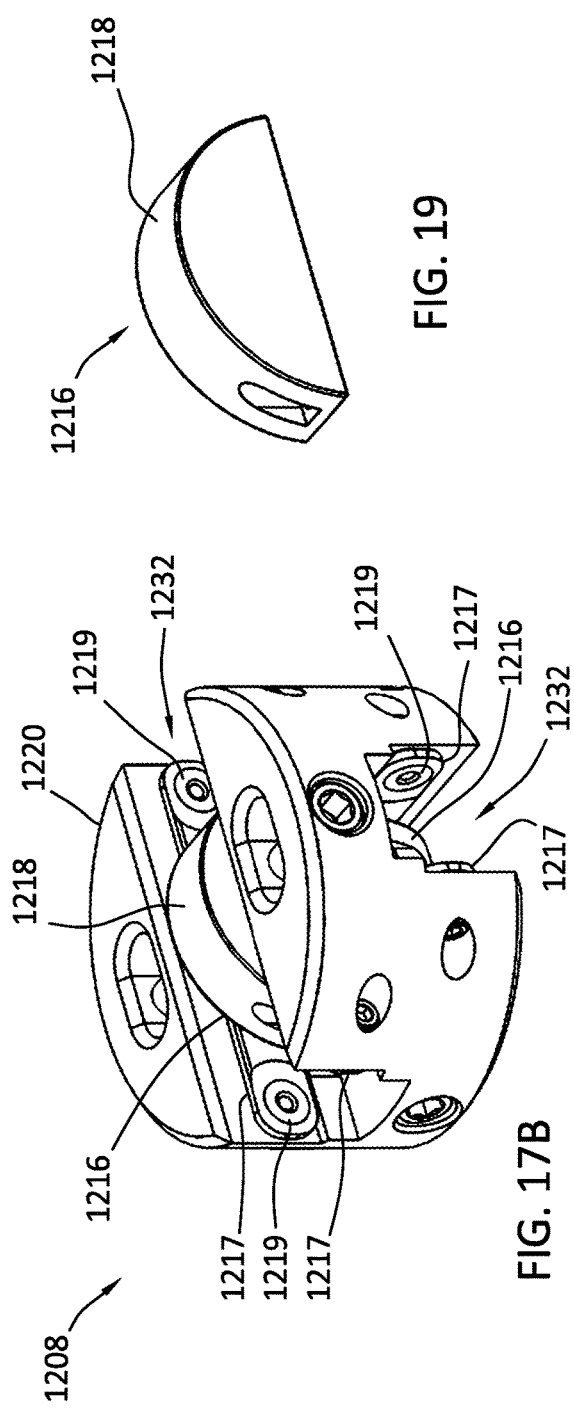
FIG. 19

JOINTS WITH DIAMOND BEARING SURFACES

CROSS-REFERENCE TO RELATED APPLICATIONS

The present application is a Continuation of U.S. patent application Ser. No. 17/574,099, filed on Jan. 12, 2022 (now allowed), which claims the benefit of U.S. Provisional Patent Application No. 63/137,037, filed on Jan. 13, 2021, and also claims priority, as a Continuation in Part, to U.S. patent application Ser. No. 17/399,640 (pending), filed on Aug. 11, 2021, which itself claims the benefit of U.S. Provisional Patent Application No. 63/064,272, filed on Aug. 11, 2020, the entireties of which are incorporated herein by reference. The U.S. application Ser. No. 17/574,099, filed on Jan. 12, 2022 (now allowed) also claims priority, as a Continuation-in-Part, to U.S. patent application Ser. No. 17/331,399 (now U.S. Pat. No. 11,274,731), filed on May 26, 2021, which itself is a Continuation of U.S. Pat. No. 11,054,000, issued on Jul. 6, 2021, the entireties of which are incorporated herein by reference.

FIELD

The present disclosure relates to joints with polycrystalline diamond bearing surfaces; to polycrystalline diamond power transmission surfaces in a driveline; to systems including the same; and to methods of making and using the same.

BACKGROUND

Mechanical power transmission systems transmit mechanical energy from one component or system to another component or system, such as to perform work. Mechanical power transmission systems can include a first component (e.g., a first gear) coupled with a second component (e.g., a second gear), such that when the first component moves at least some of the mechanical energy of the first component is transferred to the second component, causing the second component to correspondingly move. Often such systems include surfaces that are engaged with one another. For example, during movement of a first gear that is meshed with a second gear, at least a portion of the surfaces of the gear teeth of the first gear come into contact with at least a portion of the surfaces of the gear teeth of the second gear. However, mechanical power transmission systems, such as gears, are subject to failures, including material failures resulting from engagement between surfaces. Some exemplary types of gear failures include bending fatigue, contact fatigue, wear, scuffing, overload, and cracking.

Some drivelines use gear joint teeth, which do not function well when misalignment is present in the driveline. Also, such drivelines require sealing and lubrication to function properly.

Mechanical power transmission systems often include joints that provide for movement of such systems. Often, such joints include bearing surfaces for interfacing the engagements between various components.

When polycrystalline diamond (PCD) elements are used in moving parts, such as rotating machinery, typically both the engagement surface and the opposing engagement surface are composed of polycrystalline diamond. This is, at least in part, because thermally stable polycrystalline diamond (TSP), either supported or unsupported by tungsten carbide, and polycrystalline diamond compact (PDC) have been considered as contraindicated for use in the machining of diamond reactive materials. Diamond reactive materials include metals (including metal alloys) and composites (e.g., in the form of hardfacings, coatings, or platings) that contain more than trace amounts of diamond catalyst or solvent elements (also referred to as diamond solvent-catalysts or diamond catalyst-solvents). Diamond solvent-catalysts include iron, cobalt, nickel, ruthenium, rhodium, palladium, chromium, manganese, copper, titanium, and tantalum. Further, this prior contraindication of the use of polycrystalline diamond extends to so called "superalloys," including iron-based, cobalt-based and nickel-based superalloys containing more than trace amounts of diamond catalyst or solvent elements. At certain surface speeds in moving parts, load and attendant temperature generated, such as at a cutting tip, often exceeds the graphitization temperature of diamond (i.e., about 700° C.), which can, in the presence of diamond catalyst or solvent elements, lead to rapid wear and failure of components. Without being bound by theory, the specific failure mechanism is believed to result from the chemical interaction of the carbon bearing diamond with the carbon attracting material that is being machined. An exemplary reference concerning the contraindication of polycrystalline diamond for diamond catalyst or solvent containing metal or alloy machining is U.S. Pat. No. 3,745,623. The contraindication of polycrystalline diamond for machining diamond catalyst or diamond solvent containing materials has long caused the avoidance of the use of polycrystalline diamond in all contacting applications with such materials.

BRIEF SUMMARY

Some embodiments of the present disclosure include a power transmission system. The system includes a driveline with a shaft having a first end and a second end. A first articulable joint is coupled with the first end of the shaft such that the shaft is pivotable relative to the first articulable joint. The first articulable joint has multiple bearing surfaces, including a first polycrystalline diamond bearing surface engaged with a first metal bearing surface. The first metal bearing surface includes a metal that contains at least 2 wt. % of a diamond solvent-catalyst based on a total weight of the metal. The first polycrystalline diamond bearing surface has a surface finish of 20 µin Ra or less.

Some embodiments of the present disclosure include a power transmission system. The system includes a driveline with a shaft having a first end and a second end. A first articulable joint is coupled with the first end of the shaft such that the shaft is pivotable relative to the first articulable joint. The first articulable joint has multiple bearing surfaces, including a first polycrystalline diamond bearing surface engaged with a first metal bearing surface. The first metal bearing surface includes a metal that contains at least 2 wt. % of iron, cobalt, nickel, copper, titanium, ruthenium, rhodium, palladium, chromium, manganese, tantalum, or combinations thereof based on a total weight of the metal. The first polycrystalline diamond bearing surface has a surface finish of 20 µin Ra or less.

Some embodiments of the present disclosure include a method of power transmission. The method includes coupling a first articulable joint between a prime mover and a shaft of a driveline, such that the shaft is pivotable relative to the prime mover. The method includes coupling a second articulable joint between a driven component and the shaft of the driveline, such that the shaft is pivotable relative to the driven component. Each articulable joint includes multiple bearing surfaces, including polycrystalline diamond bearing surfaces engaged with metal bearing surfaces. The metal bearing surfaces include a metal that contains at least 2 wt. % of a diamond solvent-catalyst based on a total weight of the metal. The polycrystalline diamond bearing surfaces have surface finishes of 20 μin Ra or less. The method includes driving rotation of the shaft with the prime mover, and driving the driven component with the rotating shaft.

Some embodiments of the present disclosure include a method of power transmission. The method includes coupling a first articulable joint between a prime mover and a shaft of a driveline, such that the shaft is pivotable relative to the prime mover. The method includes coupling a second articulable joint between a driven component and the shaft of the driveline, such that the shaft is pivotable relative to the driven component. Each articulable joint includes multiple bearing surfaces, including polycrystalline diamond bearing surfaces engaged with metal bearing surfaces. The metal bearing surfaces include a metal that contains at least 2 wt. % of iron, cobalt, nickel, copper, titanium, ruthenium, rhodium, palladium, chromium, manganese, tantalum, or combinations thereof based on a total weight of the metal. The polycrystalline diamond bearing surfaces have surface finishes of 20 μin Ra or less. The method includes driving rotation of the shaft with the prime mover, and driving the driven component with the rotating shaft.

Some embodiments of the present disclosure include an articulable joint for coupling between power transmission components. The joint includes a first joint coupler having a first bearing surface, and a joint body having a second bearing surface and a third bearing surface. The joint body is pivotably coupled with the first joint coupler such that the first bearing surface is engaged with the second bearing surface. The joint includes a second joint coupler having a fourth bearing surface. The second joint coupler is pivotably coupled with the joint body such that the third bearing surface is engaged with the fourth bearing surface. One of the first and second bearing surfaces is a polycrystalline diamond bearing surface, and the other of the first and second bearing surfaces is a metal bearing surface. One of the third and fourth bearing surfaces is a polycrystalline diamond bearing surface, and the other of the third and fourth bearing surfaces is a metal bearing surface. Each metal bearing surface includes a metal that contains at least 2 wt. % of a diamond solvent-catalyst based on a total weight of the metal. Each polycrystalline diamond bearing has a surface finish of 20 μin Ra or less.

Some embodiments of the present disclosure include an articulable joint for coupling between power transmission components. The joint includes a first joint coupler having a first bearing surface, and a joint body having a second bearing surface and a third bearing surface. The joint body is pivotably coupled with the first joint coupler such that the first bearing surface is engaged with the second bearing surface. The joint includes a second joint coupler having a fourth bearing surface. The second joint coupler is pivotably coupled with the joint body such that the third bearing surface is engaged with the fourth bearing surface. One of the first and second bearing surfaces is a polycrystalline diamond bearing surface, and the other of the first and second bearing surfaces is a metal bearing surface. One of the third and fourth bearing surfaces is a polycrystalline diamond bearing surface, and the other of the third and fourth bearing surfaces is a metal bearing surface. Each metal bearing surface includes a metal that contains at least 2 wt. % of iron, cobalt, nickel, copper, titanium, ruthenium, rhodium, palladium, chromium, manganese, tantalum, or combinations thereof based on a total weight of the metal. Each polycrystalline diamond bearing has a surface finish of 20 μin Ra or less.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 3A depicts a worm gear meshed with a worm (also referred to as a worm screw), with the worm gear having polycrystalline diamond power transmission surfaces thereon.

FIG. 3B depicts another view of the worm gear meshed with the worm of FIG. 3A.

FIG. 3C depicts another view of the worm gear meshed with the worm of FIG. 3A.

FIG. 4D is a disassembled view of portions of the driveline of FIG. 4A.

FIG. 5D is a disassembled view of the driveline of FIG. 5A.

FIG. 5E is a view of the connection between two components of the double Cardan universal joint of FIG. 5A.

FIG. 5F is a cross-sectional view of a FIG. 5E.

FIG. 5G and FIG. 5H depict disassembled portions of the driveline of FIG. 5D.

FIG. 7A is a perspective view of a driveline including double conical joints with polycrystalline diamond power transmission surfaces.

FIG. 7B depicts a driveline including double conical joints with polycrystalline diamond power transmission surfaces.

FIGS. 8A-8E depict portions of a driveline, including double conical joints with polycrystalline diamond power transmission surfaces, at various stages of assembly of the driveline.

FIG. 9A is a side view of a portion of a driveline including double conical joints with polycrystalline diamond power transmission surfaces.

FIG. 9B is a cross sectional view of the driveline of FIG. 9A, along line 9B-9B.

FIG. 12A is a side view of a driveline in accordance with some embodiments of the present disclosure, with the driveline in a state of alignment.

FIG. 12B is a cross-sectional view of the driveline of FIG. 12A.

FIG. 14A is a side view of a driveline in accordance with some embodiments of the present disclosure, with the driveline in a state of misalignment.

FIG. 14B is a detail view of portions of the driveline of FIG. 14A.

FIG. 15 is a detail view of a driveline joint coupler in accordance with some embodiments of the present disclosure.

FIG. 16 is a detail view of another driveline joint coupler in accordance with some embodiments of the present disclosure.

FIGS. 17A and 17B are detail views of a driveline joint body in accordance with some embodiments of the present disclosure.

FIG. 18 is a detail view of a removable bearing surface of a driveline joint body in accordance with some embodiments of the present disclosure.

FIG. 19 is a detail view of another removable bearing surface of a driveline joint body in accordance with some embodiments of the present disclosure.

DETAILED DESCRIPTION

Figure 1A:
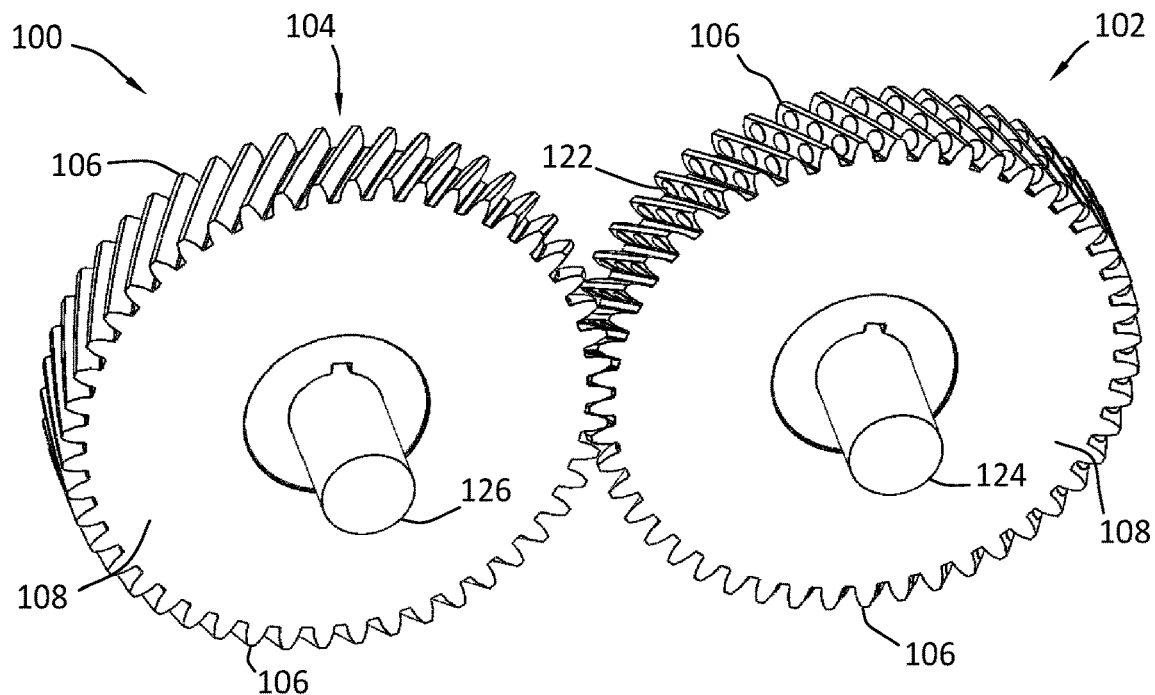
FIG. 1A depicts meshed, helical gears with one of the helical gears having polycrystalline diamond power transmission surfaces thereon.
Figure 1B:
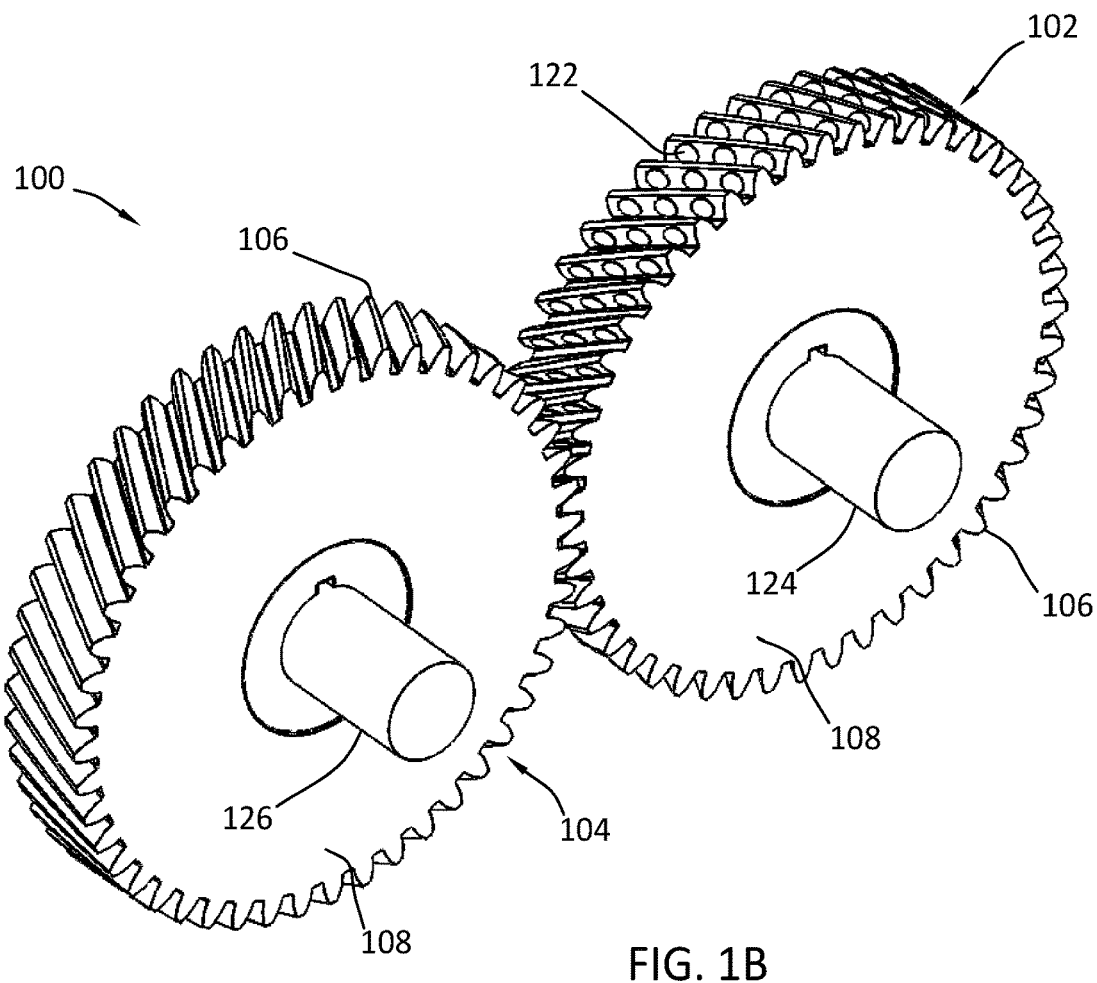
FIG. 1B depicts another view of the meshed, helical gears of FIG. 1A.
Figure 1C:
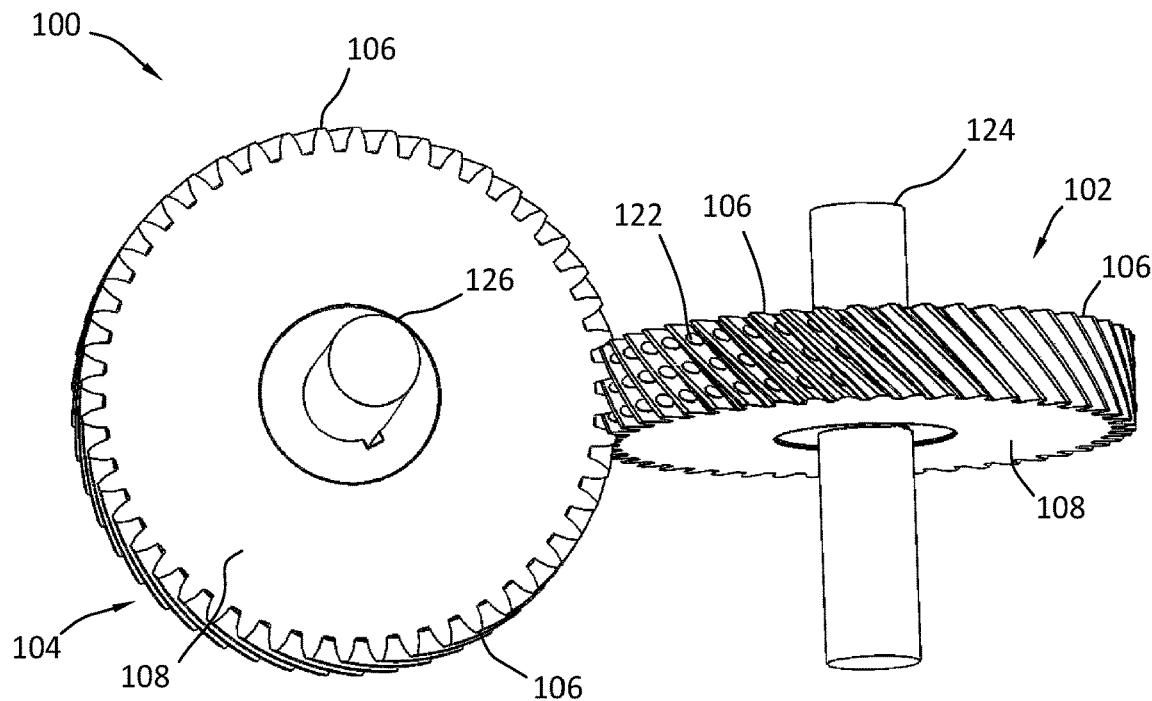
FIG. 1C depicts the meshed, helical gears the same as FIG. 1A, but coupled at a right angle.

Certain embodiments of the present disclosure include methods and apparatus for providing power transmission systems with polycrystalline diamond power transmission surfaces. The power transmission systems disclosed herein include, but are not limited to, gears and drivelines. The gears disclosed herein include, but are not limited to, helical gears, spur gears, and worm drives. The drivelines disclosed herein include, but are not limited to, mechanical couplings, including flexible mechanical couplings, between moving parts. The drivelines disclosed herein may include shaft couplings. In one exemplary embodiment, the drivelines disclosed herein include universal joints (e.g., single universal joints or single Cardan universal joints or double Cardan universal joints). The power transmission systems disclosed herein may be a component of a larger system, such as a drilling motor or a portion of a drivetrain. The power transmission systems disclosed herein are not limited to the particular applications discussed herein, and may be incorporated into other machinery that includes gears, drivelines, or other power transmission systems that include power transmission surfaces.

Power transmission surfaces (also referred to as power transfer surfaces) are surfaces of components within a power transmission system that engage for the transfer of mechanical energy (e.g., via the transfer of torque) between the components. For example, in a power transmission system that includes two gears that are meshed together, the power transmission surfaces include the gear tooth surfaces of the meshed gears that are or come into contact with one another during movement of the gears. Within this disclosure, when referring to engaged power transmission surfaces (e.g., meshed gear teeth), one power transmission surface may be referred to as a "power transmission surface" while the other may be referred to as an "opposing power transmission surface."

The present disclosure includes engaged power transmission surfaces where one of the power transmission surfaces includes polycrystalline diamond and the other, opposing power transmission surface does not include polycrystalline diamond. As described in more detail below, in some embodiments a first power transmission surface includes polycrystalline diamond, and a second, opposing power transmission surface includes a metal that contains more than trace amounts of diamond solvent-catalyst. In some embodiments, the opposing power transmission surface is a treated surface in accordance with U.S. Pat. No. 11,035,407. For example, the opposing power transmission surface (also referred to as the opposing engagement surface) may be hardened, such as via cold working and work hardening processes including burnishing and shot peening; and/or heat-treating processes including through hardening, case hardening, and subzero, cryogenic, deep-freezing treatments. Also, the opposing power transmission surface may be plated and/or coated, such as via electroplating, electroless plating, including chromium plating, phosphating, vapor deposition, including physical vapor deposition (PVD) and chemical vapor deposition (CVD); or anodizing. Also, the opposing power transmission surface may be cladded, such as via roll bonding, laser cladding, or explosive welding. In some embodiments, the polycrystalline diamond is formed via a CVD process. Throughout the descriptions of the embodiments in this disclosure, for the sake of brevity and simplicity, "diamond" is used to refer to "polycrystalline diamond."

In some embodiments, the power transmission surfaces disclosed herein are a portion of a motor, such as a drilling motor for downhole drilling, including directional drilling, such as a mud motor. The power transmission surfaces disclosed herein may be a surface of a gear (e.g., of a gearbox). While described in reference to downhole drilling applications, the power transmission surfaces disclosed herein may also be used in other applications. In some embodiments, the power transmission surfaces disclosed herein are a portion of a turbine, pump, compressor, mining equipment, construction equipment, combustion engine, windmill, automotive part, aircraft part, marine equipment, transmissions, rail cars, hard drives, centrifuges, medical equipment, robotics, machine tools, amusement rides, amusement devices, brakes, clutches, motors, or other assemblies that include power transmission systems.

Definitions, Examples, and Standards

Diamond Reactive Materials—As used herein, a "diamond reactive material" is a material that contains more than trace amounts of diamond catalyst or diamond solvent, which are also referred to as "diamond catalyst-solvent," "catalyst-solvent," "diamond solvent-catalyst," or "solvent-catalyst." Some examples of known diamond solvent-catalysts are disclosed in: U.S. Pat. Nos. 6,655,845; 3,745,623; 7,198,043; 8,627,904; 5,385,715; 8,485,284; 6,814,775; 5,271,749; 5,948,541; 4,906,528; 7,737,377; 5,011,515; 3,650,714; 2,947,609; and 8,764,295. As used herein, a material that contains more than "trace amounts" of diamond solvent-catalyst is a material that contains at least 2 percent by weight (wt. %) diamond solvent-catalyst based on a total weight of the material. In some aspects, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the diamond reactive material. As would be understood by one skilled in the art, diamond solvent-catalysts are chemical elements, compounds, or materials (e.g., metals) that are capable of reacting with polycrystalline diamond (e.g., catalyzing and/or solubilizing), resulting in the graphitization of the polycrystalline diamond, such as under load and at a temperature at or exceeding the graphitization temperature of diamond (i.e., about 700° C.). Thus, diamond reactive materials include materials that, under load and at a temperature at or exceeding the graphitization temperature of diamond, can lead to wear, sometimes rapid wear, and failure of components formed of or including polycrystalline diamond, such as diamond tipped tools. Diamond reactive materials include, but are not limited to, metals (including metal alloy), and composite materials that contain more than trace amounts of diamond solvent-catalysts. Some exemplary diamond solvent-catalysts include iron, cobalt, nickel, ruthenium, rhodium, palladium, chromium, manganese, copper, titanium, tantalum, and alloys thereof. Thus, a diamond reactive material may be a material that includes more than trace amounts of iron, cobalt, nickel, ruthenium, rhodium, palladium, chromium, manganese, copper, titanium, tantalum, or alloys thereof. One exemplary diamond reactive material is steel.

In some aspects, the diamond reactive materials are in the form of hardfacings, coatings, or platings on another material, such that the diamond reactive material forms the opposing engagement surface. In such embodiments, the hardfacing, coating, or plating includes the diamond reactive material. In some such embodiment, the material underlying the hardfacing, coating, or plating is not a diamond reactive material. In other such embodiments, the material underlying the hardfacing, coating, or plating is a diamond reactive material (the same or different than the overlying hardfacing, coating, or plating).

In some aspects, the diamond reactive material is a superalloy including, but not limited to, an iron-based superalloy, a cobalt-based superalloy, or a nickel-based superalloy.

The diamond reactive material disclosed herein may be a metal or metal alloy (collectively referred to herein as a "metal" or a "metallic material") having a metal surface. As would be understood by one skilled in the art, metals include materials that contain metal atoms that are typically characterized by metallic bonding between the metal atoms. That is, metals can be characterized as having metal atoms that are chemically bonded together, with at least predominantly metallic bonding between the metal atoms (e.g., in a crystalline structure of the metal atoms). The metals disclosed herein are not ceramics (e.g., carbides, oxides, nitrides, natural diamond), plastics, or composites (e.g., ceramic matrix composites or metal matrix composites, such as cermets, cemented carbide cobalt composites, PCD cobalt binder composites, CBN cobalt binder composites). In some embodiments the metal is a metal alloy. In other embodiments the metal is not a metal alloy (i.e., contains a single metal). The metal may be ferrous or a ferrous alloy. For example, the metal may be iron or an iron alloy, such as cast iron or steel, such as stainless steel, carbon steel, tool steel, or alloy steels. The metal may be non-ferrous or a non-ferrous alloy. For example, the metal may be nickel or a nickel alloy, cobalt or a cobalt alloy, copper or a copper alloy, titanium or a titanium alloy, ruthenium or a ruthenium alloy, rhodium or a rhodium alloy, palladium or a palladium alloy, chrome or a chrome alloy, manganese or a manganese alloy, or tantalum or a tantalum alloy. In embodiments where the diamond reactive material is a metal, the opposing bearing surface is a metal surface.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of metal based on a total weight of the diamond reactive material, or any value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of metal based on a total weight of the diamond reactive material.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the diamond reactive material, or any value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the diamond reactive material.

In some embodiments, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. Superhard materials are materials with a hardness value exceeding 40 gigapascals (GPa) when measured by the Vickers hardness test. The diamond reactive materials disclosed herein are softer than a superhard material. For example, the diamond reactive materials disclosed herein may have a hardness value of less than 40 GPa, or less than 35 GPa, or less than 30 GPa, or less than 25 GPa, or less than 20 GPa, or less than 15 GPa, or less than 10 GPa, or less than 8 GPa, or less than 6 GPa, or less than 5 GPa, or less than 4 GPa, or less than 3 GPa, or less than 2 GPa, or less than 1 GPa when measured by the Vickers hardness test. The diamond reactive materials disclosed herein include materials that are softer than tungsten carbide (WC), which has a hardness of about 25 GPa. The diamond reactive materials disclosed herein include materials that are softer than tungsten carbide tiles, cemented tungsten carbide, and infiltrated tungsten carbide. The diamond reactive materials disclosed herein include materials that are softer than silicon carbide, silicon nitride, cubic boron nitride, and polycrystalline diamond. One skilled in the art would understand that hardness may be determined by different tests, including a Brinell scale test in accordance with ASTM E10-18; the Vickers hardness test in accordance with ASTM E92-17; the Rockwell hardness test in accordance with ASTM E18; and the Knoop hardness test in accordance with ASTM E384-17.

Interfacing Polycrystalline Diamond with Diamond Reactive Materials—In some embodiments, the present disclosure provides for interfacing the contact between a first power transmission surface that includes a polycrystalline diamond surface and a second power transmission surface that includes a metal surface containing more than trace amounts of diamond solvent-catalyst. For example, the polycrystalline diamond surface may be positioned and arranged on or as the first power transmission surface for sliding and/or rolling contact with the metal surface. As used herein, "engagement surface" refers to the surface of a material or component (e.g., a surface of polycrystalline diamond or diamond reactive material) that is positioned and arranged within a power transmission system such that, in operation of the power transmission system (e.g., a gearbox), the engagement surface interfaces the contact between two components (e.g., between two gears in a gearbox). In some embodiments, the power transmission surface disclosed herein is in direct contact with an opposing power transmission surface without a fluid film therebetween (i.e., boundary lubrication). In some embodiments, a fluid film may develop between the power transmission surface and the opposing power transmission surface such that the surfaces are not directly in contact with one another, but are engaged through the fluid film (i.e., hydrodynamic lubrication). In some aspects, the contact between the power transmission surface and opposing power transmission surface is between (or a mixture of) direct contact and fluid film (i.e., mixed boundary lubrication).

Lapped or Polished—In certain applications, the polycrystalline diamond, or at least the engagement surface thereof, is lapped or polished, optionally highly lapped or highly polished. Although highly polished polycrystalline diamond is used in at least some applications, the scope of this disclosure is not limited to highly polished polycrystalline diamond and includes polycrystalline diamond that is highly lapped or polished. As used herein, a surface is defined as "highly lapped" if the surface has a surface roughness of 20 µin Ra or about 20 µin Ra, such as a surface roughness ranging from about 18 to about 22 µin Ra. As used herein, a surface is defined as "polished" if the surface has a surface roughness of less than about 10 µin Ra, or of from about 2 to about 10 µin Ra. As used herein, a surface is defined as "highly polished" if the surface has a surface roughness of less than about 2 µin Ra, or from about 0.5 µin Ra to less than about 2 µin Ra. In some aspects, the polycrystalline diamond engagement surfaces disclosed herein have a surface roughness ranging from 0.5 µin to 20 µin Ra, or from 2 µin to 18 µin Ra, or from 5 µin to 15 µin Ra, or from 8 µin to 12 µin Ra, or less than 20 µin Ra, or less than 18 µin Ra, or less than 10 µin Ra, or less than 2 µin Ra, or any range or discrete value therebetween. Without being bound by theory, it is believed that polycrystalline diamond that has been polished to a surface roughness of 0.5 µin Ra has a coefficient of friction that is less than (e.g., about half or more than half) of standard lapped polycrystalline diamond that has a surface roughness of 20-40 µin Ra. U.S. Pat. Nos. 5,447,208 and 5,653,300 to Lund et al. provide disclosure relevant to polishing of polycrystalline diamond. As would be understood by one skilled in the art, surface roughness, also referred to as surface texture or surface topography, is a characteristic of a surface as defined by lay, surface roughness, and waviness. Surface finish may be determined in accordance with ASME B46.1-2009. Surface finish or roughness may be measured with a profilometer, laser microscope, or with Atomic Force Microscopy, for example.

In some embodiments, the metal surfaces disclosed herein have a surface finish of from 0.5 to 2,000 µin Ra, or from 1 to 1,900 µin Ra, or from 5 to 1,500 µin Ra, or from 10 to 1,200 µin Ra, or from 50 to 1,000 µin Ra, or from 100 to 800 µin Ra, or from 200 to 600 µin Ra. In some embodiments, the metal surfaces disclosed herein have a surface finish of 16 µin Ra or less, or 12 µin Ra or less, or 8 µin Ra or less. In some embodiments, the metal surfaces disclosed are polished or otherwise treated to provide the metal surfaces with a reduced surface roughness. In some embodiments, the metal surfaces disclosed herein have a surface finish that is greater than the surface finish of the diamond surfaces disclosed herein (i.e., the metal surfaces are rougher than the diamond surfaces).

In some embodiments, the coefficient of friction (CoF) exhibited by the engagement between the diamond surfaces and the metal surfaces disclosed herein is less than 0.1, 0.09 or less, 0.08 or less, 0.07 or less, 0.06 or less, 0.05 or less, 0.04 or less, 0.03 or less, 0.02 or less, or 0.01 or less. In some embodiments, the CoF exhibited by the engagement between the diamond surfaces and the metal surfaces disclosed herein ranges from 0.01 to 0.09, or 0.01 to 0.07, or 0.01 to 0.05, or 0.01 to 0.03, or any range or value therebetween.

Helical Gears

Some embodiments of the present disclosure include power transmission systems that include meshed gears or cogwheels. In one exemplary embodiment, the meshed gears are helical gears.

Figure 1D:
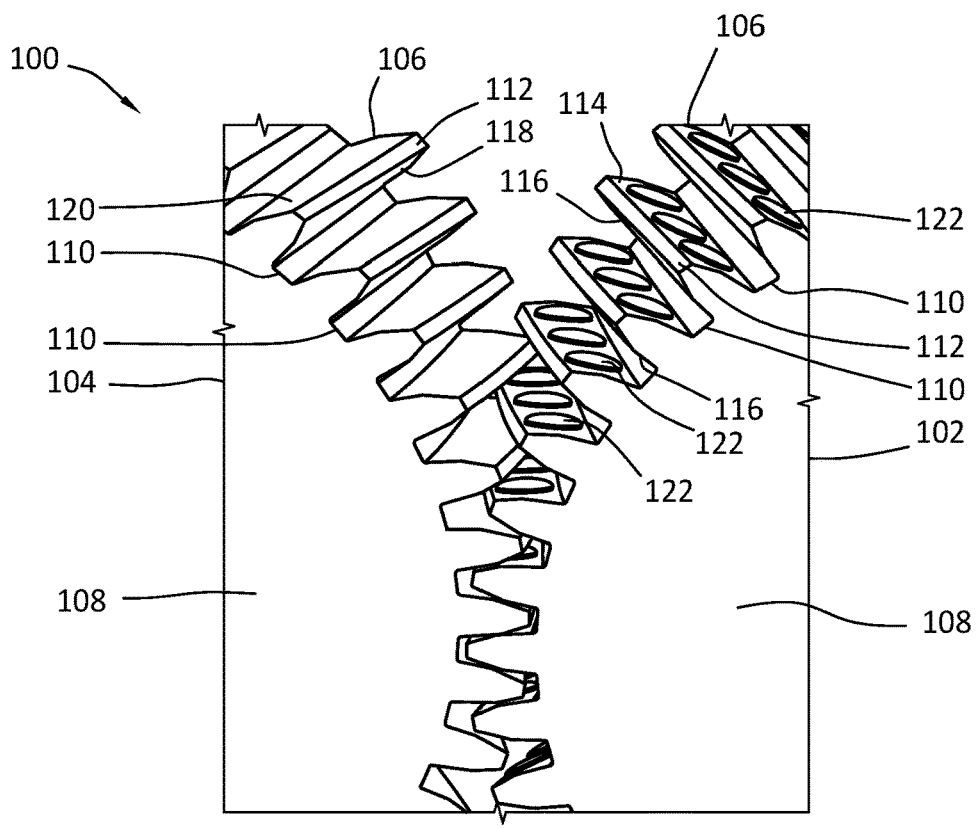
FIG. 1D depicts a detail view of meshed, helical gears of FIG. 1A.

With reference to FIGS. 1A-1D, pairs of meshed helical gears are depicted. Meshed gears 100 may be a portion of a power transmission system. Meshed gears 100 include first gear 102 and second gear 104, each of which is a helical gear. First gear 102 and second gear 104 are meshed together such that, in operation, mechanical power is transferred from one of first gear 102 and second gear 104 to the other of first gear 102 and second gear 104. Each of first gear 102 and second gear 104 includes a plurality of teeth 106 protruding from a gear body 108 and extending about the outer circumference thereof. As shown in FIG. 1D, each gear tooth 106 extends from gear body 108 between two adjacent root surfaces 110, and includes a gear top land 112. Each gear tooth 106 of first gear 102 includes a first gear tooth surface 114 extending from one adjacent root surface 110 to the gear top land 112 thereof, and a second gear tooth surface 116 extending from another adjacent root surface 110 to the gear top land 112 thereof. Each gear tooth 106 of second gear 104 includes a first gear tooth surface 118 extending from one adjacent root surface 110 to the gear top land 112 thereof, and a second gear tooth surface 120 extending from another adjacent root surface 110 to the gear top land 112 thereof. First gear tooth surface 114 of first gear 102 includes polycrystalline diamond surfaces 122 thereon. While shown as including three discrete polycrystalline diamond surfaces 122 on each first gear tooth surface 114, the present disclosure is not limited to including this arrangement, and may include more or less than three discrete polycrystalline diamond surfaces. In some embodiments, the entirety of first gear tooth surface 114 is polycrystalline diamond. In other embodiments, less than an entirety of first gear tooth surface 114 is polycrystalline diamond. First gear 102 and second gear 104 are meshed such that polycrystalline diamond surfaces 122 of first gear 102 engage with first gear tooth surface 118 of second gear 104. Second gear tooth surface 118 includes a metal that contains more than trace amounts of diamond solvent-catalyst. For example, second gear tooth surface 118 may be a steel surface. In some embodiments, both of first gear and second gear are or include a metal that contains more than trace amounts of diamond solvent-catalyst, with the provision that at least one of the first and second gears has polycrystalline diamond elements coupled therewith to provide power transmission surfaces thereon. While polycrystalline diamond surfaces 122 are shown only on one of the gear tooth surfaces of meshed gears 100 (i.e., on first gear tooth surface 114), the present disclosure is not limited to such an arrangement. For example, in some embodiments, second gear tooth surface 116 of first gear 102 may also include polycrystalline diamond surfaces thereon for engagement with second gear tooth surface 120 of second gear 104 that includes a metal that contains more than trace amounts of diamond solvent-catalyst. In other embodiments, second gear tooth surface 120 may include polycrystalline diamond surfaces for engagement with second gear tooth surface 116 of first gear 102. For example, in one embodiment both of surfaces 114 and 116 are or include polycrystalline diamond surfaces, while both of surfaces 118 and 120 are or include a metal that contains more than trace amounts of diamond solvent-catalyst, such that, regardless of whether the meshed gears 100 rotate clockwise or counterclockwise, the polycrystalline diamond surfaces are engaging with the metal surfaces. In another embodiment, surfaces 114 and 120 are or include polycrystalline diamond surfaces, while surfaces 116 and 118 are or include metal that contain more than trace amounts of diamond solvent-catalyst, such that, regardless of whether the meshed gears 100 rotate clockwise or counterclockwise, the polycrystalline diamond surfaces are engaging with the metal surfaces.

First gear 102 is coupled with gear axle 124, and second gear 104 is coupled with gear axle 126. In one exemplary operation, rotation of gear axle 124 causes first gear 102 to rotate, rotation of first gear 102 causes second gear 104 to rotate, and rotation of second gear 104 causes gear axle 126 to rotate. First gear 102 and second gear 104 may be coupled with a first component at a drive end thereof and with a second component at a driven end thereof. Some exemplary components that may be coupled with the first and second gears 102,104 at the drive end include, but are not limited to, an electric motor, an internal combustion engine, a gas turbine engine, a wind turbine, a water turbine, a steam turbine, a hydraulic motor, and a drilling motor turbine. The component at the drive end rotates the first gear. For example, the component at the drive end may be coupled with gear axle 124, and may drive rotation of gear axle 124, which drives rotation of first gear 102, which drives rotation of second gear 104, which drives rotation of gear axle 126. At the driven end, gear axle 126 may be coupled with a component that is driven by first and second gears 102,104. Some exemplary driven end components include, but are not limited to, a pump, generator, driveline, machine tool spindle or chuck, wench, drill bit, power take off unit, propeller shaft, axle shaft, or other mechanical equipment that performs work. One skilled in the art would understand that numerous and various components may be driven by the gear assemblies disclosed herein. During rotation of first gear 102, gear teeth 106 of first gear 102 engage between gear teeth 106 of second gear 104, such that first gear teeth surfaces 114 with polycrystalline diamond surfaces 122 engage (e.g., in sliding and/or rolling contact) with first gear teeth surfaces 118 of second gear 104. As such, during rotation of meshed gears 100, the polycrystalline diamond surfaces 122 engage, in sliding and/or rolling contact, with the metal of first gear teeth surfaces 118. The power transmissions surfaces disclosed herein are not limited to being in sliding or rolling contact, and may be movingly engaged in other manners where the engagement surface and opposing engagement surface are in contact and apply pressure to one another.

Spur Gears

Figure 2A:
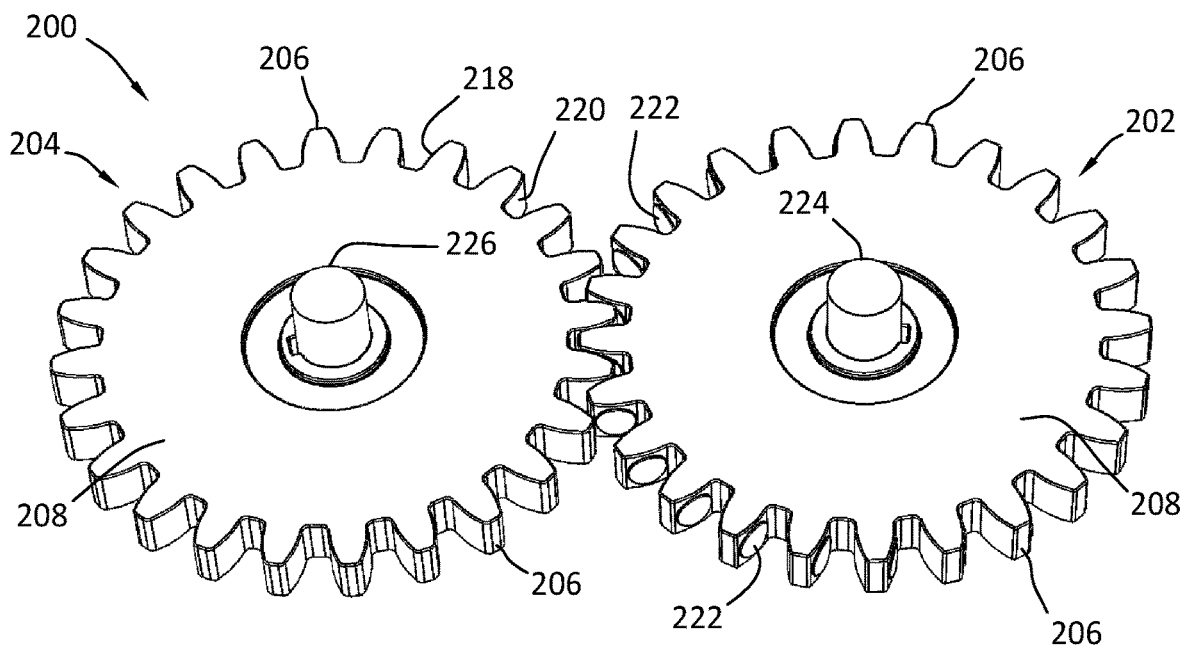
FIG. 2A depicts meshed, spur gears with one of the spur gears having polycrystalline diamond power transmission surfaces thereon.
Figure 2B:
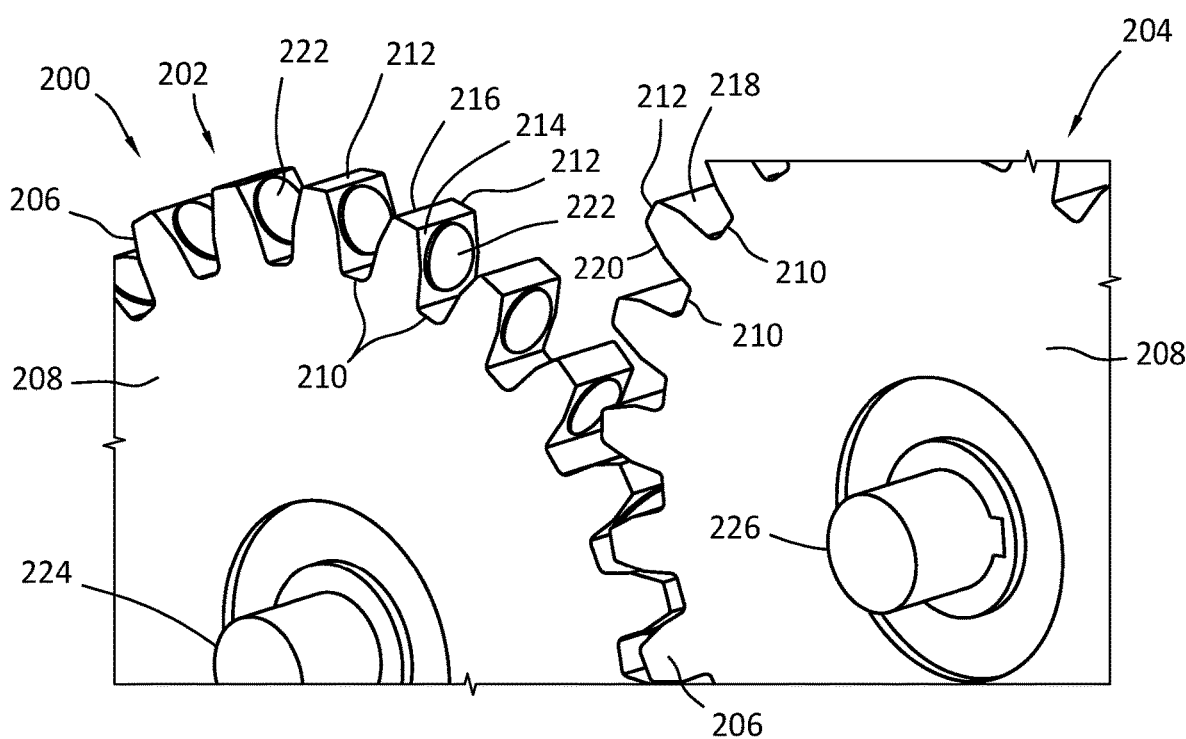
FIG. 2B depicts a detail view of the meshed, spur gears of FIG. 2A.

In one exemplary embodiment, the power transmission systems disclosed herein include meshed spur gears that include power transmission surfaces. With reference to FIGS. 2A and 2B, meshed spur gears 200 include first gear 202 and second gear 204, each of which is a spur gear. First gear 202 and second gear 204 are meshed together such that, in operation, mechanical power is transferred from one of first gear 202 and second gear 204 to the other of first gear 202 and second gear 204. Each of first gear 202 and second gear 204 includes a plurality of teeth 206 protruding from a gear body 208. As shown in FIG. 2B, each gear tooth 206 extends from gear body 208 between two adjacent root surfaces 210, and includes a gear top land 212. Each gear tooth 206 of first gear 202 includes a first gear tooth surface 214 extending from one adjacent root surface 210 to the gear top land 212 thereof, and a second gear tooth surface 216 extending from another adjacent root surface 210 to the gear top land 212 thereof. Each gear tooth 206 of second gear 204 includes a first gear tooth surface 218 extending from one adjacent root surface 210 to the gear top land 212 thereof, and a second gear tooth surface 220 extending from another adjacent root surface 210 to the gear top land 212 thereof. First gear tooth surface 214 of first gear 202 includes polycrystalline diamond surfaces 222 thereon. While shown as including one discrete polycrystalline diamond surface 222 on each first gear tooth surface 214, the present disclosure is not limited to including this arrangement, and may include more than one discrete polycrystalline diamond surfaces. In some embodiments, the entirety of first gear tooth surface 214 is polycrystalline diamond. In other embodiments, less than an entirety of first gear tooth surface 214 is polycrystalline diamond. First gear 202 and second gear 204 are meshed such that first gear tooth surface 214 of first gear 202 engages with first gear tooth surface 218 of second gear 204. Second gear tooth surface 218 includes a metal that contains more than trace amounts of diamond solvent-catalyst. While polycrystalline diamond surfaces 222 are shown only on one of the gear tooth surfaces of meshed gears 200 (i.e., on first gear tooth surface 214), the present disclosure is not limited to such an arrangement. For example, in some embodiments, second gear tooth surface 216 of first gear 202 may also include polycrystalline diamond surfaces thereon for engagement with second gear tooth surface 220 of second gear 204 that includes the metal. In other embodiments, second gear tooth surface 220 may include polycrystalline diamond surfaces for engagement with second gear tooth surface 216 of first gear 202. For example, in one embodiment both of surfaces 214 and 216 are or include polycrystalline diamond surfaces, while both of surfaces 218 and 220 are or include a metal that contains more than trace amounts of diamond solvent-catalyst, such that, regardless of whether the meshed gears 200 rotate clockwise or counterclockwise, the polycrystalline diamond surfaces are engaging with the metal surfaces. In another embodiment, surfaces 214 and 220 are or include polycrystalline diamond surfaces, while surfaces 216 and 218 are or include the metal, such that, regardless of whether the meshed gears 200 rotate clockwise or counterclockwise, the polycrystalline diamond surfaces are engaging with the metal surfaces. First gear 202 is coupled with gear axle 224, and second gear 204 is coupled with gear axle 226. In one exemplary operation, rotation of gear axle 224 causes first gear 202 to rotate, rotation of first gear 202 causes second gear 204 to rotate, and rotation of second gear 204 causes gear axle 226 to rotate. During rotation of first gear 202, gear teeth 206 of first gear 202 engage between gear teeth 206 of second gear 204, such that first gear teeth surfaces 214 with polycrystalline diamond surfaces 222 engage (e.g., in sliding and/or rolling contact) with first gear teeth surfaces 218 of second gear 204. As such, during rotation of meshed gears 200, the polycrystalline diamond surfaces 222 engage, in sliding and/or rolling contact, with the metal of first gear teeth surfaces 218.

Worm Drive

In one exemplary embodiment, the power transmission systems disclosed herein include a worm drive, including a worm meshed with a worm gear, with the worm and worm gear including power transmission surfaces. With reference to FIGS. 3A-3C, worm drive 300 includes worm 301 and worm gear 303. Worm gear 303 may be the same or substantially similar to a spur gear. Worm 301 may be similar to a screw. Worm 301 is meshed with worm gear 303 such that, in operation, mechanical power is transferred from one of worm 301 and worm gear 303 to the other of worm 301 and worm gear 303. Worm 301 includes gear tooth 307 that extends about a full rotation of worm 301. Gear tooth 307 is similar to screw threading, extending helically about axle 326 of worm 301 from position 311a to position 311b. Gear tooth 307 extends from root surface 309, and includes gear top land 313. Gear tooth 307 includes first gear tooth surface 318 and second gear surface 320. Worm gear 303 includes a plurality of teeth 306 protruding from a gear body 308. As shown in FIG. 3B, each gear tooth 306 extends from gear body 308 between two adjacent root surfaces 310, and includes a gear top land 312. Each gear tooth 306 of worm gear 303 includes a first gear tooth surface 314 extending from one adjacent root surface 310 to the gear top land 312 thereof, and a second gear tooth surface 316 extending from another adjacent root surface 310 to the gear top land 312 thereof. First gear tooth surface 314 of worm gear 303 includes polycrystalline diamond surfaces 322 thereon. While shown as including two discrete polycrystalline diamond surfaces 322 on each first gear tooth surface 314, the present disclosure is not limited to including this arrangement, and may include more or less than two discrete polycrystalline diamond surfaces. In some embodiments, the entirety of first gear tooth surface 314 is polycrystalline diamond. In other embodiments, less than an entirety of first gear tooth surface 314 is polycrystalline diamond. Worm 301 and worm gear 303 are meshed such that first gear tooth surface 314 of worm gear 303 engages with first gear tooth surface 318 of worm 301. Second gear tooth surface 318 includes a metal that contains more than trace amounts of diamond solvent-catalyst (e.g., steel). While polycrystalline diamond surfaces 322 are shown only on one of the gear tooth surfaces of meshed gears 300, the present disclosure is not limited to such an arrangement. For example, in some embodiments, second gear tooth surface 316 of worm gear 303 may also include polycrystalline diamond surfaces thereon for engagement with second gear tooth surface 320 of worm 301 that includes the metal. In other embodiments, second gear tooth surface 320 may include polycrystalline diamond surfaces for engagement with second gear tooth surface 316 of worm wheel 303. In such embodiments, regardless of whether the worm drive 300 rotates clockwise or counterclockwise, the polycrystalline diamond surfaces are engaging with the metal surfaces. Worm gear 303 is coupled with gear axle 324, and worm 301 is coupled with gear axle 326. In one exemplary operation, rotation of gear axle 326 causes worm 301 to rotate, rotation of worm 301 causes worm gear 303 to rotate, and rotation of worm gear 303 causes gear axle 324 to rotate. During rotation of meshed gears 300, gear teeth 306 of worm gear 303 engage between surfaces 318 and 320 of gear tooth 307 of worm 301, such that first gear teeth surfaces 314 with polycrystalline diamond surfaces 322 engage (e.g., in sliding and/or rolling contact) with first gear teeth surface 318 of worm 301. As such, during rotation of meshed gears 300, the polycrystalline diamond surfaces 322 engage, in sliding and/or rolling contact, with the metal of first gear teeth surfaces 318.

While the gears shown and described in FIGS. 1A-3C include particular embodiments of helical gears, spur gears, and worm drives, the present disclosure is not limited to these particular embodiments, and the disclosed power transmission surfaces with polycrystalline diamond may be incorporated into other gears. For example, and without limitation, the power transmission surfaces with polycrystalline diamond may be incorporated into spur gears, helical gears, skew gears, double helical gears, bevel gears, spiral bevel gears, hypoid gears, crown gears, worm drives, non-circular gears, rack and pinion gears, epicyclic gears, sun and planet gears, harmonic gears, cage gears, and cycloidal gears. Also, while shown herein as gears having cut teeth, the power transmission surfaces with polycrystalline diamond may be incorporated into cogwheels having inserted teeth. Further, while the gears shown herein are external gears with teeth on the outer surface, the power transmission surfaces with polycrystalline diamond may be incorporated into internal gears with teeth on the inner surface.

Mechanical Couplings

Some embodiments of the present disclosure include power transmission systems that include mechanical couplings, including flexible mechanical couplings. Some exemplary mechanical couplings include, but are not limited to, jaw couplings, claw couplings, and knuckle joints. In some embodiments, the mechanical couplings disclosed herein include universal joints, which are sometimes referred to as universal couplings, U-joints, Cardan joints, Spicer joints, Hardy Spicer joints, and Hooke's joints. Universal joints are joints used for connecting rigid rods together that have axes that are at least sometimes inclined and/or offset relative to one another. Some exemplary assemblies that include flexible mechanical couplings are constant velocity drivelines, propeller (prop) shafts, universal joint shafts, and double Cardan shafts.

Figure 4A:
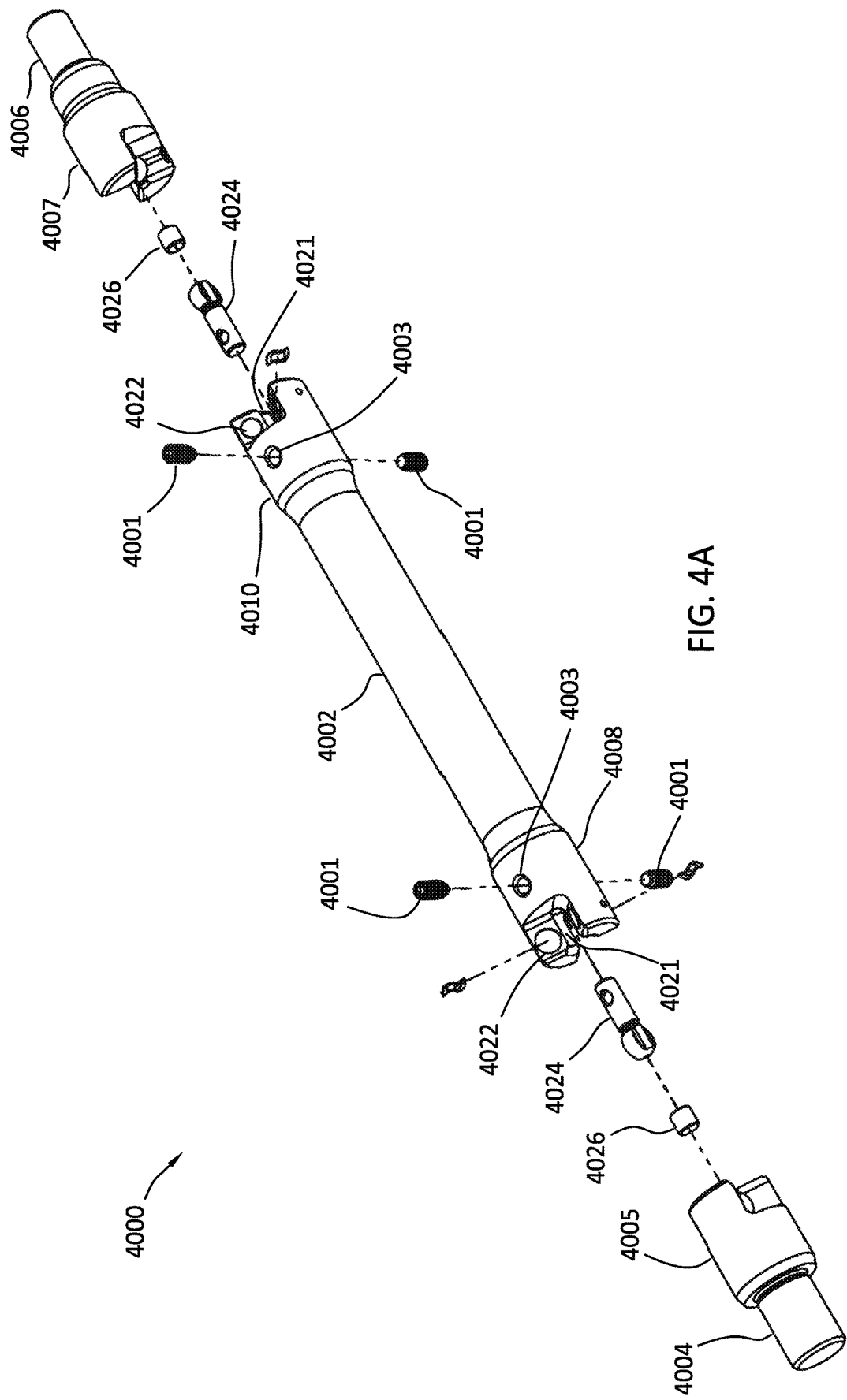
FIG. 4A is an exploded view of a portion of a driveline having an elongated universal joint with polycrystalline diamond power transmission surfaces thereon.
Figure 4B:
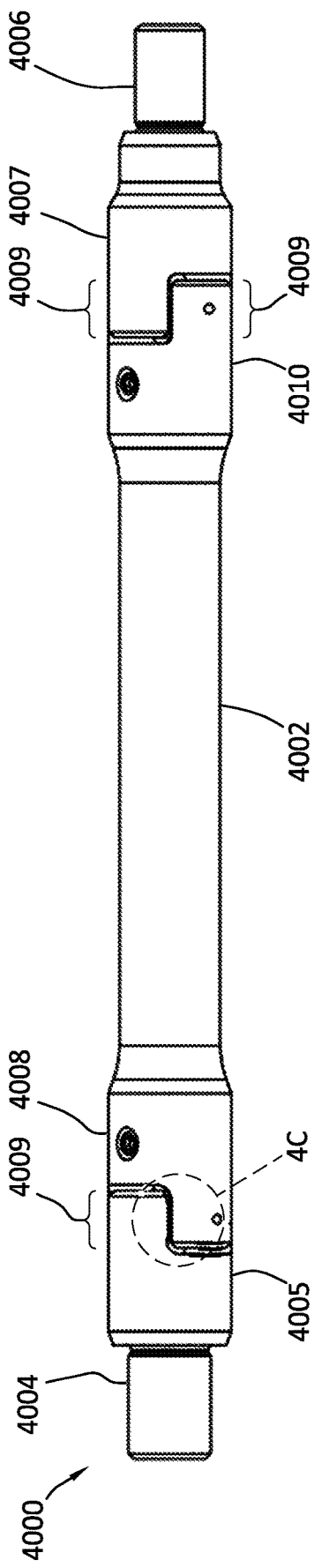
FIG. 4B is an assembled view of the portion of the driveline of FIG. 4A.

In some embodiments, the power transmission system disclosed herein includes an elongated universal joint for use in driveline applications, such as for use in drilling motors. With reference to FIGS. 4A-4D, a portion of an assembly having an elongated universal joint for use in driveline applications is depicted. Assembly 4000 includes shaft 4002. Shaft 4002 includes a hinge on each end thereof, including hinge 4008 and hinge 4010. As shown in FIG. 4B, hinge 4008 may be coupled with hinge 4005, which is coupled or integral with shaft 4004. Also, hinge 4010 may be coupled with hinge 4007, which is coupled or integral with shaft 4006. Also shown in the exploded view of FIG. 4A are set screws 4001, threaded holes 4003, locking pin 4024, and cups 4026. Locking pins 4024 have a ball end for mechanically coupling hinges 4008 and 4010 together and coupling hinges 4005 and 4007 together, and for providing a spherical bearing surface along with locating a pivot point for the hinges to rotate about. When assembled, the locking pins 4024 are turned 90 degrees to mechanically couple the respective hinges together. Set screws 4001 are then tightened to fix the position of the locking pins 4024 to prevent the two mating hinges from separating during operation. Cups 4026 have spherical cups machined therein and function as locaters for pivot points and as spherical bearing surfaces. Hinges 4008 and 4010 couple with hinges 4005 and 4007, respectively, via meshing the teeth 4009 thereof together. In at least some respects, hinges 4008, 4010, 4005, and 4007 are or are similar to gears, and function the same as or similar to gears in that the "teeth" of hinges mesh together for the transfer mechanical energy therebetween. The coupling of hinges 4008, 4010, 4005, and 4007 is the same as or similar to Hirth couplings or Curvic couplings.

Shaft 4004 may be coupled with or a portion of, for example, a motor that drives shaft 4004. When hinge 4005 is coupled with hinge 4008, rotation of shaft 4004 causes shaft 4002 to rotate. When hinge 4010 is coupled with hinge 4007, rotation of shaft 4002 causes shaft 4006 to rotate. Shaft 4006 may be coupled with or a portion of a component that is driven by assembly, such as a drill bit.

Each tooth of hinges 4008 and 4010 has tooth surfaces 4040 extending between root surface 4041 and top landing 4043. At least one tooth surface 4040 of each of hinges 4008 and 4010 has a polycrystalline diamond 4022 thereon. One of two adjacent teeth 4009 of hinges 4008 and 4010 has a polycrystalline diamond 4022 thereon and the other has a spring 4021 (here shown as a wave spring) thereon, providing compliance to assembly 4000 and reducing impact due to backlash as during transient events, such as at startup or shut-down. While not shown, the opposite side of hinges 4008 and 4010 may have the same arrangement. The tooth surfaces 4030 of hinges 4005 and 4007 include a metal that contains more than trace amounts of diamond solvent-catalyst. For example, in some embodiments, tooth surfaces 4030 of hinges 4005 and 4007 are steel. While springs 4021 are shown, the mechanical couplings disclosed herein are not limited to includes springs.

Figure 4C:
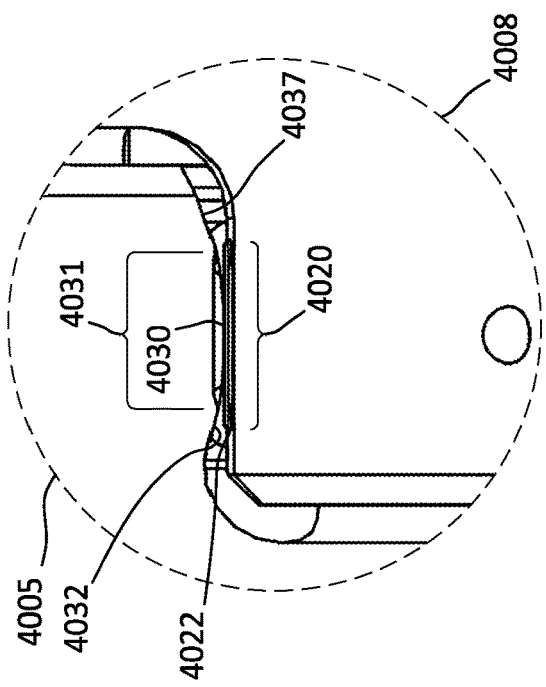
FIG. 4C is a detail view of a portion of FIG. 4B.

As shown in FIG. 4C, when hinges 4005 and 4008 are engaged, the teeth of hinge 4008 are positioned between adjacent teeth of hinge 4005, and the teeth of hinge 4005 are positioned between adjacent teeth of hinge 4008. The polycrystalline diamonds 4022 are engaged with the tooth surfaces 4030, such that the engagement between the hinges 4005 and 4008 is at least partially interfaced via engagement between the surfaces of the polycrystalline diamonds 4022 tooth surfaces 4030. The engagement between hinges 4007 and 4010 is the same or substantially similar to that of hinges 4005 and 4008. In operation, assembly 4000 exploits excess backlash and looseness of fit between the hinges in order to accommodate various ranges of motions. For example, assembly 4000 exploits excess backlash and looseness of fit between the hinges in order to accommodate axial, radial, and/or angular misalignment within assembly 4000. In some embodiments, the polycrystalline diamond surfaces and the metal surfaces are arranged within assembly 4000 such that, regardless of the direction of rotation (clockwise or counterclockwise) of the assembly 4000, polycrystalline diamond surfaces are engaged with metal surfaces in the assembly 4000 during rotation. For example, rather than springs 4021 on the surfaces opposite the polycrystalline diamonds 4022, the springs 4021 of hinges 4008 and 4010 could be replaced with polycrystalline diamonds and all of the tooth surfaces 4030 of hinges 4005 and 4007 could be metal surfaces such that, regardless of the direction or rotation of assembly 4000, polycrystalline diamond surfaces are engaged with metal surfaces in the assembly 4000. Alternatively, rather than springs 4021 on the surfaces opposite the polycrystalline diamonds 4022, the springs 4021 of hinges 4008 and 4010 could be replaced with metal surfaces, the tooth surfaces 4030 of hinges 4005 and 4007 that engage with the metal surfaces of hinges 4008 and 4010 could be polycrystalline diamonds, and the tooth surfaces 4030 of hinges 4005 and 4007 that engage with the polycrystalline diamonds 4022 of hinges 4008 and 4010 could be metal surfaces such that, regardless of the direction or rotation of assembly 4000, polycrystalline diamond surfaces are engaging with metal surfaces in the assembly 4000.

As can be seen in FIG. 4C, the opposing engagement surface is crowned, with tooth surface 4030 positioned outward relative to curved surfaces 4032 and 4037. Tooth surface 4030 has a width 4031 that is narrower than a width 4020 of the engagement surface of polycrystalline diamond 4022. This projection of tooth surface 4030 from tooth 4009 and relative narrowness of tooth surface 4030 relative to polycrystalline diamond 4022 reduces or eliminates the occurrence of edge contact between the polycrystalline diamond 4022 and tooth surface 4030, such that the polycrystalline diamond 4022 does not gouge the diamond reactive material of tooth surface 4030 during operation thereof.

Figure 5A:
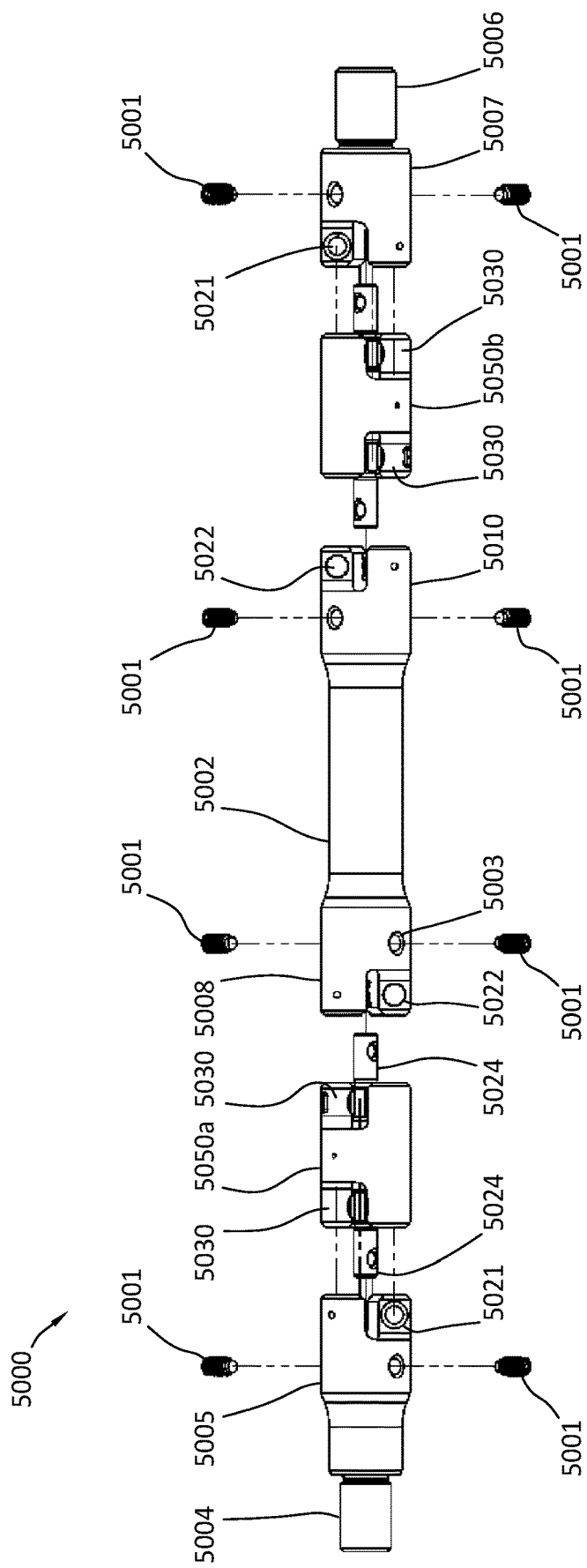
FIG. 5A is an exploded view of a portion of a driveline having a double Cardan universal joint with polycrystalline diamond power transmission surfaces thereon.

In some embodiments, the power transmission system disclosed herein includes a double Cardan universal joint for use in driveline applications, such as for use in drilling motors. Assemblies with double Cardan universal joints include two sets of universal joints. In operation, when the sets of universal joints are aligned, assemblies with double Cardan universal joints can provide constant velocity. With reference to FIGS. 5A-5F, a portion of an assembly having a double Cardan universal joint for use in driveline applications is depicted. Assembly 5000 is substantially similar to assembly 4000, with the addition of shaft couplers 5050a and 5050b. Assembly 5000 includes shaft 5002. Shaft 5002 includes a hinge on each end thereof, including hinge 5008 and hinge 5010. Assembly 5000 includes shaft couplers 5050*a* and 5050*b*. Assembly includes hinge 5005 coupled or integral with shaft 5004, and hinge 5007 coupled or integral with shaft 5006. Hinge 5008 may be coupled with one end of shaft coupler 5050*a*, and hinge 5005 may be coupled with the opposite end of shaft coupler 5050*a*. Hinge 5010 may be coupled with one end of shaft coupler 5050*b*, and hinge 5007 may be coupled with the opposite end of shaft coupler 5050*b*. Also shown in the exploded view of FIG. 5A are set screws 5001, threaded holes 5003, and locking pins 5024.

Figure 5B:
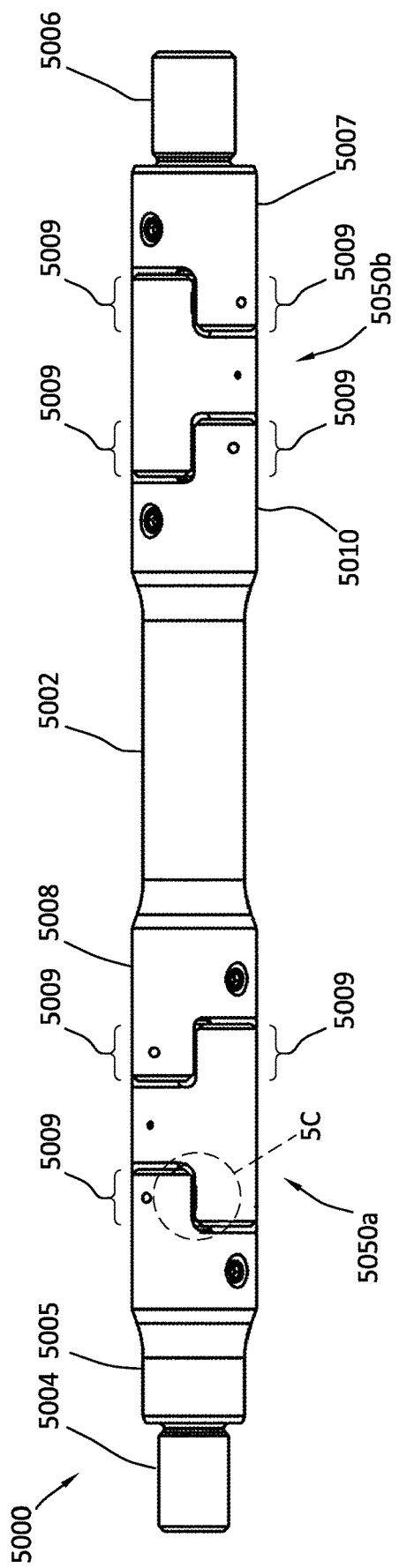
FIG. 5B is an assembled view of the portion of the driveline of FIG. 5A.
Figure 5C:
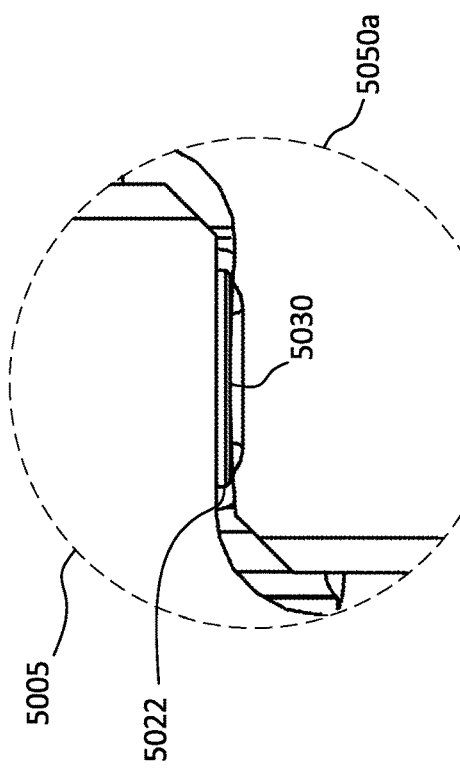
FIG. 5C is a detail view of a portion of FIG. 5B.

As shown in FIG. 5B, each of hinges 5008, 5010, 5005, and 5007, as well as shaft couplers 5050*a* and 5050*b* include teeth 5009. Shaft coupler 5050*a* couples with hinges 5008 and 5005 via meshing of the teeth 5009 thereof, and shaft coupler 5050*b* couples with hinges 5010 and 5007 via meshing of the teeth 5009 thereof. In at least some respects, hinges 5008, 5010, 5005, and 5007 and shaft couplers 5050*a* and 5050*b* are or are similar to gears, and function the same as or similar to gears in that the teeth thereof mesh together for the transfer mechanical energy therebetween. The coupling of hinges 5008, 5010, 5005, and 5007 is the same as or similar to Hirth couplings or Curvic couplings.

Shaft 5004 may be coupled with or a portion of, for example, a motor that drives shaft 5004. When hinge 5005 is coupled with hinge 5008 via shaft coupler 5050*a*, rotation of shaft 5004 causes shaft coupler 5050*a* to rotate, and rotation of shaft coupler 5050*a* causes shaft 5002 to rotate. When hinge 5010 is coupled with hinge 5007 via shaft coupler 5050*b*, rotation of shaft 5002 causes shaft coupler 5050*b* to rotate, and rotation of shaft coupler 5050*b* causes shaft 5006 to rotate. Shaft 5006 may be coupled with or a portion of a component that is driven by assembly, such as a drill bit.

With reference to FIGS. 5D, 5G, and 5H, each tooth 5009 of hinges 5005, 5007, 5008, and 5010 has tooth surfaces 5040 extending between a root surface 5041 and top landing 5043. At least one tooth surface 5040 of each of hinges 5008, 5010, 5005, and 5007 has a polycrystalline diamond 5022 thereon. As shown in FIGS. 5D, 5G, and 5H, each tooth 5009 has a polycrystalline diamond 5022 on one tooth surface 5040 thereof and a spring 5021 on the other tooth surface 5040 thereof. The tooth surfaces 5030 of shaft couplers 5050*a* and 5050*b* include a metal that contains more than trace amounts of diamond solvent-catalyst. For example, in some embodiments, tooth surfaces 5030 are steel. As such, when assembled, the polycrystalline diamonds 5022 are engaged with the tooth surfaces 5030, such that the engagement between the hinges 5005, 5007, 5008, and 5010 with shaft couplers 5050*a* and 5050*b* is at least partially interfaced via engagement between the surfaces of the polycrystalline diamonds 5022 tooth surfaces 5030. In some embodiments, the polycrystalline diamond surfaces and the metal surfaces are arranged within assembly 5000 such that, regardless of the direction of rotation (clockwise or counterclockwise) of the assembly 5000, polycrystalline diamond surfaces are engaged with metal surfaces in the assembly 5000 during rotation. For example, rather than springs 5021 on the surfaces opposite the polycrystalline diamonds 5022, the springs 5021 of any one or more of hinges 5005, 5007, 5008 and 5010 could be replaced with polycrystalline diamonds and all of the tooth surfaces 5030 of couplers 5050*a* and 5050*b* could be metal surfaces such that, regardless of the direction or rotation of assembly 5000, polycrystalline diamond surfaces are engaged with metal surfaces in the assembly 5000. Alternatively, the springs 5021 of any one or more of hinges 5005, 5007, 5008 and 5010 could be replaced with metal surfaces, one or more of the tooth surfaces 5030 that engage with the metal surfaces of hinges 5005, 5007, 5008 and 5010 could be polycrystalline diamonds, and the tooth surfaces 5030 that engage with the polycrystalline diamonds 5022 could be metal surfaces such that, regardless of the direction or rotation of assembly 5000, polycrystalline diamond surfaces are engaging with metal surfaces in the assembly 5000.

Figure 6:
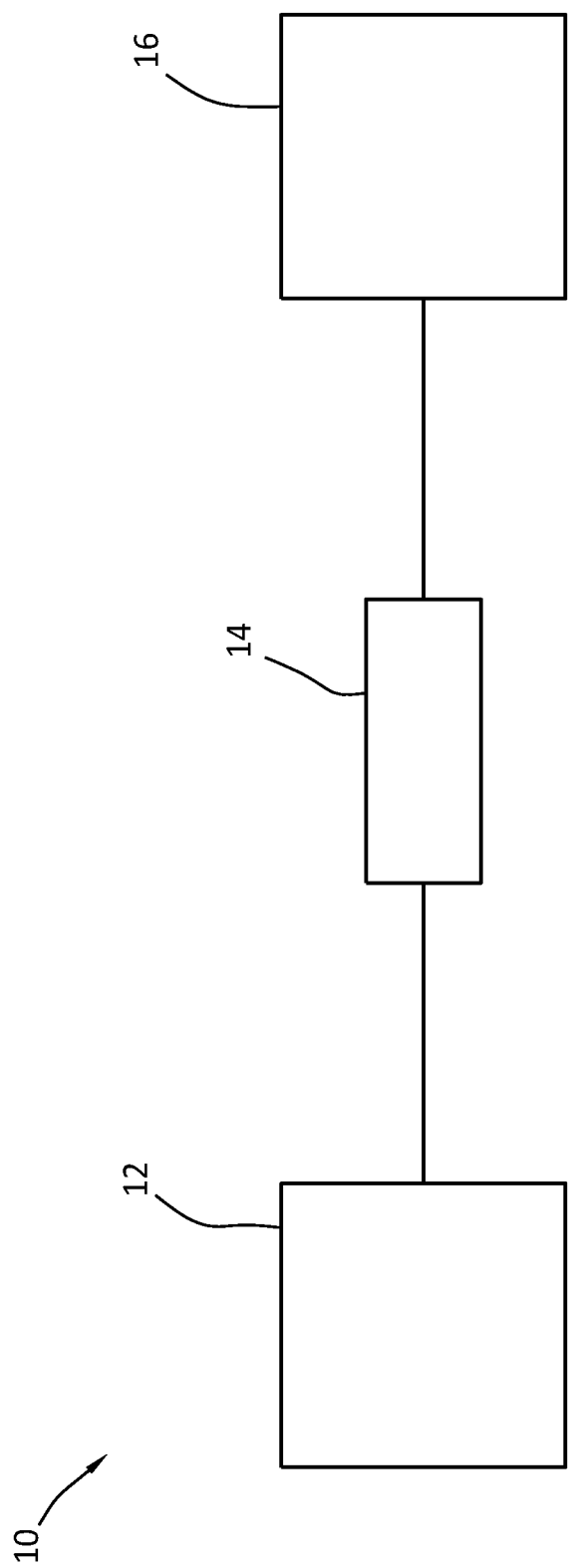
FIG. 6 is a schematic of a power transmission system driven by a first component and driving a second component.

FIG. 6 depicts an exemplary system 10. System 10 includes motor 12. Motor 12 is coupled with power transmission system 14. Power transmission system 14 is coupled with component 16. Power transmission system 14 may be any of the power transmission systems disclosed herein that include polycrystalline diamond power transmission surfaces engaged with metal power transmission surfaces. Power transmission system 14 may be or include a set of gears and/or a universal joint. For example, power transmission system 14 may be or include any of the gears shown in FIGS. 1A-3C or any of the universal joints shown in FIGS. 4A-5F. In operation, motor 12 drives power transmission system 14, such as via rotating a drive shaft coupled with or integral with the power transmission system 14, and power transmission system 14 drives the component 16, such as via rotating a shaft coupled with or integral with the component 16. The component may be any of numerous components, as described elsewhere herein. Some examples of components include, but are not limited to, drill bits and propellers.

Polycrystalline Diamond Bearing Elements

In some embodiments, the polycrystalline diamond surfaces disclosed herein are surfaces of polycrystalline diamond elements that are coupled with or otherwise incorporated into or with the power transmission system components (e.g., gears or universal joints) disclosed herein. For example, the polycrystalline diamond elements may be coupled with the power transmission surfaces of the power transmission systems. In some embodiments, the polycrystalline diamond elements are positioned to be flush with existing power transmission surfaces. In other embodiments, the polycrystalline diamond elements are positioned to be raised above existing power transmission surfaces. Such polycrystalline diamond elements may be or include thermally stable polycrystalline diamond, either supported or unsupported by tungsten carbide, or polycrystalline diamond compact (PDC). In certain applications, the polycrystalline diamond elements disclosed herein have increased cobalt content transitions layers between the outer polycrystalline diamond surface and a supporting tungsten carbide slug. The polycrystalline diamond elements may be supported by tungsten carbide, or may be unsupported, "standalone" polycrystalline diamond elements that are mounted directly to the power transmission system component. The polycrystalline diamond elements may by non-leached, leached, leached and backfilled, thermally stable, coated via chemical vapor deposition (CVD), or processed in various ways as known in the art.

In some embodiments, the engagement surfaces of the polycrystalline diamond elements disclosed herein are planar, convex, or concave. In some embodiments, wherein the engagement surfaces of the polycrystalline diamond elements are concave, the concave engagement surfaces are oriented with the axis of the concavity in line with the circumferential rotation of the respective power transmission system component. In some embodiments, the polycrystalline diamond elements have beveled edges. The polycrystalline diamond elements may have diameters as small as 3 mm (about ⅛") or as large as 75 mm (about 3"), depending on the application. Typically, the polycrystalline diamond elements have diameters between 8 mm (about ⁵⁄₁₆") and 25 mm (about 1").

Although the polycrystalline diamond elements are most commonly available in cylindrical shapes, it is understood that the technology of the application may be practiced with polycrystalline diamond elements that are square, rectangular, oval, any of the shapes described herein with reference to the Figures, or any other appropriate shape known in the art. In some applications, one or more convex, contoured polycrystalline diamond elements are mounted on the power transmission system component (e.g., gear or mechanical coupling) in sliding and/or rolling contact with an opposing surface of another power transmission system component (e.g., another gear or portion of the universal joint).

The polycrystalline diamond elements may be arranged in any pattern, layout, spacing or staggering within the power transmission system to provide the desired interfacing of contact, without concern for the need for overlapping contact with polycrystalline diamond elements engagement surfaces on the opposing power transmission system component. The polycrystalline diamond elements disclosed herein are, in some embodiments, not shaped to conform to the opposing engagement surface. The polycrystalline diamond elements disclosed herein are, in other embodiments, shaped to conform to the opposing engagement surface.

One performance criterion is that the polycrystalline diamond element is configured and positioned in such a way as to preclude any edge contact with the opposing engagement surface or component. In some aspects, the polycrystalline diamond elements are subjected to edge radius treatment.

Opposing Engagement Surface

The opposing surfaces (also referred to as "opposing engagement surfaces" or "opposing bearing surfaces") are surfaces that contain at least 2 wt. % of diamond solvent-catalyst. In some embodiments, the opposing bearing surfaces are metal surfaces that include a metal containing at least 2 wt. % of a diamond solvent-catalyst based on a total weight of the metal. The opposing bearing surface may be a metal surface that includes a metal that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the metal, or any range or value therebetween. In some embodiments, the opposing bearing surface is a metal surface that includes a metal that contains at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the metal.

In some embodiments, less than an entirety of the opposing bearing surface includes the diamond reactive material, with the provision that the opposing bearing surface includes diamond reactive material in at least one position along the contact path between the metal surface and the diamond surface. For example, the opposing bearing surface may include a section of diamond reactive material adjacent a section of another material that is not a diamond reactive material.

In some aspects, the opposing engagement surface (e.g., of the opposing gear or portion of the universal joint), that is, the surface that is engaged with the polycrystalline diamond surface, has carbon applied thereto. In some such aspects, the carbon is applied to the opposing bearing surface prior to engagement with the engagement surface. For example, the opposing bearing surface may be saturated with carbon. Without being bound by theory, it is believed that such application of carbon reduces the ability of the diamond solvent-catalyst in the opposing engagement surface to attract carbon through graphitization of the surface of the polycrystalline diamond element. That is, the carbon that is applied to the opposing surface functions as a sacrificial layer of carbon. In such embodiments, the opposing bearing surface that underlies the carbon includes the diamond reactive material.

In some embodiments, the opposing engagement surface (i.e., the metal surface) has a surface roughness of from 0.5 to 2,000 µin Ra, or from 1 to 1,900 µin Ra, or from 5 to 1,500 µin Ra, or from 10 to 1,200 µin Ra, or from 50 to 1,000 µin Ra, or from 100 to 800 µin Ra, or from 200 to 600 µin Ra. In some embodiments, the opposing engagement surface has a surface roughness that is greater than the engagement surface (i.e., rougher).

Driveline with Double Conical Joints

Certain embodiments of the present disclosure include methods and systems that include use of and/or incorporation of a driveline that includes one or more double conical joints that provide flexibility to the driveline (also referred to herein as a "double conical driveline"). The double conical driveline may be arranged as a flexible mechanical coupling between two moving parts, such as between an electric motor and a positive displacement pump (PDP).

With reference to FIGS. 7A and 7B, double conical driveline 700 is depicted. Double conical driveline 700 includes drive shaft 702. Drive shaft 702 includes a first oscillatory coupling 704a at a first end thereof for coupling with a prime mover (e.g., a motor), and a second oscillatory coupling 704b at a second end thereof for coupling with a machine (e.g., a PDP).

First oscillatory coupling 704a includes bearing coupler 706a coupled with shaft 702. Bearing coupler 706a may be pinned to, welded to, or otherwise fixedly attached to shaft 702. In some embodiments, bearing coupler 706a is integral with shaft 702, such that shaft 702 and bearing coupler 706a are a single-piece structure. First oscillatory coupling 704a includes double conical joint 708a. Double conical joint 708a includes first conical joint 712a coupled with or integral with second conical joint 712b. Each conical joint 712a and 712b has a conical surface thereon for coupling with and engagement with other parts of double conical driveline 700. First conical joint 712a is coupled with bearing coupler 706a via spindle 714a. Spindle 714a is secured with bearing coupler 706a and first conical joint 712a via a crown nut 716a. Bearing coupler 706a and first conical joint 712a are each rotatable about spindle 714a. First oscillatory coupling 704a includes bearing coupler 706b. Second conical joint 712b is coupled with bearing coupler 706b via spindle 714b. Bearing coupler 706b and second conical joint 712b are each rotatable about spindle 714*b*. Spindle 714*b* is secured with bearing coupler 706*b* and second conical joint 712*b* via crown nut 716*b*.

Second oscillatory coupling 704*b* is identical or substantially identical to first oscillatory coupling 704*b* and includes bearing coupler 706*c* coupled with shaft 702; double conical joint 708*b* having conical joint 712*c* coupled with or integral with conical joint 712*d*. Conical joint 712*c* is coupled with bearing coupler 706*c* via spindle 714*c*, and conical joint 712*d* is coupled with bearing coupler 706*d* via spindle 714*d*. Spindles 714*c* and 714*d* are secured via crown nuts 716*c* and 716*d*, respectively. Crown nuts 716*a*-716*d* are each secured via a cotter pin (not shown). The double conical driveline disclosed herein is not limited to the structure shown in FIGS. 7A and 7B. For example, the double conical joints may be coupled with the bearing coupler using structures other than a spindle, crown nut, and cotter pin, while still attaining the double conical joint arrangement disclosed herein.

FIG. 8A depicts a portion of a double conical driveline, assembly 899*a*, in accordance with embodiments of the present disclosure. Assembly 899*a* includes bearing coupler 806. Spindle 814 is coupled with or integral with bearing coupler 806. The position of spindle 814 relative to bearing coupler 806 is fixed, such that spindle 814 does not move relative to bearing coupler 806. Spindle 814 includes a plurality of holes 818 about and through the outer surface thereof. Holes 818 are arranged and configured to receive cotter pins for securing a crown nut to spindle 814.

FIG. 8B depicts another portion of a double conical driveline, assembly 899*b*. Assembly 899*b* includes the bearing coupler 806 and spindle 814 of FIG. 8A, but with double conical joint 808 coupled with spindle 814. Each conical joint 812*a* and 812*b* includes a conical surface 820, on both sides thereof, surrounding an opening 824. Each opening 824 defines a conical axis 826*a* (horizontally on the page) and 826*b* (extending out of and going into the page). The conical axes 826*a* and 826*b* of double conical joint 808 are at an angle greater than 0° relative to one another. As shown in FIG. 8B, the conical axes 826*a* and 826*b* are at an angle of 90°. The conical axes 826*a* and 826*b* are not parallel and do not intersect. In other embodiments, the conical axes do intersect. A plurality of polycrystalline diamond compacts 822 are positioned and coupled on each conical surface 820. The plurality of polycrystalline diamond compacts 822 are positioned to provide the bearing surface(s) of double conical joint 808.

FIG. 8C depicts another portion of a double conical driveline, assembly 899*c*. Assembly 899*c* includes the bearing coupler 806, spindle 814, and double conical joint 808 as shown in FIG. 8B, but with crown nut 816 coupled therewith. Crown nut 816 includes spaces 828 that are positioned such that at least some of the spaces 828 of crown nut 816 align with at least some of the holes 818 of spindle 814, allowing for the coupling of a cotter pin therethrough to secure crown nut 816 onto spindle 814.

Figure 8E:
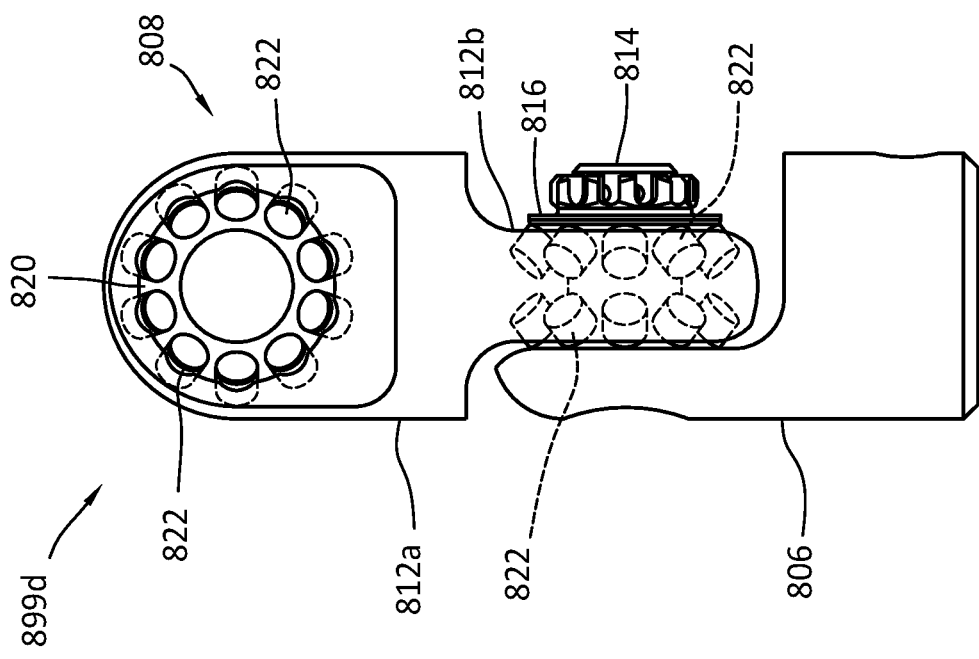

FIG. 8D depicts another portion of a double conical driveline, assembly 899*d*. Assembly 899*d* includes the bearing coupler 806, spindle 814, double conical joint 808, and crown nut 816 as shown in FIG. 8C, but with the body of double conical joint 808 at least partially transparent to show the plurality of polycrystalline diamond compacts 822 therein. The surfaces of the polycrystalline diamond compacts 822 are power transmission surfaces of the double conical joint 808. FIG. 8E shows the opposite side of assembly 899*d*, as shown in FIG. 8D, showing that both sides of each conical joint 812*a* and 812*b* includes a conical bearing surface 820.

With reference to FIGS. 9A and 9B, the engagement between the polycrystalline diamond compacts 922 on conical surface 920 and the crown nut 916 and spindle 914 is shown, particularly in the cross-sectional view of FIG. 9B. Crown nut 916 is coupled with spindle via a pin (not shown) engaged through one of holes 918. Double conical joint 908 includes conical joints 912*a* and 912*b*. With conical joint 912*a* coupled about spindle 914 and crown nut 916 secured to spindle 914, diamond bearing surfaces 930 of each polycrystalline diamond compact 922 are engaged with and in sliding contact with an opposing bearing surface. The opposing bearing surfaces include opposing bearing surfaces 932 of crown nut 916 and opposing bearing surfaces 934 of spindle 914. Each opposing bearing surface 932 and 934 is a metallic surface. Each opposing bearing surface 932 and 934 is a diamond reactive material, such as steel. Bearing coupler 906 moves relative to double conical joint 908 by rotating about conical axis 926*a*. During rotation of bearing coupler 906 about conical axis 926*a*, diamond bearing surfaces 930 are in sliding contact with opposing bearing surfaces 932 and 934.

Figure 10:
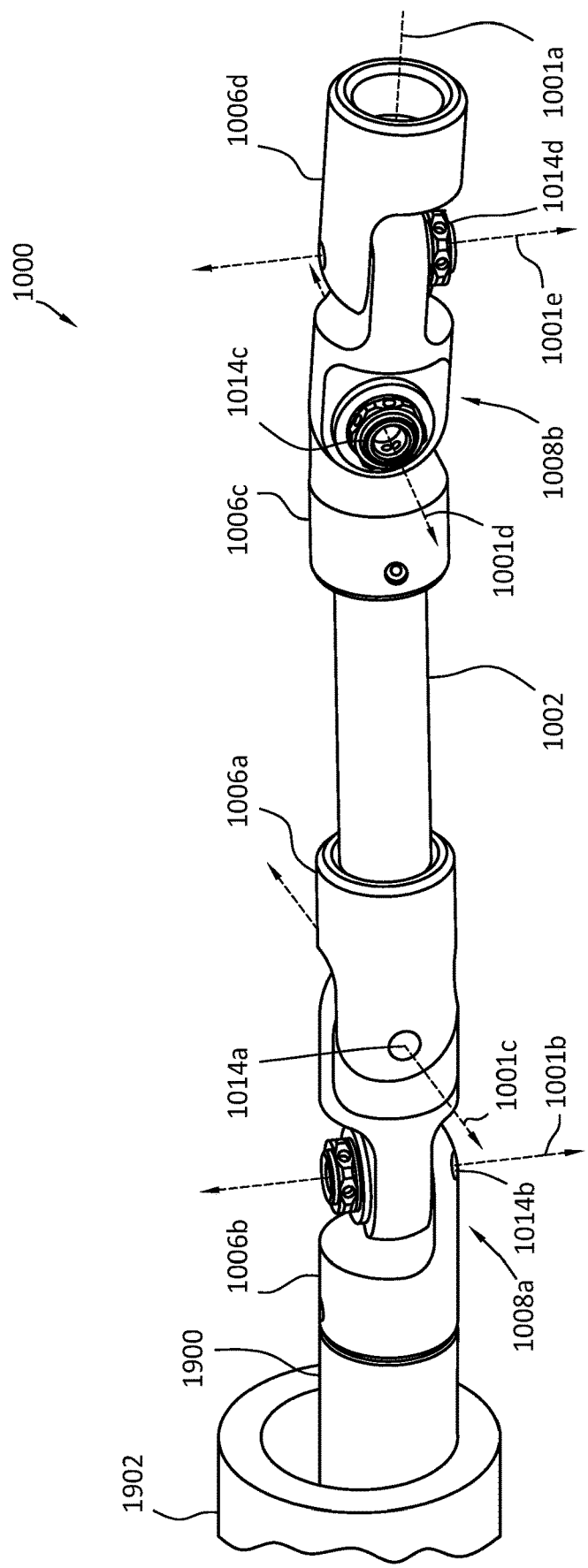
FIG. 10 depicts a driveline including double conical joints with polycrystalline diamond power transmission surfaces, with the driveline coupled with a rotor positioned in a stator.

With reference to FIG. 10, double conical driveline 1000 is coupled with rotor 1900. More particularly, rotor 1900 is coupled with bearing coupler 1006*b* of driveline 1000. Rotor 1900 is rotatably engaged within stator 1902. Rotation of rotor 1900 within stator 1902 imparts rotational force to bearing coupler 1006*b*, which imparts rotational force to double conical joint 1008*a*, which imparts rotational force to bearing coupler 1006*a*, which imparts rotational force to shaft 1002, which imparts rotational force to bearing coupler 1006*c*, which imparts rotational force to double conical joint 1008*b*, which imparts rotational force to bearing coupler 1006*d*. Bearing coupler 1006*d* may be coupled with a machine or tool, such as a positive displacement pump to drive operation of the pump. Rotation of bearing coupler 1006*d* drives the machine or tool.

Double conical driveline 1000 has multiple degrees of freedom of motion in various directions, as provided by double conical joints 1008*a* and 1008*b*. The motions (degrees of freedom) available to double conical driveline 1000 during operation include: (1) rotation of the entire driveline 1000 about axis 1001*a*; (2) rotation of double conical joint 1008*a* about spindle 1014*b* at axis 1001*b*; (3) rotation of double conical joint 1008*a* about spindle 1014*a* at axis 1001*c*; (4) rotation of double conical joint 1008*b* about spindle 1014*c* at axis 1001*d*; and (5) rotation of double conical joint 1008*b* about spindle 1014*d* at axis 1001*e*. Each of these motions (1)-(5) is independent of the others, such that rotation about one of the spindles does not affect the availability of rotation about any of the other of the spindles and does not affect the ability of the entire double conical driveline 1000 to rotate about axis 1001*a*. These multiple degrees of freedom provided by the motions (1)-(5) provide the ability to double conical driveline 1000 to drive machinery under various states of "misalignment" of the driveline 1000. A "state of misalignment" of the double conical driveline 10000 may be any physical arrangement, positioning, and/or state of the double conical driveline 1000 wherein an imaginary line passing through the center of each portion of the double conical driveline 1000 does not define a straight line. The degrees of freedom of motion that double conical driveline 1000 has allows double conical driveline 1000 to react to various forces imparted onto double conical driveline 1000 during operation, and allows the double conical driveline 1000 to oscillate during rotation in response to such forces. As the conical bearings bear load in all directions and as each movable joint of double conical driveline 1000 is provided by a conical bearing, double conical driveline 1000 is capable of bearing load in all directions. During operation of the double conical driveline, forces are transmitted from torque in both forward and reverse directions. That is, the double conical driveline 1000 is capable of transmitting torque both when double conical driveline 1000 is rotating clockwise about axis 1001*a* and when the double conical driveline is rotating counterclockwise about axis 1001*a*. Because the bearings of the double conical driveline 1000 are double conical bearings, the double conical driveline 1000 can bear axial loads both in tension and in compression.

In some embodiments, the double conical driveline and the conical bearings thereof are not sealed. In other embodiments, the double conical driveline and the conical bearings thereof are sealed. In some embodiments, the double conical driveline and the conical bearings thereof are not lubricated. In other embodiments, the double conical driveline and the conical bearings thereof are lubricated.

Figure 11:
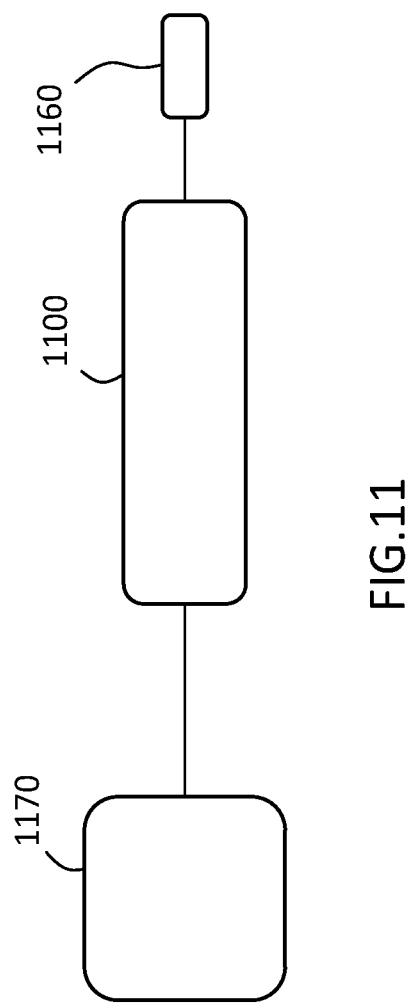
FIG. 11 is a simplified schematic of a system including the driveline having double conical joints with polycrystalline diamond power transmission surfaces, with the driveline coupled between a prime mover and a machine.

With reference to FIG. 11, double conical driveline 1100 is coupled with prime mover 1170 at one end and is coupled with machine or tool 1160 at the other end. Prime mover 1170 may be a motor or engine, such as an eclectic motor or diesel engine. Machine or tool 1160 may be, for example and without limitation, farm equipment, mining equipment, downhole drilling and/or production equipment, assembly line equipment, steel mill equipment, automobile components, or marine (e.g., boat) components. Some exemplary applications of the double conical driveline 1100 disclosed herein are as a driveline between an electric motor and a pump, such as PDP or progressive cavity pump; as a driveshaft of an automobile, such as a heavy duty truck; as a steering column of an automobile; as a driveshaft of a boat propeller; as a driveline coupled with a wind turbine; as a driveline between an electric motor and an air compressor; a driveline for a downhole motor; and as a power take off (PTO) driveline on a tractor, such as to drive ploughing, harvesting, or other farming equipment. The driveline disclosed herein is not limited to these particular applications and may be used in various other applications.

While the double conical driveline disclosed herein is shown as including a plurality of discrete polycrystalline diamond bearing elements in the form of PDCs, the double conical driveline is not limited to this arrangement and the bearing surfaces of the double conical driveline may include continuous polycrystalline diamond bearing surfaces. Furthermore, while the double conical driveline disclosed herein is shown as having conical bearing surfaces, the double conical driveline is not limited to this arrangement. For example, the double conical driveline may include spherical bearing surfaces, a combination of radial and axial bearing surfaces, or another bearing surface arrangement that is capable of bearing combined axial and radial loads. Also, while drivelines disclosed herein is shown, in some embodiments, as having a double conical joint at each end of the shaft, in other embodiments the drivelines have a double conical joint only on one end thereof, such as for driving equipment.

Driveline with Diamond Power Transmission Surfaces

Certain embodiments of the present disclosure include a driveline that includes one or more diamond bearing surfaces positioned to engage with opposing metal bearing surfaces within the driveline to function as power transmission surfaces. The driveline may be used as a flexible mechanical coupling between two moving parts, such as between an electric motor and a positive displacement pump (PDP).

Figure 12C:
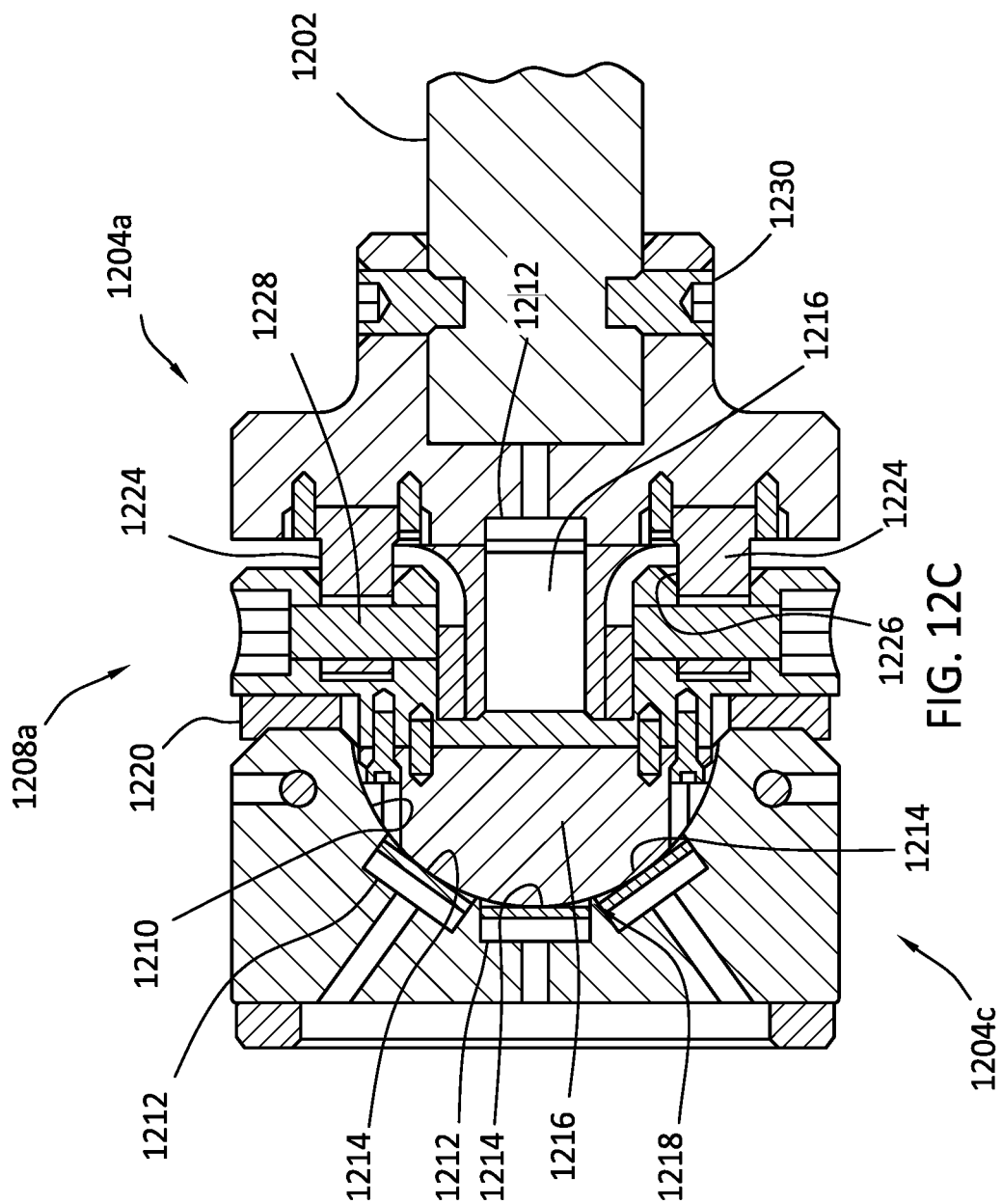
FIG. 12C is a detail view of portions of the driveline of FIG. 12B.

FIG. 12A depicts a driveline 1200, FIG. 12B is a cross-sectional view of driveline 1200, and FIG. 12C is a detail view of one joint of the driveline 1200. With reference to FIGS. 12A-12C, driveline 1200 includes drive shaft 1202. Drive shaft 1202 includes a first joint coupler 1204*a* coupled at a first end thereof (e.g., for coupling with a prime mover, such as a motor) and a second joint coupler 1204*b* at a second end thereof (e.g., for coupling with a machine, such as a pump). As shown, joint couplers 1204*a* and 1204*b* are yokes and are secured to shaft 1202 via set screws 1230. However, the joint couplers disclosed herein are not limited to this particular structure. Furthermore, while joint couplers 1204*a* and 1204*b* are shown as discrete components that are attached to shaft 1202, in other embodiments the joint couplers may be integral with the shaft.

Each joint coupler 1204*a* and 1204*b* is coupled with a driveline joint 1208*a* and 1208*b*, respectively. Opposite the joint couplers 1204*a* and 1204*b*, the driveline joints 1208*a* and 1208*b* are each coupled with another joint coupler 1204*c* and 1204*d*, respectively. The joint couplers 1204*c* and 1204*d* may be part of or coupled with a component that drives the drive shaft 1202 or that is driven by the drive shaft 1202. The joint couplers 1204*c* and 1204*d* may be the same as or substantially similar to the joint couplers 1204*a* and 1204*b*.

As shown in the detail view of FIG. 12C, joint coupler 1204*c* includes bearing body surface 1210, which is, in this embodiment, an arcuate surface. Coupled with bearing body surface 1210 are diamond bearing elements 1212. Each diamond bearing element 1212 has a diamond engagement surface 1214. Diamond bearing elements 1212 are positioned on and relative to bearing body surface 1210 such that the diamond engagement surfaces 1214 are raised above the bearing body surface 1210.

Driveline joint 1208*a* includes opposing bearing element 1216. Opposing bearing element 1216 includes opposing engagement surface 1218. Opposing engagement surface 1218 is a metal surface. The metal of the metal surface contains more than trace amounts of diamond solvent-catalyst. Opposing bearing element 1216 is coupled with joint body 1220. In the embodiment shown, opposing bearing element 1216 is a replaceable component such that, when opposing bearing element 1216 becomes worn through use it is removable so that another opposing bearing element can be coupled with joint body 1220. Driveline joint 1208*a* is engaged with joint coupler 1204*c* such that the opposing bearing surface 1218 is slidingly engaged with diamond engagement surfaces 1214 and is spaced apart from surface 1210. In operation, the opposing bearing surface 1218 is slidable on diamond engagement surfaces 1214 along the arcuate path defined by the surfaces 1214 and 1218. As will be more evident in the exploded view of FIG. 13, the joint coupler 1204*b* is engaged with the driveline joint 1208*b* in the same manner as joint coupler 1204*d*, but is arranged perpendicular to joint coupler 1204*d*.

Joint coupler 1204*a* is coupled with joint body 1220 via securing tabs 1224 of joint coupler 1204*a* within slots 1226 of joint body 1220. The tabs 1224 are secured within the slots 1226 via set screws 1228. However, the joint couplers disclosed herein may be secured to the joint body via other methods. As will be more evident in the exploded view of FIG. 13, the joint coupler 1204*b* is secured with the joint body 1220 in the same manner as joint coupler 1204*d*, but is arranged perpendicular to joint coupler 1204*d*.

Figure 13:
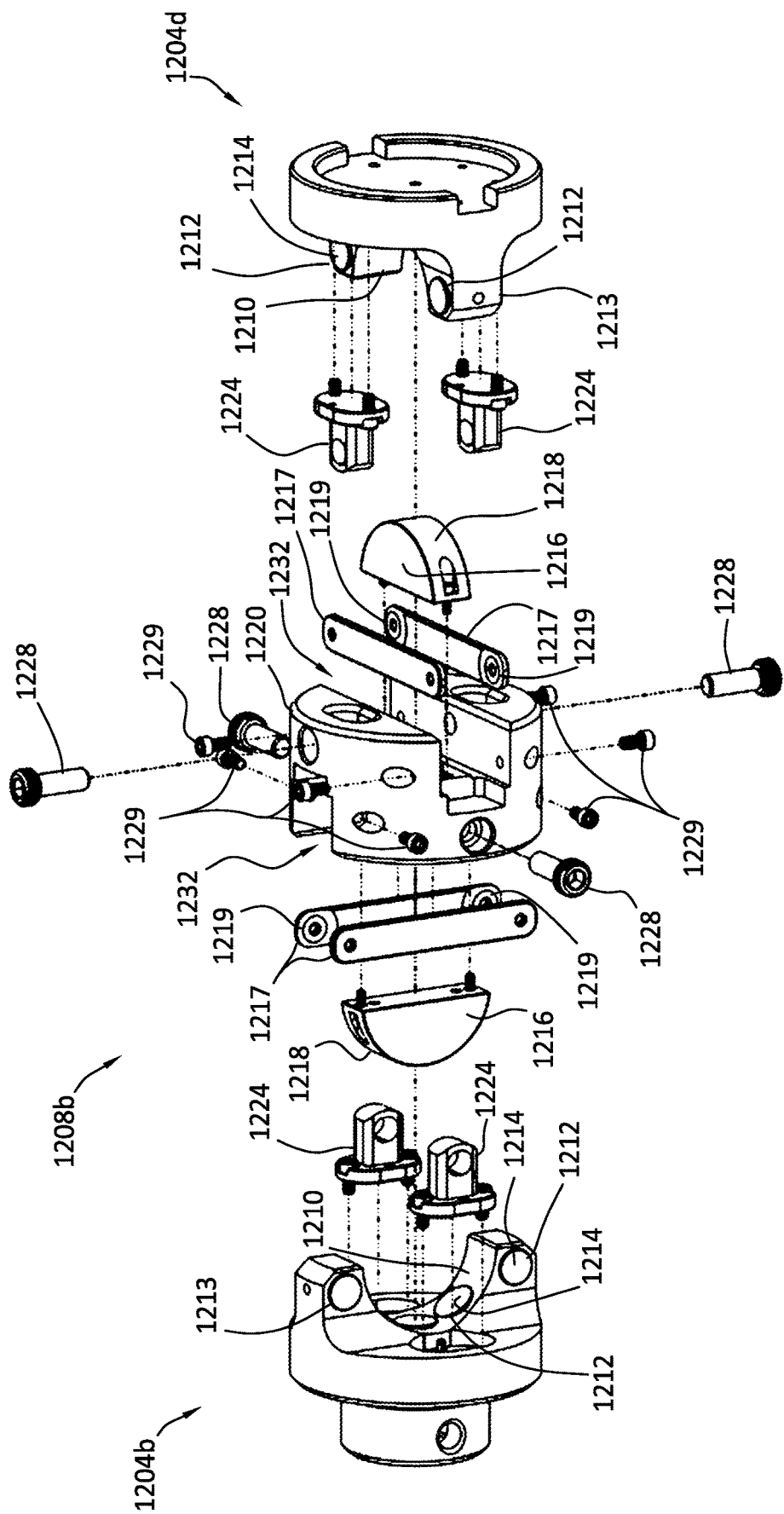
FIG. 13 is an exploded view of a driveline joint in accordance with some embodiments of the present disclosure.

With reference to FIG. 13, each of joint couplers 1204b and 1204d includes arcuate bearing body surfaces 1210 with diamond elements 1212 thereon. In addition to arcuate bearing body surfaces 1210, each of joint couplers 1204b and 1204d includes side surfaces 1213, adjacent each side of arcuate bearing body surface 1210. Side surfaces 1213 also include diamond bearing elements 1212 thereon.

Driveline joint 1208b includes two opposing bearing elements 1216, each having an arcuate opposing engagement surface 1218, and each coupled on an opposing side of joint body 1220. As shown, the two opposing bearing elements 1216 are oriented perpendicular to one another. Additionally, driveline joint 1208b includes opposing bearing elements 1217 (e.g., metal bars or plates) that are coupled within slots 1232 of joint body 1220 via set screws 1229, each including opposing engagement surfaces 1219 positioned to engage with the diamond bearing elements 1212 on the side surfaces 1213 of joint couplers 1204b and 1204d when assembled. Opposing bearing elements 1217 engaged with joint coupler 1204b are oriented perpendicular to opposing bearing elements 1217 engaged with joint coupler 1204d. Opposing bearing elements 1217 are replaceable, such as when worn due to use.

When the joint couplers 1204b and 1204d are assembled with driveline joint 1208b, opposing engagement surfaces 1218 are slidingly engaged with the diamond bearing elements 1212 on surfaces 1210, and the opposing engagement surfaces 1219 are slidingly engaged with diamond bearing elements 1212 on side surfaces 1213. The sliding engagement of diamond bearing elements 1212 with opposing engagement surfaces 1218 and 1219 allows joint couplers 1204b and 1204d to pivot or rock relative to driveline joint 1208b along the arc defined by surfaces 1212 and 1218.

While the two opposing bearing elements 1216 are shown has being identical in shape, in other embodiments the two opposing bearing elements 1216 are not identical in shape. For example, the opposing engagement surface 1218 of one of the two opposing bearing elements 1216 may follow a first arcuate path having a first radius, while the opposing engagement surface 1218 of the other of the two opposing bearing elements 1216 follows a second arcuate path having a second radius that is different than the first radius. Or, the opposing engagement surface 1218 of one of the two opposing bearing elements 1216 may follow a first arcuate path having a first radius, while the opposing engagement surface 1218 of the other of the two opposing bearing elements 1216 follows a second arcuate path having a second radius that is the same as the first radius, where the first and second arcuate paths have different arc lengths. The shapes, dimensional extents and relative arrangements of the bearing surfaces in the drivelines may be configured to provide the driveline with various combinations of relative movements amongst the components (joint couplers, joints, shafts) of the driveline depending on the particular application.

While the joints disclosed herein are shown having a joint body coupled with two joint couplers (e.g., one on each end of the joint body), the joint body may be coupled with only one of the joint couplers and may be coupled (e.g., rigidly coupled) with another component at the other end thereof. In some such embodiments, the joint may form or be part of a knuckle joint for providing articulation to other components to which it is coupled.

While the driveline is shown and described as having one of the joints coupled at one end of the shaft, or two of the joints coupled at opposite ends of the shaft, the driveline is not limited to these particular arrangements. For example, in some embodiments multiple joints can be coupled together in series on one or both ends of the shaft. For example, a first joint coupler may be coupled with a shaft and a first joint body, the first joint body may be coupled with a second joint coupler, the second joint coupler may be coupled with a second joint body, and the second joint body may be coupled with a third joint coupler. Such a series of joint components (i.e., joint bodies and joint couplers) provide additional degrees of freedom to the overall joint and to the driveline. The provision of such degrees of freedom of movement to the drivelines provides for a "flexible" mechanical coupling between the driving component and the driven component. That is, the driveline is capable of "flexing" (i.e., moving in and/or out of alignment within the provided degrees of freedom of movement) during rotation of the driveline. Engagements between the joints and joint couplers of the drivelines are interfaced via the engagement between the diamond bearing surfaces and the opposing metal surfaces. In some embodiments, the only points of engagement between the joints and joint couplers of the drivelines are points where the diamond bearing surfaces engage with the opposing metal surfaces. While the diamond bearing elements 1212 are shown as a plurality of discrete diamond bearing elements, in other embodiments only a single diamond bearing element is positioned to engage with an opposing metal bearing surface (i.e., surface 1218).

In FIGS. 12A and 12B, the driveline 1200 is shown in an aligned configuration. That is, the shaft 1202, joint couplers 1204a-1204d, and joints 1208a and 1208b are coaxially aligned about shared axis 1299. However, the ability of joint couplers 1204a-1204d and joints 1208a and 1208b to move relative to one another as a result of the sliding engagement between the opposing engagement surfaces 1218 and 1219 with the diamond bearing surfaces 1214 provides the driveline 1200 with the ability to operate in a state of misalignment. That is, driveline 1200 is capable of operating (e.g., being driven by a motor at one end and driving a pump at the opposite end) when the shaft 1202, joint couplers 1204a-1204d, and joints 1208a and 1208b are coaxially aligned about shared axis 1299, as well as when the shaft 1202, joint couplers 1204a-1204d, and joints 1208a and 1208b are not coaxially aligned (i.e., are misaligned, as discussed in more detail with reference to FIG. 20, below).

With reference to FIGS. 14A and 14B, driveline 1200 is shown in a misaligned state. The driveline 1200 has the ability to tilt into misalignment by the relative movements of the joints 1208a and 1208b and joint couplers 1204a-1204d, with the relative movement being along the arcuate paths defined by the surfaces 1214 and 1218. Joint coupler 1204c is tilted relative to the axis 1299 of shaft 1202, and joint coupler 1204d is tilted relative to the axis 1299 of shaft 1202. Joint coupler 1204a is pivotable about a first axis 1297 that is perpendicular to the shaft axis (axis 1299), and joint coupler 1204c is pivotable about a second axis 1298 that is also perpendicular to the shaft axis (axis 1299). Joint coupler 1204b is pivotable about a third axis 1295 that is perpendicular to the shaft axis (axis 1299), and joint coupler 1204d is pivotable about a fourth axis 1296 that is also perpendicular to the shaft axis (axis 1299). In some embodiments, the first axis 1297 about which joint coupler 1204a pivots intersects with and is perpendicular to the second axis 1298 about which joint coupler 1204c pivots. In some embodiments, both the first axis 1297 about which joint coupler 1204a pivots and the second axis 1298 about which joint coupler 1204c pivots intersect with the axis 1299. In other embodiments, the first axis 1297 about which joint coupler 1204a pivots does not intersect with but is perpendicular to the second axis 1298 about which joint coupler 1204c pivots. The angles between the axis 1295, 1296, 1297, 1298, and 1299 may be varied from the arrangement shown in FIG. 14A to modify the available movements to the driveline 1200.

FIG. 15 depicts joint coupler 1204a configured for coupling with a shaft (e.g., shaft 1202). Joint coupler 1204a includes body 1203. At one end of body 1203, joint coupler 1204a includes extension 1205 for coupling with a shaft. For example, a set screw may engage through hole 1207 and with a shaft inserted into extension 1205 to secure joint coupler 1204a with the shaft. Joint coupler 1204a has arcuate bearing body surface 1210 having diamond bearing elements 1212 thereon. Joint coupler 1204a also has bearing body side surfaces 1213, adjacent surface 1210. Bearing body side surfaces 1213 have diamond bearing elements 1212 thereon. Additionally, joint coupler 1204a includes tabs 1224 coupled therewith for coupling with a joint. For example, a set screw may engage through hole 1231 and with a joint to secure joint coupler 1204a with the joint. The arcuate path defined by bearing body surface 1210 and the diamond bearing elements 1212 thereon defines, at least in part, a path for available movement of the drivelines.

FIG. 16 depicts joint coupler 1204c configured for coupling with a component (e.g., a motor, pump, or other machine). Joint coupler 1204c is substantially similar to joint coupler 1204a with the exception that, instead of an extension 1205 with a hole 1207, joint coupler 1204c includes a slot 1209 for engagement with a component. In some embodiments, the joint couplers attached to the two joint bodies, opposite the shaft, are identical.

FIGS. 17A and 17B depict an exemplary joint coupler 1208 and FIGS. 18 and 19 depict exemplary opposing bearing elements thereof. Joint coupler 1208 includes body 1220. Slots 1232 are formed within body 1220. Opposing bearing elements 1216 and 1217 are positioned within each of slots 1232 and coupled with body 1220.

One skilled in the art would understand that, while particular embodiments and structures are shown and described with reference to FIGS. 12A-19, the driveline disclosed herein is not limited to these particular embodiments. Some embodiments of the drivelines disclosed herein include a drive shaft coupled with a first component at a first end of the drive shaft via a joint and coupled with a second component at a second end of the drive shaft via a joint. The coupling of the drive shaft with the joint is interfaced via diamond engagement surfaces that are slidingly engaged with opposing engagement surfaces (metal surfaces) that include a diamond reactive material. In some such embodiments, the diamond engagement surfaces are surfaces on the shaft or a coupler of the shaft and the opposing engagement surfaces are surfaces on the joints. In other such embodiments, the diamond engagement surfaces are surfaces on the joints and the opposing engagement surfaces are surfaces on the shaft or a coupling of the shaft. In operation, the drive shaft is rotated by a motor coupled with one end of the drive shaft, and the rotating drive shaft drives the operation of a machine (e.g., a pump) that is coupled with the opposite end of the drive shaft. The rotating drive shaft rotates about an axis of rotation. In some embodiments, the sliding engagement between the driveline joint and the shaft is such that the shaft is pivotable relative to the joint and/or relative to the component (e.g., motor or pump) about at least one pivot axis. In some such embodiments, the pivot axis extends perpendicular to the axis of rotation of the shaft. The sliding engagement between the driveline joint and the shaft may be such that the shaft is pivotable relative to the joint and/or relative to the component (e.g., motor or pump) about a first pivot axis and a second pivot axis. In some such embodiments, when aligned, the first and second pivot axis both extend perpendicular to the axis of rotation of the shaft, and the first pivot axis extends perpendicular to the second pivot axis.

Figure 20:
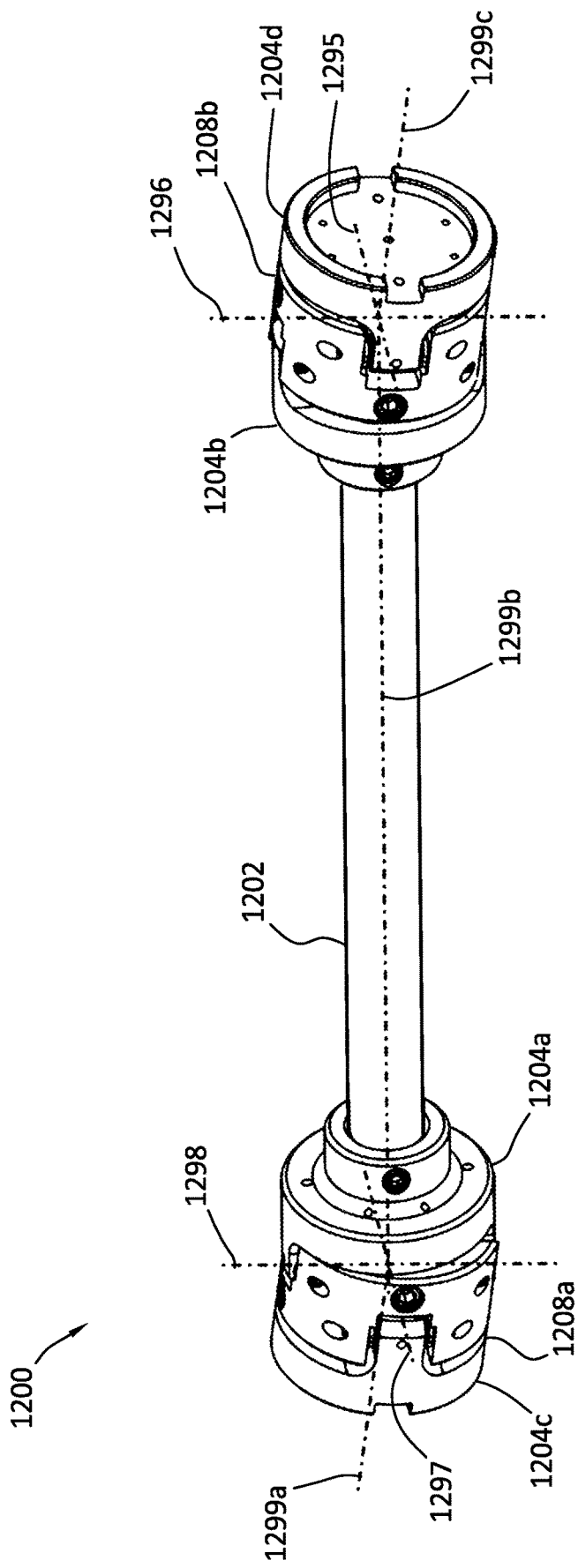
FIG. 20 depicts a driveline in accordance with some embodiments of the present disclosure, with the driveline in a state of misalignment.

With reference to FIG. 14A, FIG. 14B, and FIG. 20, driveline 1200 has multiple degrees of freedom of motion in various directions. The motions (degrees of freedom) available to driveline 1200 during operation include: (1) rotation of the shaft 1202 about the axis of rotation 1299b of the shaft 1202; (2) pivoting of coupler 1204a and joint 1208a relative to one another about a pivot axis 1297 that is perpendicular to axis of rotation 1299b; (3) pivoting of coupler 1204c and joint 1208a relative to one another about pivot axis 1298 that is perpendicular to both axis of rotation 1299a and the pivot axis 1297; (4) pivoting of coupler 1204b and joint 1208b relative to one another about a pivot axis 1295 that is perpendicular to axis of rotation 1299b; (5) pivoting of coupler 1204d and joint 1208b relative to one another about pivot axis 1296 that is perpendicular to both axis of rotation 1299c and the pivot axis 1295; (6) rotation of coupler 1204c about axis 1299a; and (7) rotation of coupler 1204d about axis 1299c. In some embodiments, pivot axis 1297 extends parallel to pivot axis 1295. In some embodiments, the pivot axis 1298 extends parallel to the pivot axis 1296. When driveline 1200 is in a state of alignment, axis 1299a, axis 1299b, and axis 1299c are coaxially aligned, forming a single axis 1299 as shown in FIG. 12A. While not shown, joint bodies 1208a and 1208b each have a separate axis of rotation that are independent of each other and are both independent of axes 1299a-1299c. Each of these motions (1)-(7) is independent of the others, such that rotation or pivoting about one of the axes does not affect the availability of rotation or pivoting about any of the other of the axis and does not affect the ability of the driveline 1200 to rotate and operate. Thus, driveline 1200 is capable of driving machinery under various states of "misalignment" of the driveline 1200. As used herein a "state of misalignment," in reference to a driveline includes a physical arrangement, positioning, and/or state of the driveline in which the axes about which multiple discrete components of the driveline rotate are not coaxial. A "state of misalignment," in reference to a driveline includes a physical arrangement, positioning, and/or state of the driveline in which at least one portion of the driveline is not concentrically aligned about the axis of rotation of the drive shaft (e.g., the joint 1208a is not concentric with the axis of rotation of the drive shaft 1202). The degrees of freedom of motion that driveline 1200 has allows driveline 1200 to react to various forces imparted onto the driveline 1200 during operation, and to oscillate during rotation in response to such forces. Forces are transmitted from torque in both forward and reverse directions in driveline 1200. That is, driveline 1200 is capable of transmitting torque both when shaft 1202 is rotating clockwise about axis 1299b and counterclockwise about axis 1299b. The driveline 1200 can bear axial loads (also referred to as thrust loads) both in tension and in compression. In some embodiments, the diamond engagement surfaces bear axial load in compression. In some embodiments, the pins (e.g., 1228) function as axial bearing surfaces in tension.

The driveline 1200 can be coupled with a prime mover at one end and a machine or tool at the other end. The prime mover may be a motor or engine, such as an eclectic motor or diesel engine. The machine or tool may be, for example and without limitation, farm equipment, mining equipment, transportation equipment, construction equipment, energy equipment, downhole drilling and/or production equipment, assembly line equipment, steel mill equipment, automobile components, or marine (e.g., boat) components. Some exemplary applications of the driveline 1200 disclosed herein are as a driveline between an electric motor and a pump, such as PDP or progressive cavity pump; as a driveshaft of an automobile, such as a heavy duty truck; as a steering column of an automobile; as a driveshaft of a boat propeller; as a driveline coupled with a wind turbine; as a driveline between an electric motor and an air compressor; a driveline for a downhole motor; and as a power take off (PTO) driveline on a tractor, such as to drive ploughing, harvesting, or other farming equipment. The driveline disclosed herein is not limited to these particular applications and may be used in various other applications.

Figure 21A:
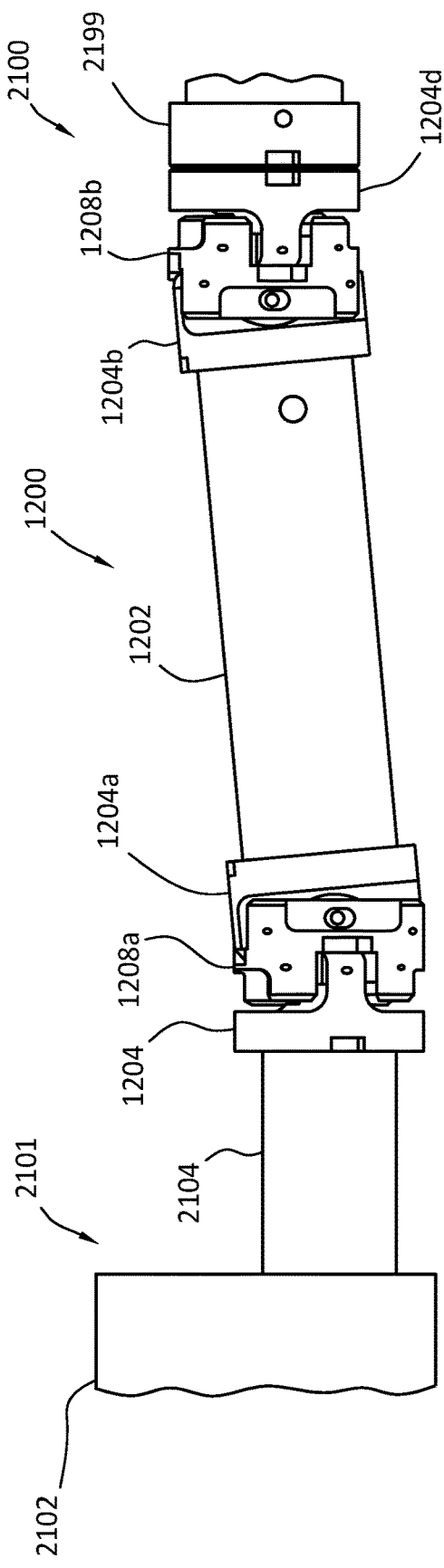
FIGS. 21A-21C depict a driveline coupled between a motor and a machine or tool in various states of alignment.
Figure 21B:
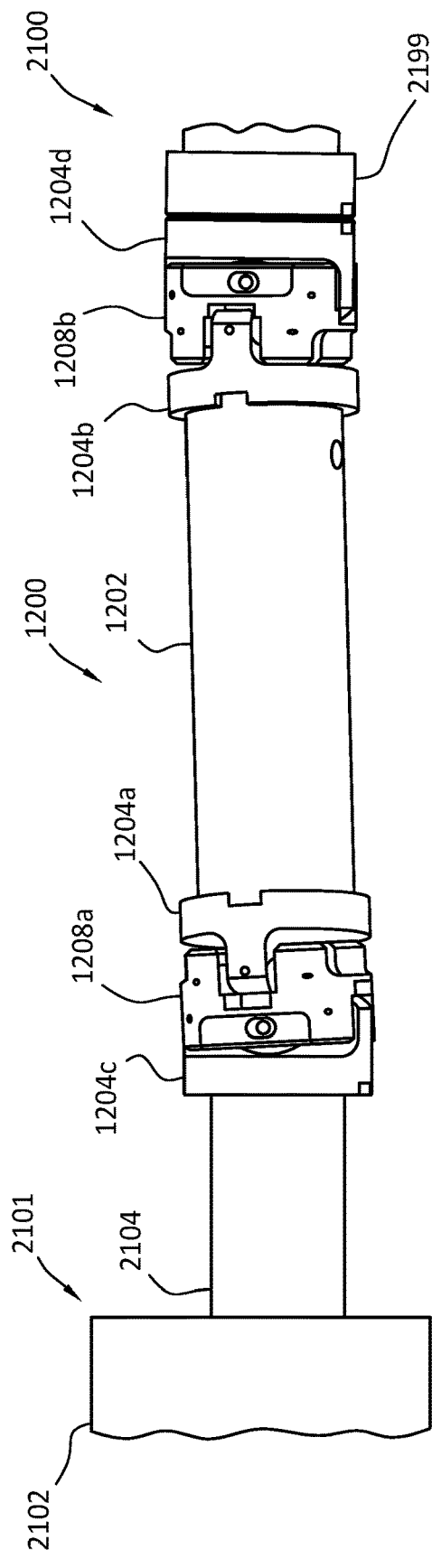
Figure 21C:
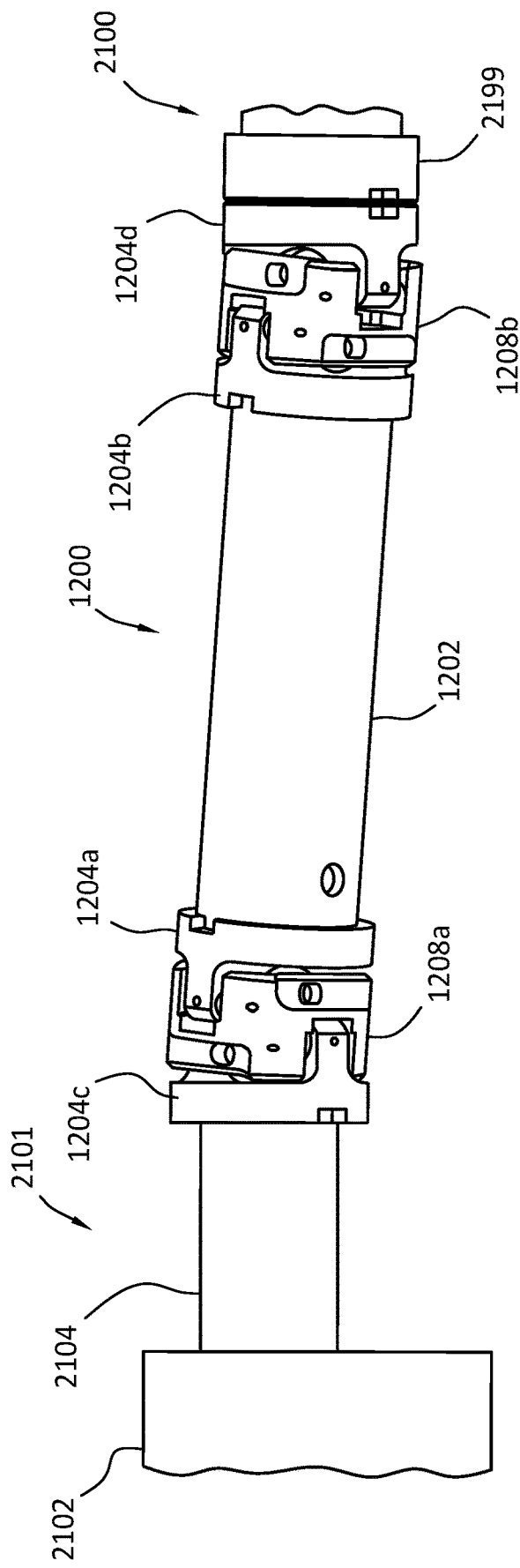

FIGS. 21A-21C depict an system incorporating a driveline in accordance with the present disclosure. System 2100 is shown in different states of alignment in FIGS. 21A-21B. System 2100 includes driveline 1200 coupled between motor 2101 and machine or tool 2199. Motor 2101 is positioned in system 2100 to drive driveline 1200, and driveline 1200 is positioned in system 2100 to drive machine or too 2199. Motor 2101 includes rotor 2104 positioned within stator 2102. Rotor 2104 is rigidly coupled with joint coupler 1204*c*, joint coupler 1204*c* is movably coupled with joint 1208*a*, joint 1208*a* is movably coupled with joint coupler 1204*a*, joint coupler 1204*a* is rigidly coupled with shaft 1202, shaft 1202 is rigidly coupled with joint coupler 1204*b*, joint coupler 1204*b* is movably coupled with joint 1208*b*, joint 1208*b* is movably coupled with joint coupler 1204*d*, and joint coupler 1204*d* is rigidly coupled with machine or tool 2199. In operation, rotor 2104 drives rotation of shaft 1202, and shaft 1202 drives operation of machine or tool 2199. The movable couplings between joint 1208*a* and joint couplers 1204*a* and 1204*c*, and between joint 1208*b* and joint couplers 1204*b* and 1204*d* provide the driveline 1200 with the ability to be driven and rotate and to drive machine or tool 2199 in various states of misalignment, as shown in FIGS. 21A-21C. Driveline 1200 may oscillate through the states of misalignment shown in FIGS. 21A-21C during operation. As the driveline 1200 oscillates through the states of misalignment, the engagement between the diamond bearing surfaces and the opposing metal bearing surfaces interfaces the relative movement between the joints 1208*a* and 1208*b* and the joint couplers 1204*a*-1204*d*.

While the driveline disclosed herein is shown as including a plurality of discrete polycrystalline diamond bearing elements, the driveline is not limited to this arrangement and the bearing surfaces of the driveline may include continuous polycrystalline diamond bearing surfaces. While the driveline shown in FIGS. 12A-21C has a driveline joint at both ends of the shaft, in other embodiments the driveline has such a driveline joint at only on one end thereof, such as for driving equipment.

In some embodiments, the planar extent of the diamond engagement surface is defined by boundary edges of the diamond engagement surface, and the metal engagement surface is engaged with the diamond engagement surface entirely within the boundary edges of the diamond engagement surface. As used herein, "boundary edges" of a surface are edges that are or define the perimeter of the surface. With the metal engagement surfaces engaged with the diamond engagement surfaces entirely within the boundary edges of the diamond engagement surfaces, the metal engagement surfaces do not engage with the boundary edges of diamond engagement surfaces. Thus, contact between the metal engagement surfaces and any edges of the diamond engagement surfaces is avoided. In some embodiments, the engagement contact area has a surface area that is smaller than the surface area of the diamond engagement surface.

While the joints disclosed herein are described as being incorporated into drivelines and coupled with drive shafts, the joints are not limited to these particular applications and may be used to couple other mechanical components together. The joint disclosed herein includes planar convex, or concave bearing surfaces, including polycrystalline diamond bearing surfaces and metal bearing surfaces, that are slidingly engaged with one another. The sliding engagement between the concave and convex bearing surfaces provides for pivoting movement of portions of the joint relative to other portions of the joint, which accommodates misalignment between moving components that are coupled with the joint. In some embodiments, a joint in accordance with the present disclosure is coupled with one end of a shaft (e.g., a drive shaft). In some embodiments, joints in accordance with the present disclosure is coupled with both ends of a shaft (e.g., a drive shaft). In some embodiments, a joint in accordance with the present disclosure is coupled between two shafts (e.g., drive shafts) forming an "elbow" joint. The joint may also be coupled with a prime mover or a driven component, such as a piece of equipment or other moving mechanical component.

APPLICATIONS

In certain embodiments, the power transmission systems disclosed herein are suitable for deployment and use in harsh environments (e.g., downhole). In some such aspects, the power transmission systems are less susceptible to fracture than power transmission systems that include a polycrystalline diamond engagement surface engaged with another polycrystalline diamond engagement surface. In certain aspects, such harsh environment suitable power transmission systems provide enhanced service value in comparison with power transmission systems that include a polycrystalline diamond engagement surface engaged with another polycrystalline diamond engagement surface.

As would be understood by one skilled in the art, various forms of gear failure can occur including, but not limited to, bending fatigue, contact fatigue, wear, scuffing, overload, and cracking. Without being bound by theory, it is believed that gears incorporating the power transmission surfaces disclosed herein (i.e., a polycrystalline diamond power transmission surface engaged with a diamond reactive material power transmission surface) will exhibit a reduced occurrence of such gear failures. It is further believed that a reduction of universal joint failure will also occur for universal joints that incorporate the power transmission surfaces disclosed herein.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power transmission system, the system comprising:
a driveline, the driveline comprising a shaft having a first end and a second end; and a first articulable joint coupled with the first end of the shaft, wherein the shaft is pivotable relative to the first articulable joint;
wherein the first articulable joint comprises multiple bearing surfaces, the multiple bearing surfaces including a first polycrystalline diamond bearing surface and a first metal bearing surface, wherein the first polycrystalline diamond bearing surface is engaged with the first metal bearing surface; and
wherein the first metal bearing surface comprises a metal, the metal containing at least 2 wt. % of iron, cobalt, nickel, copper, titanium, ruthenium, rhodium, palladium, chromium, manganese, tantalum, or combinations thereof based on a total weight of the metal.

2. The system of claim 1, wherein the first polycrystalline diamond bearing surface is a surface of a polycrystalline diamond bearing element.

3. The system of claim 2, wherein the polycrystalline diamond bearing element comprises a polycrystalline diamond compact.

4. The system of claim 1, wherein the metal is a metal alloy.

5. The system of claim 1, wherein the metal contains at least 2 wt. % of iron based on the total weight of the metal.

6. The system of claim 1, wherein the metal contains at least 2 wt. % of cobalt based on the total weight of the metal.

7. The system of claim 1, wherein the metal contains at least 2 wt. % of nickel based on the total weight of the metal.

8. The system of claim 1, wherein the metal contains at least 2 wt. % of copper based on the total weight of the metal.

9. The system of claim 1, wherein the metal contains at least 2 wt. % of titanium based on the total weight of the metal.

10. The system of claim 1, wherein the metal contains at least 2 wt. % of ruthenium based on the total weight of the metal.

11. The system of claim 1, wherein the metal contains at least 2 wt. % of rhodium based on the total weight of the metal.

12. The system of claim 1, wherein the metal contains at least 2 wt. % of palladium based on the total weight of the metal.

13. The system of claim 1, wherein the metal contains at least 2 wt. % of chromium based on the total weight of the metal.

14. The system of claim 1, wherein the metal contains at least 2 wt. % of manganese based on the total weight of the metal.

15. The system of claim 1, wherein the metal contains at least 2 wt. % of tantalum based on the total weight of the metal.

16. The system of claim 1, wherein the metal contains at least 55 wt. % of iron based on the total weight of the metal.

17. The system of claim 1, wherein the metal is steel.

18. The system of claim 1, wherein the metal is softer than a superhard material.

19. The system of claim 1, wherein the metal has a hardness value of less than 15 GPa as determined in accordance with ASTM E92-17.

20. A machine, the machine comprising:
a driveline, the driveline comprising a shaft having a first end and a second end;
a first articulable joint coupled with the first end of the shaft, wherein the shaft is pivotable relative to the first articulable joint, wherein the first articulable joint comprises a first polycrystalline diamond bearing surface and a first metal bearing surface, wherein the first polycrystalline diamond bearing surface is engaged with the first metal bearing surface, wherein the first metal bearing surface comprises a first metal that contains at least 2 wt. % of iron, cobalt, nickel, copper, titanium, ruthenium, rhodium, palladium, chromium, manganese, tantalum, or combinations thereof based on a total weight of the first metal;
a second articulable joint coupled with the second end of the shaft, wherein the shaft is pivotable relative to the second articulable joint, wherein the second articulable joint comprises a second polycrystalline diamond bearing surface and a second metal bearing surface, wherein the second polycrystalline diamond bearing surface is engaged with the second metal bearing surface, wherein the second metal bearing surface comprises a second metal that contains at least 2 wt. % of iron, cobalt, nickel, copper, titanium, ruthenium, rhodium, palladium, chromium, manganese, tantalum, or combinations thereof based on a total weight of the second metal;
a prime mover coupled with the first articulable joint; and
a driven component coupled with the second articulable joint.

21. The machine of claim 20, wherein the prime mover comprises a motor.

22. The machine of claim 21, wherein the motor comprises a rotor positioned within a stator, wherein the rotor is coupled with the first articulable joint.

23. The machine of claim 20, wherein the driven component comprises a pump.

24. The machine of claim 20, wherein the driven component is farm equipment, mining equipment, downhole drilling equipment, downhole production equipment, a flow component, assembly line equipment, steel mill equipment, an automobile component, or a boat component.

25. The machine of claim 20, wherein the shaft is a driveshaft of an automobile, a steering column of an automobile, a driveshaft of a boat propeller, a driveshaft of a wind turbine, a driveshaft of an air compressor, or a power take off driveshaft of a tractor.

26. A method of power transmission, the method comprising:
coupling a first articulable joint between a prime mover and a shaft of a driveline, such that the shaft is pivotable relative to the prime mover;
coupling a second articulable joint between a driven component and the shaft of the driveline, such that the shaft is pivotable relative to the driven component;
wherein each articulable joint comprises multiple bearing surfaces, the multiple bearing surfaces including polycrystalline diamond bearing surfaces engaged with metal bearing surfaces; wherein the metal bearing surfaces comprise a metal, the metal containing at least 2 wt. % of iron, cobalt, nickel, copper, titanium, ruthenium, rhodium, palladium, chromium, manganese, tantalum, or combinations thereof based on a total weight of the metal; and
driving rotation of the shaft with the prime mover, and driving the driven component with the rotating shaft.

27. An articulable joint for coupling between power transmission components, the joint comprising:
- a first joint coupler, the first joint coupler having a first bearing surface;
- a joint body having a second bearing surface and a third bearing surface, wherein the joint body is pivotably coupled with the first joint coupler such that the first bearing surface is engaged with the second bearing surface;
- a second joint coupler having a fourth bearing surface, the second joint coupler pivotably coupled with the joint body such that the third bearing surface is engaged with the fourth bearing surface;
- wherein one of the first and second bearing surfaces is a polycrystalline diamond bearing surface, and wherein the other of the first and second bearing surfaces is a metal bearing surface;
- wherein one of the third and fourth bearing surfaces is a polycrystalline diamond bearing surface, and wherein the other of the third and fourth bearing surfaces is a metal bearing surface; and
- wherein each metal bearing surface comprises a metal, the metal containing at least 2 wt. % of iron, cobalt, nickel, copper, titanium, ruthenium, rhodium, palladium, chromium, manganese, tantalum, or combinations thereof based on a total weight of the metal.

28. A power transmission system, the system comprising:
- a driveline, the driveline comprising a shaft having a first end and a second end; and a first articulable joint coupled with the first end of the shaft, wherein the shaft is pivotable relative to the first articulable joint;
- wherein the first articulable joint comprises multiple bearing surfaces, wherein the multiple bearing surfaces comprise a first polycrystalline diamond bearing surface and a first metal bearing surface, wherein the first polycrystalline diamond bearing surface is engaged with the first metal bearing surface; and
- wherein the first metal bearing surface comprises a metal, the metal containing at least 2 wt. % of a diamond solvent-catalyst based on a total weight of the metal.

29. A method of power transmission, the method comprising:
- coupling a first articulable joint between a prime mover and a shaft of a driveline, such that the shaft is pivotable relative to the prime mover;
- coupling a second articulable joint between a driven component and the shaft of the driveline, such that the shaft is pivotable relative to the driven component;
- wherein each articulable joint comprises multiple bearing surfaces, the multiple bearing surfaces including polycrystalline diamond bearing surfaces and metal bearing surfaces; wherein the polycrystalline diamond bearing surfaces are engaged with the metal bearing surfaces, wherein the metal bearing surfaces comprise a metal, the metal containing at least 2 wt. % of a diamond solvent-catalyst based on a total weight of the metal; and
- driving rotation of the shaft with the prime mover, and driving the driven component with the rotating shaft.

30. An articulable joint for coupling between power transmission components, the joint comprising:
- a first joint coupler, the first joint coupler having a first bearing surface;
- a joint body having a second bearing surface and a third bearing surface, wherein the joint body is pivotably coupled with the first joint coupler such that the first bearing surface is engaged with the second bearing surface;
- a second joint coupler having a fourth bearing surface, the second joint coupler pivotably coupled with the joint body such that the third bearing surface is engaged with the fourth bearing surface;
- wherein one of the first and second bearing surfaces is a polycrystalline diamond bearing surface, and wherein the other of the first and second bearing surfaces is a metal bearing surface;
- wherein one of the third and fourth bearing surfaces is a polycrystalline diamond bearing surface, and wherein the other of the third and fourth bearing surfaces is a metal bearing surface; wherein each metal bearing surface comprises a metal, the metal containing at least 2 wt. % of a diamond solvent-catalyst based on a total weight of the metal.

* * * * *